(12) United States Patent
Corbett et al.

(10) Patent No.: US 12,153,833 B2
(45) Date of Patent: Nov. 26, 2024

(54) DRIVE-ASSISTED RAID SYSTEM

(71) Applicant: Dell Products L.P., Round Rock, TX (US)

(72) Inventors: Peter Frank Corbett, Lexington, MA (US); William Emmett Lynn, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 209 days.

(21) Appl. No.: 17/859,194

(22) Filed: Jul. 7, 2022

(65) Prior Publication Data
US 2024/0012585 A1 Jan. 11, 2024

(51) Int. Cl.
*G06F 3/06* (2006.01)
*G06F 11/10* (2006.01)

(52) U.S. Cl.
CPC .......... *G06F 3/0689* (2013.01); *G06F 3/0623* (2013.01); *G06F 3/0652* (2013.01); *G06F 11/1096* (2013.01)

(58) Field of Classification Search
CPC .... G06F 3/0689; G06F 3/0623; G06F 3/0652; G06F 11/1096; G06F 11/1076
See application file for complete search history.

(56) References Cited

U.S. PATENT DOCUMENTS

| | | |
|---|---|---|
| 10,367,802 B2 | 7/2019 | Koushik et al. |
| 10,936,420 B1 * | 3/2021 | Kotzur ............... G06F 11/1096 |
| 2021/0096765 A1 * | 4/2021 | Kotzur ............... G06F 13/1673 |
| 2021/0096950 A1 * | 4/2021 | Kotzur .................. G06F 13/28 |

* cited by examiner

*Primary Examiner* — Ernest Unelus
(74) *Attorney, Agent, or Firm* — Joseph Mencher

(57) ABSTRACT

A drive-assisted RAID storage system includes a RAID storage controller device coupled to RAID primary data storage devices each storing primary data for a stripe, and a RAID parity data storage device storing parity data for the stripe. The RAID parity data storage device receives stripe parity data update commands from the RAID storage controller device that cause it to retrieve respective interim parity data generated by each of the RAID primary data storage devices and including respective stripe update sequence identifiers. The RAID parity data storage device uses the respective interim parity data to generate updated parity data. When the respective stripe update sequence identifiers in the respective interim parity data that was used to generate the updated parity data indicate that parity update operations for the stripe are complete, the RAID parity data storage device transmits a stripe parity update completion message to the RAID storage controller device.

20 Claims, 38 Drawing Sheets

DRIVE-ASSISTED RAID SYSTEM

BACKGROUND

The present disclosure relates generally to information handling systems, and more particularly to a Redundant Array of Independent Disk (RAID) information handling system that includes storage devices that both store data and perform RAID data storage operations.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) storage system that includes a plurality of RAID data storage devices. As will be appreciated by one of skill in the art, RAID storage systems are provided by a data storage virtualization technology that combines the physical RAID data storage devices into one or more logical storage units for the purposes of data redundancy, performance improvements, and/or other benefits known in the art. For example, data in a RAID storage system may be distributed across the RAID data storage devices using several different techniques that are referred to as "RAID levels" that provide different levels of redundancy and performance (e.g., RAID 0, RAID 1, RAID 5, RAID 6, and so on), with each RAID level providing a different balance among goals that include reliability, availability, performance, and capacity.

Conventional RAID storage systems typically include a RAID storage controller device located between a host device that provides data for storage in the RAID storage system, and the RAID data storage devices that store that data. For example, such "inline-RAID-storage-controller" RAID storage systems may include a hardware RAID storage controller device provided between a processing system (e.g., a Central Processing Unit (CPU)) and the RAID data storage devices, with data transmitted between the processing system and the RAID storage controller device via Peripheral Component Interconnect (PCIe) links, and data transmitted between the RAID storage controller device and the RAID data storage devices via Serial Attached Small Computer System Interface (SCSI) (SAS) links, Serial Advanced Technology Attachment (SATA) links, and more recently, PCIe links. However, such inline-RAID-storage-controller RAID storage systems can require relatively significant levels of processing and Input/Output (I/O) operations from their RAID storage controller device, particularly when the computation of parity data is required as part of writing new data to the RAID storage system (e.g., in the RAID 5 and RAID 6 levels discussed above), as well as during data reconstruction when a RAID data storage device (or a portion thereof) becomes unavailable.

For example, write operations in an inline-RAID-storage-controller RAID storage system may include the processing system in the host device providing primary data for storage in the RAID storage system to the RAID storage controller device, and the RAID storage controller device may provide that primary data to one or more of the RAID data storage devices for storage in a stripe provided by those RAID data storage devices, with the RAID storage controller device also computing parity data for that stripe and providing that parity data for storage in one or more of the RAID data storage devices. In a specific example, the processing system may provide "new" primary data for storage in one or more blocks of a stripe provided by one or more of the RAID data storage devices, and that "new" primary data may be used to overwrite the "old" primary data in those block(s), requiring several I/O operations by the RAID storage controller device with the RAID data storage device(s).

For example, in "single parity" situations (e.g., the RAID 5 level discussed above), overwriting one block in a stripe will result in four I/O operations by the RAID storage controller device with the RAID data storage device that provides that block: 1) a read of the "old" primary data, 2) a read of the "old" parity data, 3) a write of the "new" primary data, and 4) a write of the "new" parity data. Furthermore, in "dual parity" situations (e.g., the RAID 6 level discussed above), similar overwriting of one block in a stripe results in six I/O operations by the RAID storage controller device with the RAID data storage device that provides that block, and one of skill in the art in possession of the present disclosure will appreciate how the I/O operations increase as more blocks of the stripe have their corresponding "old" data overwritten, up to a maximum that occurs when a "full stripe write" overwrites all of the blocks in the stripe. As will be appreciated by one of skill in the art in possession of the present disclosure, in a situation in which w blocks are overwritten in a stripe with D blocks storing primary data and P blocks storing parity data, the minimum number N of I/O operations that will be performed by the RAID storage controller device with the RAID data storage device(s) may be determined by the equation:

$$N=\min[(P+D), (2P+2w)]$$

As such, when writing more than half the blocks in a stripe, it will be more I/O efficient to recompute the parity data for the entire stripe as compared to updating the existing parity data. In either situation, the RAID storage controller device must maintain knowledge (e.g., via its persistent storage as discussed above) of the complete and consistent contents of the stripe at all times (e.g., as understood by the host device that includes the processing system), which includes any subset of "old" data that remains unchanged on RAID data storage device(s), any subset of "new" data maintained by the RAID storage controller device (e.g., in its persistent storage), etc. Once all primary data and parity data has been updated as part of a write operation, the RAID storage controller device may then discard any "old" primary data and "old" parity data, but the RAID storage controller device may be configured to respond to subsequent write requests sooner (e.g., as soon as it has ensured the "new" data for the stripe is persistently stored in its persistent storage).

In an effort to reduce the number of I/O operation required by the RAID storage controller device with the RAID data storage devices discussed above, "drive-assisted" RAID storage systems have been developed that replace many of the RAID storage controller device/RAID data storage device I/O operations discussed above with direct interactions between the RAID data storage devices and/or between the RAID data storage devices and the host device. For example, drive-assisted RAID storage systems may include a processing system (e.g., a CPU, a DPU, etc.) directly connected to the RAID data storage devices via PCIe links, and with a RAID storage controller device coupled to both of the processing system and the RAID data storage devices, and often provided via software executed by the processing system. In a specific example, such a RAID storage controller device may present itself as a Non-Volatile Memory express (NVMe) controller for NVMe namespaces (i.e., when the RAID data storage devices are provided by NVMe storage devices) that may be composed of storage segments that are included in the same PCIe domain in the RAID data storage devices.

Write operations in a drive-assisted RAID storage system may include the processing system in the host device providing a request to store primary data in the RAID storage system to the RAID storage controller device, and the RAID storage controller device storage providing instructions to the RAID data storage devices to retrieve that primary data for storage in a stripe provided by those RAID data storage devices, thus eliminating the need to store the primary data in the RAID storage controller device, the need for the RAID storage controller device to perform parity calculations, and the read and write I/O operations that would otherwise be performed by the RAID storage controller device with the RAID data storage devices as discussed above. In a specific example, the processing system may provide a request to the RAID storage controller device for the storage of "new" primary data in one or more blocks of a stripe provided by one or more of the RAID data storage devices, and the RAID storage controller device will then instruct one or more of the RAID data storage devices to retrieve that "new" primary data from the host device that includes the processing system, update their "old" primary data with that "new" primary data, calculate corresponding interim parity data, and then provide that interim parity data to one or more RAID data storage devices for use in calculating a final parity data for the stripe and storing that final parity data in those RAID data storage device(s).

While the drive-assisted RAID storage systems described above eliminate many of the issues with inline-RAID storage-controller RAID storage systems, in some scenarios the use of the drive-assisted RAID storage systems can raise some issues. For example, between the time when the RAID storage controller device instructs the RAID data storage devices to perform the primary data updates discussed above and the time those primary data updates are completed, the primary data and parity data for the stripe can be "parity-inconsistent" (e.g., when the known state of the stripe from the point of view of an external observer becomes inconsistent from a parity standpoint due to, for example, the parity data computed from the known primary data not equaling the known parity data). As will be appreciated by one of skill in the art in possession of the present disclosure, such parity-inconsistency can leave the data in the stripe vulnerable to data loss, raise the possibility of returning incorrect data unknowingly, and/or otherwise introduce data issues known in the art when, for example, a RAID data storage device becomes unavailable or there is a system-level failure (e.g., a power loss) during the time period in which the parity-inconsistency is occurring.

As will be appreciated by one of skill in the art in possession of the present disclosure, the conventional drive-assisted RAID storage techniques discussed above are typically utilized in scenarios that involve the updating of one block (or relatively few blocks) in a stripe, while the inline-RAID-storage-controller storage techniques discussed above are typically utilized in scenarios that involve a "full-stripe write" (or the updating of a relatively large number of blocks in the stripe), thus reintroducing the I/O operation inefficiencies discussed above in RAID storage systems that implement such "hybrid" drive-assisted/inline-RAID-storage-controller RAID storage systems.

Accordingly, it would be desirable to provide a drive-assisted RAID storage system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Redundant Array of Independent Disk (RAID) data storage engine that is configured to: receive, from a RAID storage controller device, a plurality of stripe parity data update commands that each identify one of a plurality of RAID primary data storage devices; retrieve, in response to each of the plurality of stripe parity data update commands, respective interim parity data that was generated by the RAID primary data storage device identified by that stripe parity data update command, and that includes a respective stripe update sequence identifier; generate, using the respective interim parity data retrieved in response to each of the plurality of stripe parity data update commands, updated parity data; determine that the respective stripe update sequence identifiers that are included in the respective interim parity data that has been used to generate the updated parity data indicate that parity update operations for the stripe are complete; and transmit, to the RAID storage controller device in response to determining that the respective stripe primary data update sequence identifiers indicate that parity update operations for the stripe are complete, a stripe parity update completion message.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
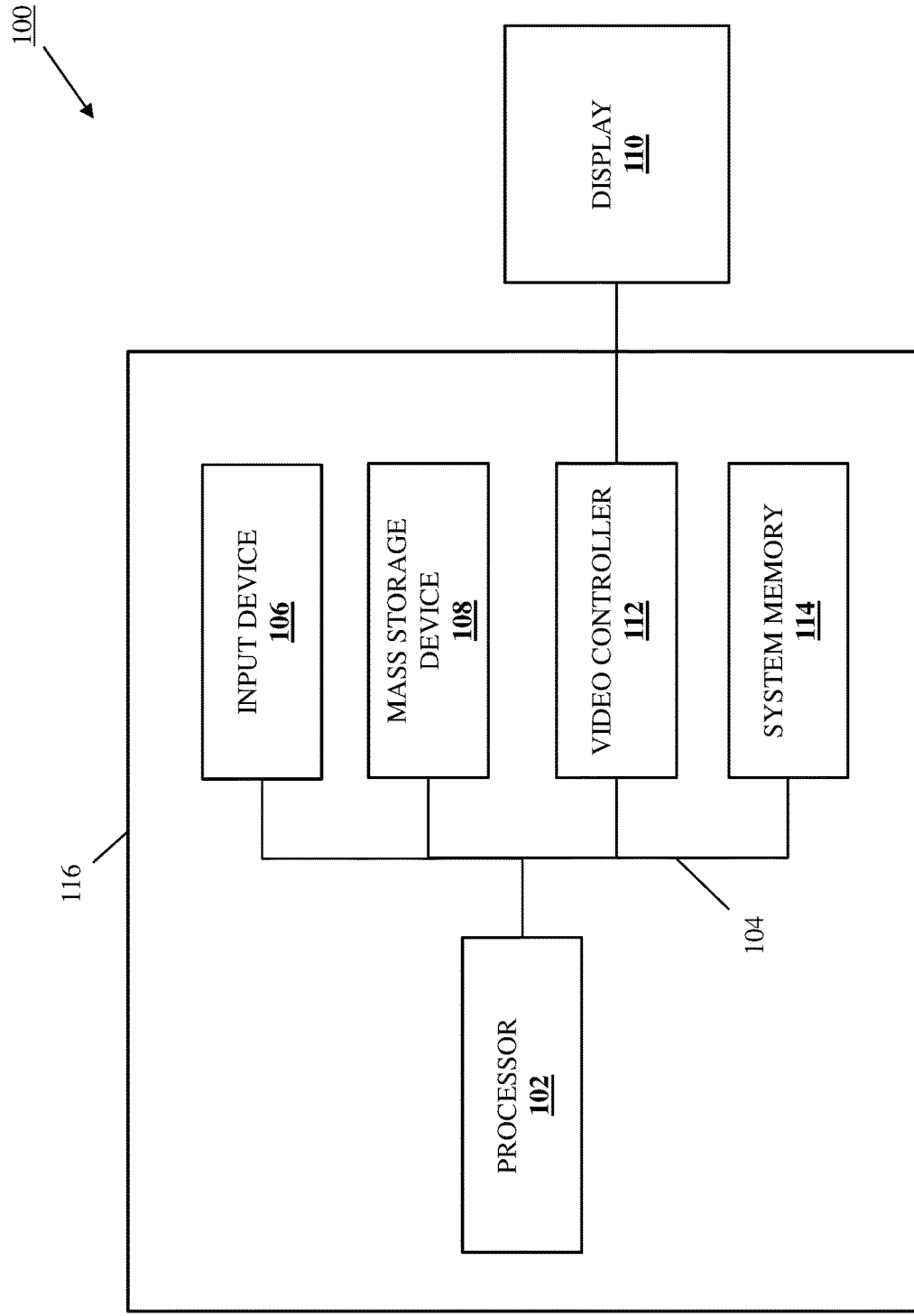
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
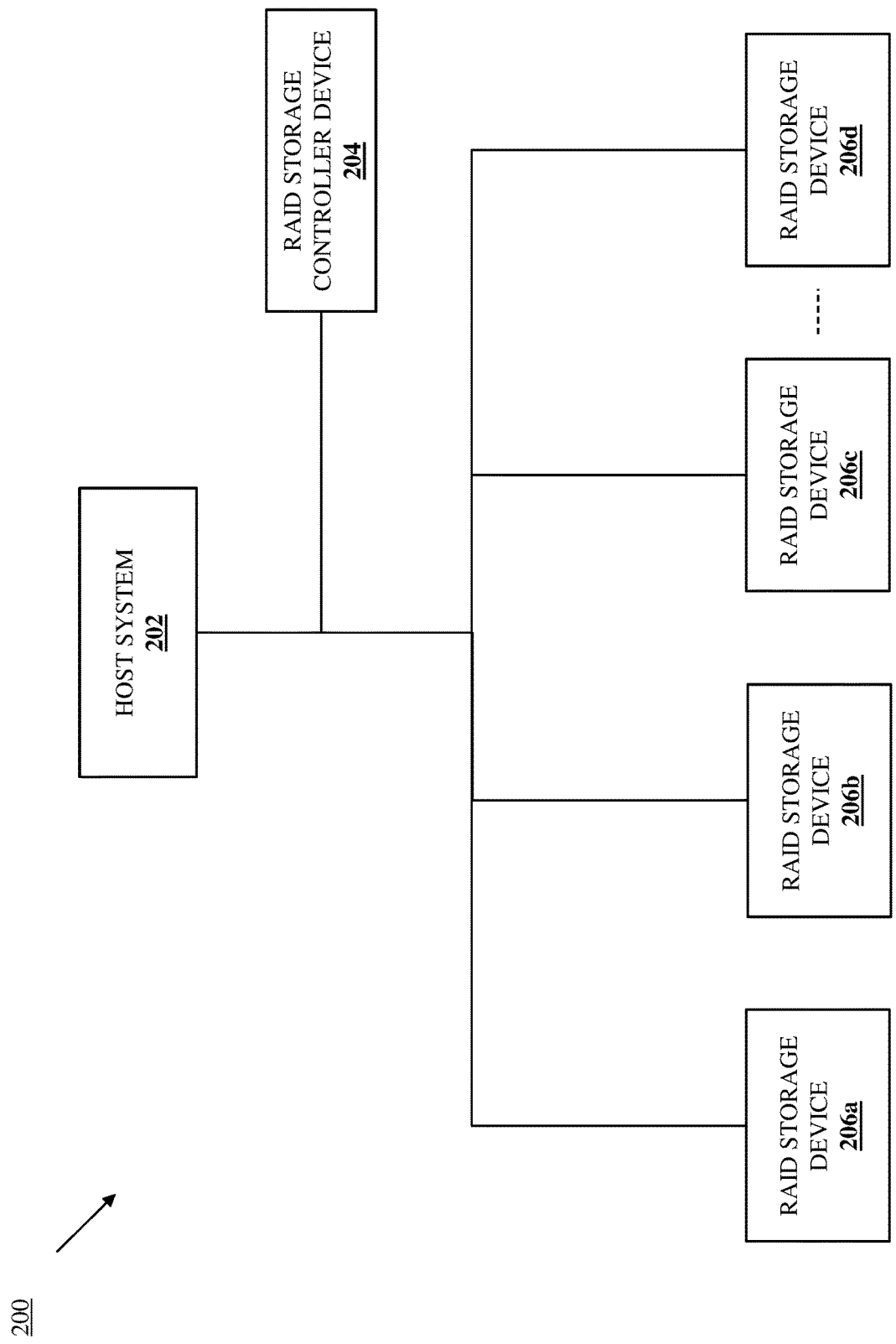
FIG. 2 is a schematic view illustrating an embodiment of a drive-assisted RAID storage system provided according to the teachings of the present disclosure.

Referring now to FIG. 2, an embodiment of a Redundant Array of Independent Disks (RAID) storage system 200 is illustrated that may provide the drive-assisted RAID storage system of the present disclosure. In the illustrated embodiment, the RAID storage system 200 incudes a host system 202. In an embodiment, the host system 202 may be provided by the IHS 100 discussed above with reference to FIG. 1, and/or may include some or all of the components of the IHS 100. For example, the host system 202 may include server device(s), desktop computing device(s), a laptop/notebook computing device(s), tablet computing device(s), mobile phone(s), and/or any other host devices that one of skill in the art in possession of the present disclosure would recognize as operating similarly to the host system 202 discussed below (e.g., to provide data for storage).

In the illustrated embodiment, the RAID storage system 200 also includes a RAID storage controller device 204 that is coupled to the host system 202 in a "look-aside" RAID storage controller device configuration that, as discussed below, couples the RAID storage controller device 204 to the host system 202 and each of a plurality of RAID data storage devices without positioning the RAID storage controller device 204 between the host system 202 and the RAID data storage devices (e.g., without positioning the RAID storage controller device in an "inline" RAID storage controller device configuration). As will be appreciated by one of skill in the art in possession of the present disclosure, the term "RAID data" storage device is not meant to imply any required knowledge by the storage device of its use in storing RAID data, as one of skill in the art in possession of the present disclosure will appreciate that such knowledge will typically not exist in storage devices utilized in a RAID array, as the operation and layout of the storage devices in storing RAID data will typically be orchestrated by the RAID storage controller device 204.

In an embodiment, the RAID storage controller device 204 may be provided by the IHS 100 discussed above with reference to FIG. 1, and/or may include some or all of the components of the IHS 100. For example, the RAID storage controller device 204 may include any hardware-based or software-based storage device/disk array controller that is configured to manage physical storage devices and present them to host systems as logical units. In the specific examples below that utilize Non-Volatile Memory express (NVMe) technology, the RAID storage controller device 204 may be presented as an NVMe controller for one or more NVMe namespaces that are provided by storage segments included in multiple NVMe storage devices in the same PCIe domain, although one of skill in the art in possession of the present disclosure will appreciate how other storage technologies will fall within the scope of the present disclosure as well.

Furthermore, the RAID storage system 200 also includes the plurality of RAID data storage devices 206*a*, 206*b*, 206*c*, and up to 206*d*, each of which is coupled directly to the host system 202, as well as to the RAID storage controller device 204 in the "look-aside" RAID storage controller device configuration that couples the RAID storage controller device 204 to the host system 202 and each of the RAID data storage devices 206*a*-206*d* without positioning the RAID storage controller device 204 between the host system 202 and the RAID data storage devices 206*a*-206*d*. As discussed in further detail below, the "look-aside" RAID storage controller device configuration provides the RAID data storage devices 206*a*-206*d* direct access to the host system 202 independent of the RAID storage controller device 204, which allows many conventional RAID storage controller operations to be offloaded from the RAID storage controller device 204 by the RAID data storage devices 206*a*-206*d*.

As discussed below, in any particular data storage scenario (e.g., for any particular stripe, discussed in further detail below), each of the RAID data storage devices 206*a*-206*d* may have specific RAID operational roles (e.g., "primary data storage RAID operational roles" and "parity data storage RAID operational roles"), and one of skill in the art in possession of the present disclosure will appreciate how any or all of the plurality of RAID data storage devices in the RAID storage system 200 illustrated in FIG. 2 may perform dual roles across different data storage scenarios (e.g., across different stripes), with any particular RAID data storage device operating as a RAID primary data storage device for one data stripe and a RAID parity data storage device for another data stripe. As will be appreciated by one of skill in the art in possession of the present disclosure, the RAID data storage devices 206*a*-206*d* in the RAID storage system 200 are primarily described below as operating in a RAID 5 configuration, with RAID primary data storage devices configured to store primary data (e.g., provided by the host system 202), and a RAID parity data storage device configured to store parity data that may be utilized to recover any of the primary data when that primary data becomes unavailable on one of the RAID primary data storage devices.

However, while a few RAID data storage devices in a particular configuration are illustrated, one of skill in the art in possession of the present disclosure will recognize that many more storage devices may (and typically will) be coupled to the RAID storage controller device 204 (e.g., in a datacenter) and may be provided in other RAID configurations (e.g., the RAID 6 configuration discussed below) while remaining within the scope of the present disclosure as well. In the embodiments discussed below, the RAID data storage devices 206*a*-206*d* are described as being provided by Non-Volatile Memory express (NVMe) Solid State Drive (SSD) storage devices, but one of skill in the art in possession of the present disclosure will recognize that other types of storage devices with similar functionality as the NVMe SSD drives (e.g., NVMe over Fabric (NVMe-oF) storage devices, NVMe PCIe add-in cards, NVMe M.2 cards, or devices using other storage technologies) may be implemented according to the teachings of the present disclosure and thus will fall within its scope as well. Thus, while a specific RAID storage system 200 has been illustrated and described, one of skill in the art in possession of the present disclosure will recognize that the RAID storage system of the present disclosure may include a variety of components and component configurations while remaining within the scope of the present disclosure as well.

Figure 3:
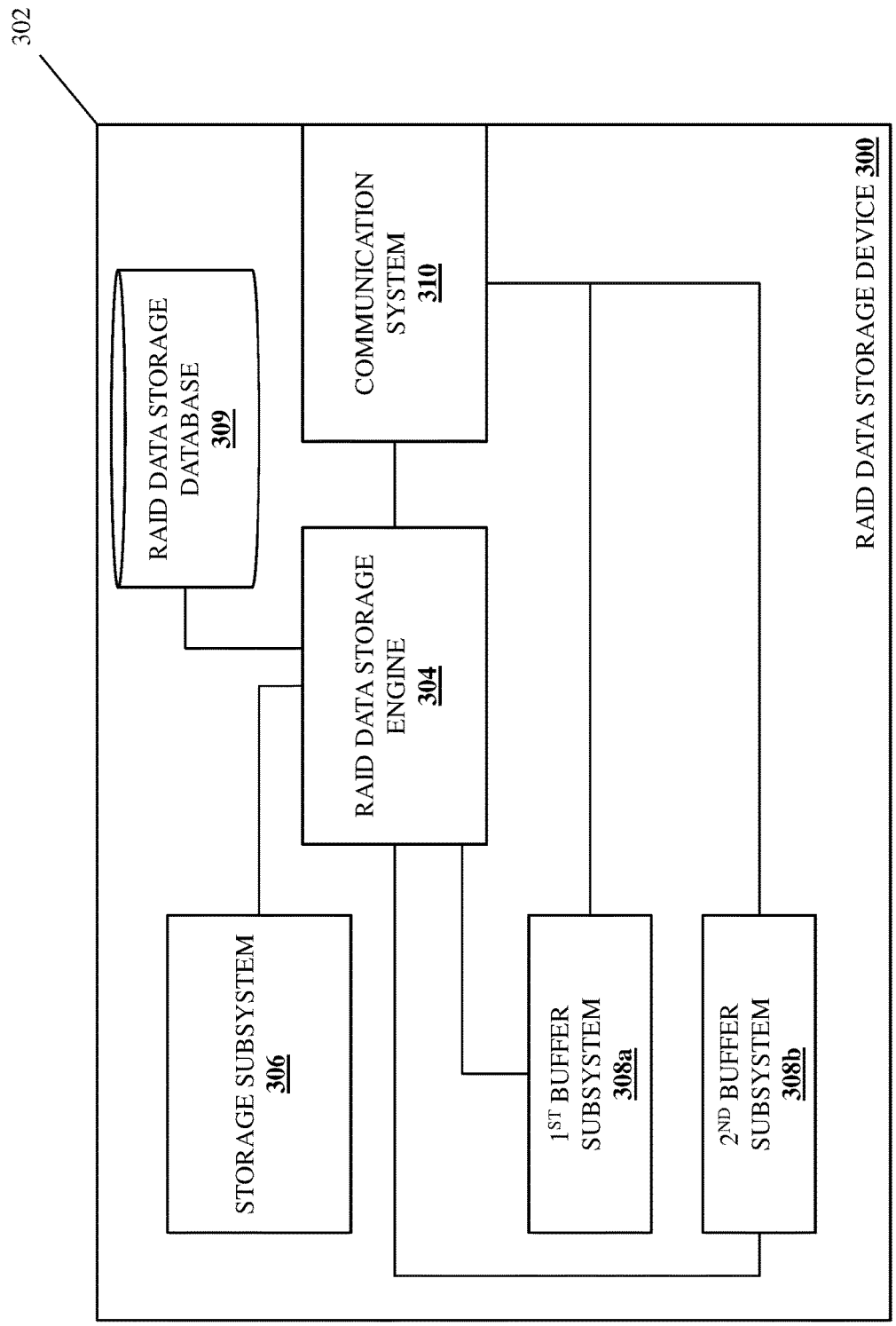
FIG. 3 is a schematic view illustrating an embodiment of a RAID data storage device that may be included in the drive-assisted RAID storage system of FIG. 2.

Referring now to FIG. 3, an embodiment of a RAID data storage device 300 is illustrated that may provide any or all of the RAID data storage devices 206a-206d discussed above with reference to FIG. 2. As such, the RAID data storage device 300 may be provided by an NVMe SSD storage device, but one of skill in the art in possession of the present disclosure will recognize that other types of storage devices with similar functionality as the NVMe SSD storage devices (e.g., NVMe-oF storage devices, NVMe PCIe add-in cards, NVMe M.2 cards, or devices using other storage technologies) may be provided according to the teachings of the present disclosure and thus will fall within its scope as well. In the illustrated embodiment, the RAID data storage device 300 includes a chassis 302 that houses the components of the RAID data storage device 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID data storage engine 304 that is configured to perform the functionality of the RAID data storage engines and/or RAID data storage devices discussed below.

The chassis 302 may also house a storage subsystem 306 that is coupled to the RAID data storage engine 304 (e.g., via a coupling between the storage subsystem 306 and the processing system). Continuing with the example provided above in which the RAID data storage device 300 is an NVMe SSD storage device, the storage subsystem 306 may be provided by a flash memory array such as, for example, a plurality of NAND flash memory devices. However, one of skill in the art in possession of the present disclosure will recognize that the storage subsystem 306 may be provided using other storage technologies while remaining within the scope of the present disclosure as well. The chassis 302 may also house a first buffer subsystem 308a that is coupled to the RAID storage engine 304 (e.g., via a coupling between the first buffer subsystem 308a and the processing system). Continuing with the example provided above in which the RAID data storage device 300 is an NVMe SSD storage device, the first buffer subsystem 308a may be provided by a device buffer in a non-volatile memory subsystem that is internal to the NVMe SSD storage device, not accessible via a PCIe bus connected to the NVMe SSD storage device, and conventionally utilized to initially store data received via write commands before writing them to flash media (e.g., NAND flash memory devices) in the NVMe SSD storage device. However, one of skill in the art in possession of the present disclosure will recognize that the first buffer subsystem 308a may be provided using other buffer technologies while remaining within the scope of the present disclosure as well.

The chassis 302 may also house a second buffer subsystem 308b that is coupled to the RAID storage engine 304 (e.g., via a coupling between the second buffer subsystem 308b and the processing system). Continuing with the example provided above in which the RAID data storage device 300 is an NVMe SSD storage device, the second buffer subsystem 308b may be provided by memory subsystem including a Controller Memory Buffer (CMB). However, one of skill in the art in possession of the present disclosure will recognize that the second buffer subsystem 308b may be provided using other buffer technologies while remaining within the scope of the present disclosure as well. The chassis 302 may also house a storage system (not illustrated, but which may be provided by the storage device 108 discussed above with reference to FIG. 1) that is coupled to the RAID data storage engine 304 (e.g., via a coupling between the storage system and the processing system) and that includes a RAID data storage database 309 that is configured to store any of the information utilized by the RAID data storage engine 304 as discussed below.

The chassis 302 may also house a communication system 310 that is coupled to the RAID data storage engine 304 (e.g., via a coupling between the communication system 310 and the processing system), the first buffer subsystem 308a, and the second buffer subsystem 308b, and that may be provided by any of a variety of storage device communication technologies and/or any other communication components that would be apparent to one of skill in the art in possession of the present disclosure. Continuing with the example provided above in which the RAID data storage device 300 is an NVMe SSD storage device, the communication system 310 may include queues (e.g., the submission queues and completion queues discussed below), any NVMe SSD storage device communication components that enable the Direct Memory Access (DMA) operations described below, as well as any other components that provide NVMe SDD storage device communication functionality that would be apparent to one of skill in the art in possession of the present disclosure. However, while a specific RAID data storage device 300 has been illustrated and described, one of skill in the art in possession of the present disclosure will recognize that RAID data storage devices (or other devices operating according to the teachings of the present disclosure in a manner similar to that described below for the RAID data storage device 300) may include a variety of components and/or component configurations for providing conventional RAID data storage device functionality, as well as the functionality discussed below, while remaining within the scope of the present disclosure as well.

Figure 4:
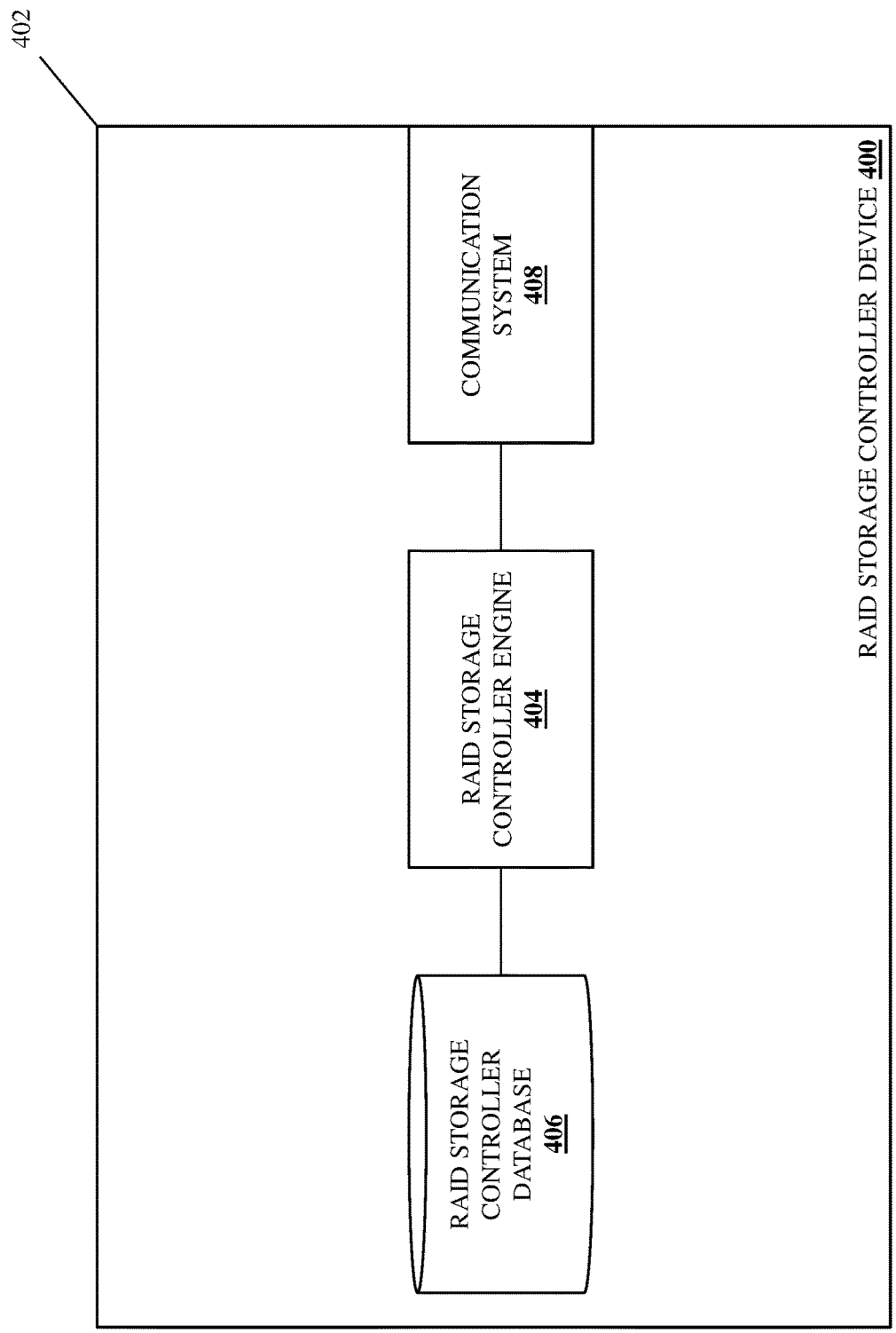
FIG. 4 is a schematic view illustrating an embodiment of a RAID storage controller device that may be included in the drive-assisted RAID storage system of FIG. 2.

Referring now to FIG. 4, an embodiment of a RAID storage controller device 400 is illustrated that may provide the RAID storage controller device 204 discussed above with reference to FIG. 2. As such, the RAID storage controller device 400 may be provided by the IHS 100 discussed above with reference to FIG. 1 and/or may include some or all of the components of the IHS 100, and in specific examples may be provided by any hardware-based or software-based storage device/disk array controller that is configured to manage physical storage devices and present them to host systems as logical units. Furthermore, while illustrated and discussed as being provided by a specific controller, one of skill in the art in possession of the present disclosure will recognize that the functionality of the RAID storage controller device 400 discussed below may be provided by other devices that are configured to operate similarly as the RAID storage controller device 400 discussed below.

In the illustrated embodiment, the RAID storage controller device 400 includes a chassis 402 that houses the components of the RAID storage controller device 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage controller engine 304 that is configured to perform the functionality of the RAID storage controller engines and/or RAID storage controller devices discussed below.

The chassis 402 may also house a storage system (not illustrated, but which may include the storage 108 discussed above with reference to FIG. 1, and/or other persistent memory/storage devices known in the art) that is coupled to the RAID storage controller engine 404 (e.g., via a coupling between the storage system and the processing system) and that includes a RAID storage controller database 406 that is configured to store any of the information utilized by the RAID storage controller engine 404 discussed below. The chassis 402 may also house a communication system 408 that is coupled to the RAID storage controller engine 304 (e.g., via a coupling between the communication system 408 and the processing system) and that may be provided by any other controller communication components that one of skill in the art in possession of the present disclosure would recognize as being capable of coupling to the host systems and RAID data storage devices described herein. However, while a specific RAID storage controller device 400 has been illustrated and described, one of skill in the art in possession of the present disclosure will recognize that RAID storage controller devices 400 (or other devices operating according to the teachings of the present disclosure in a manner similar to that described below for the RAID storage controller device 400) may include a variety of components and/or component configurations for providing conventional RAID storage controller device functionality, as well as the functionality discussed below, while remaining within the scope of the present disclosure as well.

Figure 5A:
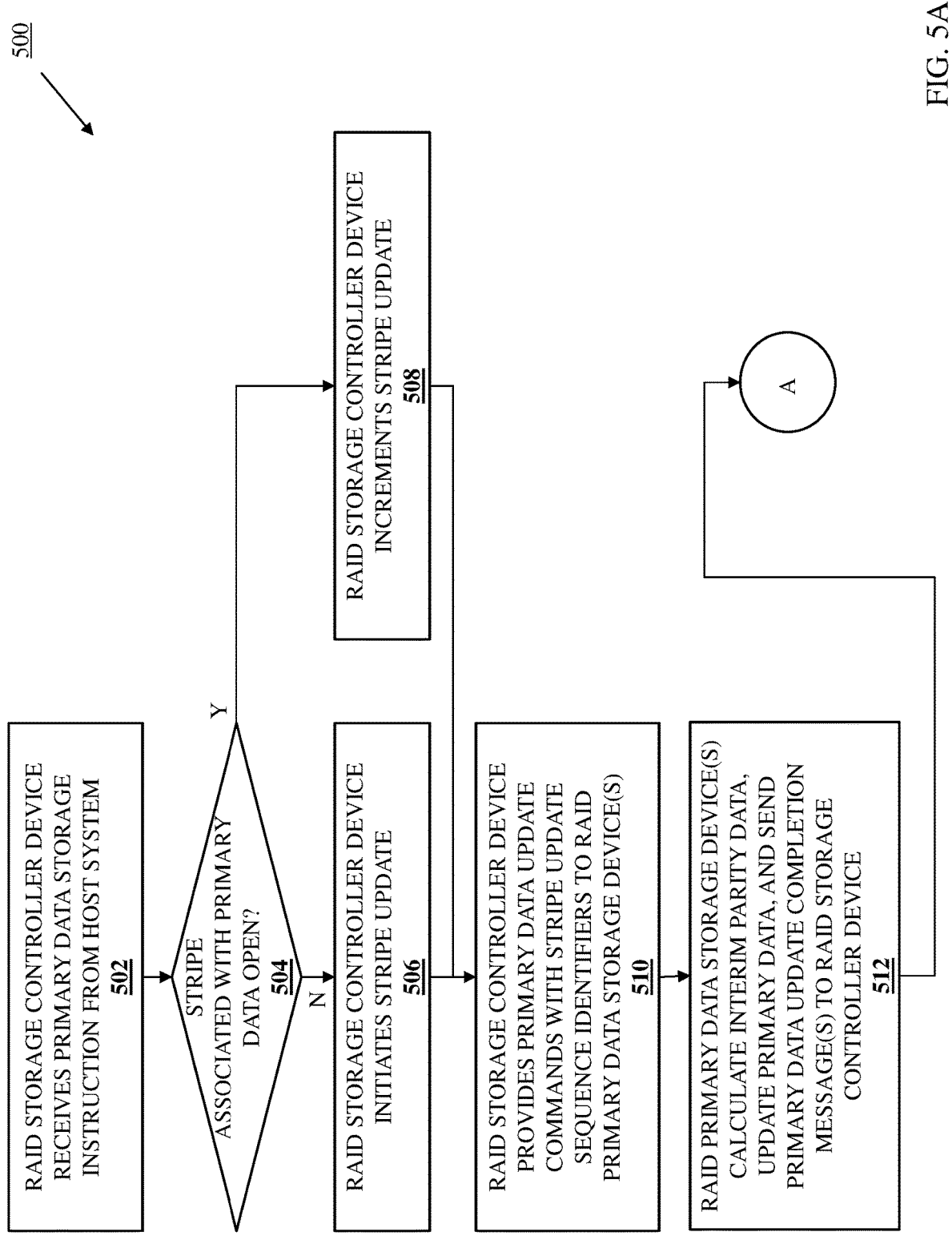
FIG. 5A is a flow chart illustrating an embodiment of a portion of a method for performing drive-assisted RAID operations.
Figure 5B:
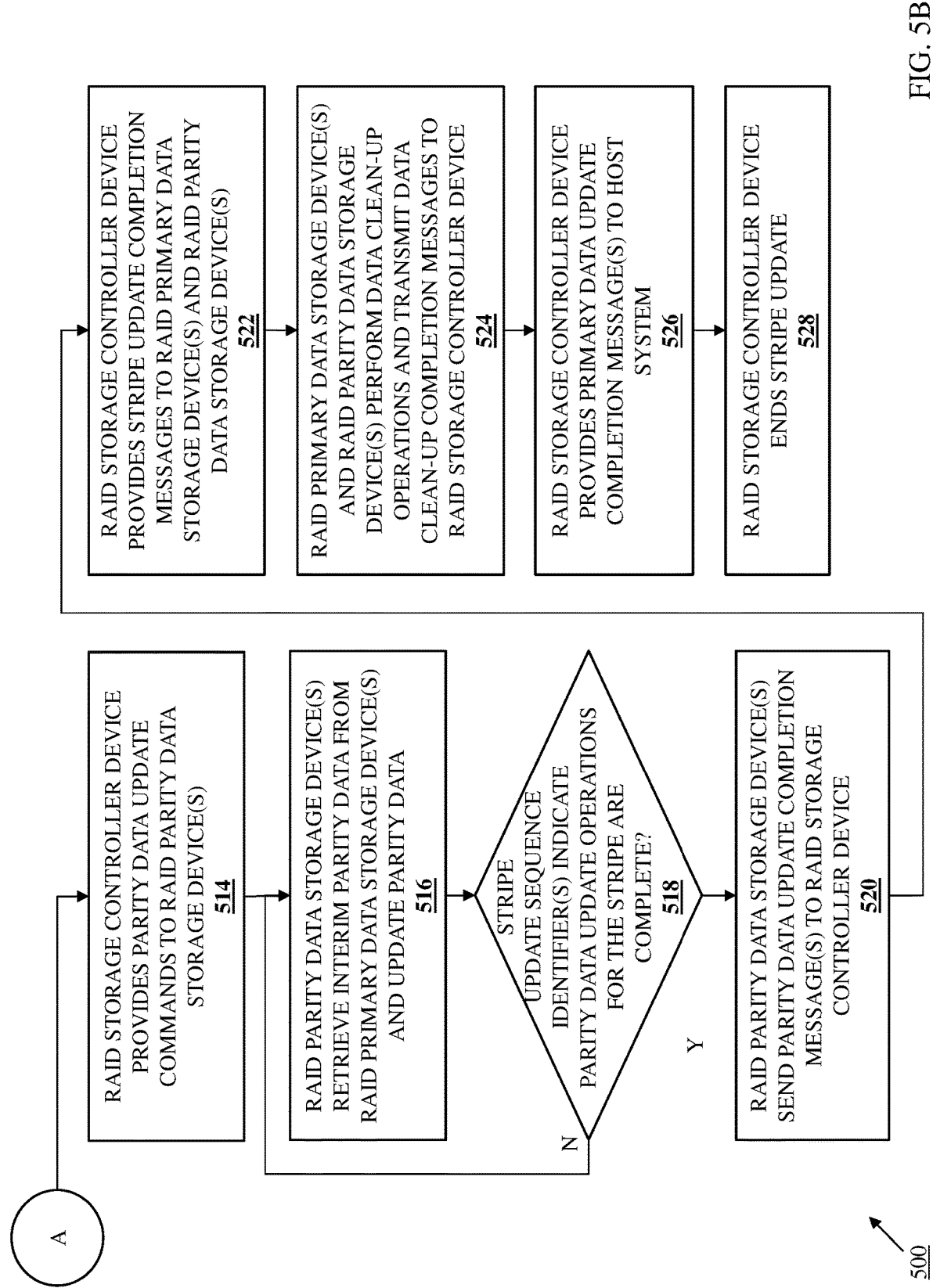
FIG. 5B is a flow chart illustrating an embodiment of a portion of the method of FIG. 5A.

Referring now to FIGS. 5A and 5B, an embodiment of a method 500 for performing drive-assisted Redundant Array of Independent Disk (RAID) operations is illustrated. As discussed below, the systems and methods of the present disclosure provide for the tracking of an update of a stripe in a drive-assisted RAID storage system. For example, the drive-assisted RAID storage system of the present disclosure may include a RAID storage controller device coupled to RAID primary data storage devices each storing primary data for a stripe, and a RAID parity data storage device storing parity data for the stripe. The RAID parity data storage device receives stripe parity data update commands from the RAID storage controller device that cause it to retrieve respective interim parity data generated by each of the RAID primary data storage devices and including respective stripe update sequence identifiers. The RAID parity data storage device uses the respective interim parity data to generate updated parity data. When the respective stripe update sequence identifiers in the respective interim parity data that was used to generate the updated parity data indicate that parity update operations for the stripe are complete, the RAID parity data storage device transmits a stripe parity update completion message to the RAID storage controller device.

As discussed above, conventional drive-assisted RAID storage techniques are typically utilized in scenarios that involve the updating of one block (or relatively few blocks) in a stripe, while inline-RAID-storage-controller storage techniques are typically utilized in scenarios that involve a "full-stripe write" (or the updating of a relatively large number of blocks in the stripe). Furthermore, the conventional drive-assisted RAID storage techniques discussed above may be modified to preserve "old" primary data and "old" parity data for a stripe stored in RAID data storage devices until "new" primary data and "new" parity data have been stored in persistent storage in those RAID storage devices such that they may be atomically committed (e.g., all at once) to the RAID data storage devices in order to update that stripe, prior to which read requests to the stripe may be responded to with the "old" primary data, and subsequent to which read requests may be responded to with that "new" primary data.

One of skill in the art in possession of the present disclosure will appreciate how the modified drive-assisted RAID storage techniques described above will operate sufficiently with random write workloads, as it is unlikely that more than one block in a stripe will be updated at the same time (e.g., assuming that the parity strip size is as large as, or larger than and aligned with, the file system block size). However, in modern file systems including log structures, write requests may be provided by host systems as a single sequence of write operations that are directed to adjacent blocks in a stripe, rather than a series of write operations that are directed to randomly located blocks. As such, the modified drive-assisted RAID storage techniques discussed above that operate to maintain the invariant that the controller always ensures a complete and parity-consistent image of the stripe, will result in a serialization of the processing of the individual block write operations in a sequential write sequence. As will be appreciated by one of skill in the art in possession of the present disclosure, this may have a negative impact on the performance of the drive-assisted RAID storage system for sequential write operations (including those utilized in many modern file and block storage systems).

As such, the drive-assisted RAID storage system of the present disclosure operates to maintain parity consistently and continuously during write operations (including sequential write operations) that update multiple blocks in a stripe provided by that drive-assisted RAID storage system within a relatively short time interval. While many of the embodiments described below utilize NVMe storage devices as the RAID data storage devices, one of skill in the art in possession of the present disclosure will appreciate how the drive-assisted RAID storage techniques described herein may be utilized in any data storage scenario including sequential write operations, relatively highly localized write operations to distributed RAID storage systems with parity processing offloaded to the RAID data storage devices, and/or other RAID data storage situations that would be apparent to one of skill.

One of skill in the art in possession of the present disclosure will also appreciate that, as compared to conventional drive-assisted RAID storage techniques, the drive-assisted RAID storage techniques described herein add only inconsequential additional processing operations to the write path, with no new message/command/communication exchanges required, and thus the drive-assisted RAID storage techniques of the present disclosure do not introduce performance degradation for random write scenarios while providing relatively significant performance improvements for sequential write operations and localized write operations. Furthermore, while the drive-assisted RAID storage techniques described herein require additional parity computations in order to perform a full-stripe write (e.g., as compared to RAID-controller-based or CPU-based full-stripe write operations), those additional parity computations are distributed across the RAID data storage devices rather than being centralized in the RAID controller or CPU.

Figure 6:
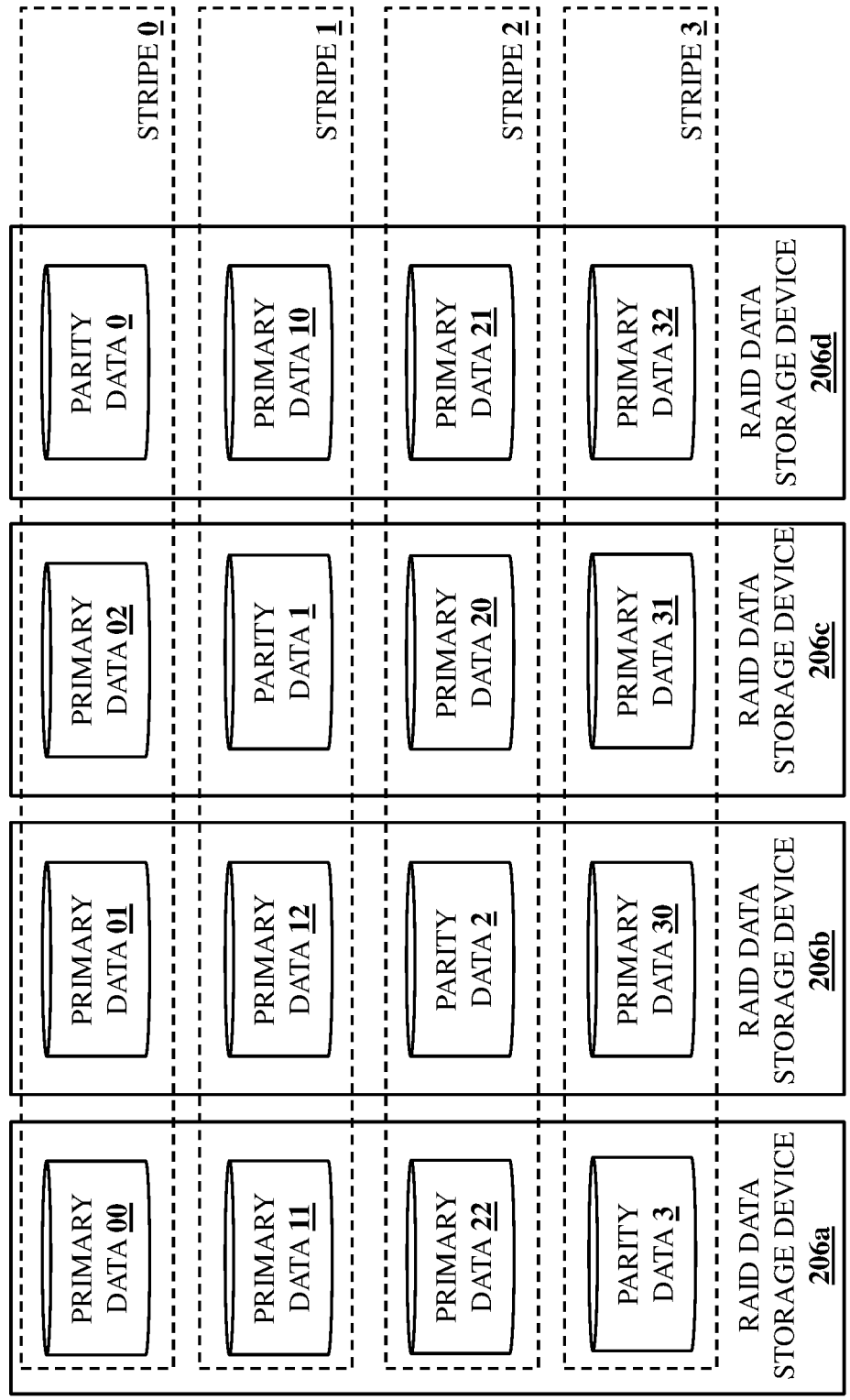
FIG. 6 is a schematic view illustrating an embodiment of the drive-assisted RAID storage system of FIG. 2 operating during the method of FIGS. 5A and 5B.

With reference to FIG. 6, an embodiment of the storage of primary data and parity data in the RAID storage system 200 is illustrated. In the simplified example below, the RAID storage system 200 includes only four RAID data storage devices, i.e., the RAID data storage devices 206a-206d, although one of skill in the art in possession of the present disclosure will recognize how the drive-assisted RAID storage techniques described herein may be utilized in RAID storage systems having any number of RAID storage devices. In the embodiment illustrated in FIG. 6, the RAID data storage devices 206a-206d in the RAID storage system 600 store stripes 0, 1, 2, and 3, with each stripe including a respective block (e.g., a 4 kB block) provided by each of the RAID data storage devices 206a-206d. In the example provided in FIG. 6, different data storage in each of the RAID data storage devices 206a-206d for the different data stripes 0-3 is identified by the identification of the type of primary data being stored (e.g., "PRIMARY DATA" or "PARITY DATA"), along with an element number that includes a first digit that identifies the data stripe (e.g., 0-3) to which that data belongs, and with the primary data including a second digit that identifies the portion of that primary data being stored.

As such, the stripe 0 is provided by the RAID data storage devices 206a-206d via a first "block" of primary data 00 stored in the RAID data storage device 206a, a second "block" of primary data 01 stored in the RAID data storage device 206b, a third "block" of primary data 02 stored in the RAID data storage device 206c, and a "block" of parity data 0 stored in the RAID data storage device 206d. Similarly, the stripe 1 is provided by the RAID data storage devices 206a-206d via a first "block" of primary data 10 stored in the RAID data storage device 206d, a second "block" of primary data 11 stored in the RAID data storage device 206a, a third "block" of primary data 12 stored in the RAID data storage device 206b, and a "block" of parity data 1 stored in the RAID data storage device 206c; the stripe 2 is provided by the RAID data storage devices 206a-206d via a first "block" of primary data 20 stored in the RAID data storage device 206c, a second "block" of primary data 21 stored in the RAID data storage device 206d, a third "block" of primary data 22 stored in the RAID data storage device 206a, and a "block" of parity data 2 stored in the RAID data storage device 206b; and the stripe 3 is provided by the RAID data storage devices 206a-206d via a first "block" of primary data 30 stored in the RAID data storage device 206b, a second "block" of primary data 31 stored in the RAID data storage device 206c, a third "block" of primary data 32 stored in the RAID data storage device 206d, and a "block" of parity data 3 stored in the RAID data storage device 206a.

However, while the example in FIG. 6 illustrates the parity data 0-3 for the different stripes 0-3 stored in different RAID data storage devices, one of skill in the art in possession of the present disclosure will appreciate how different parity data storage configurations (e.g., a single RAID data storage device storing the parity for each stripe) will fall within the scope of the present disclosure as well. Furthermore, one of skill in the art in possession of the present disclosure will appreciate that, while the example provided in FIG. 6 utilizes a RAID 5 level that includes a single block of parity data for each stripe, other RAID levels (e.g., a RAID 6 level that includes a pair of blocks of parity data for each stripe) will fall within the scope of the present disclosure as well. As such, while a specific configuration of primary data and parity data in stripes is illustrated and described, one of skill in the art in possession of the present disclosure will recognize that a variety of RAID data storage technique will benefit from the teachings of the present disclosure as thus are envisioned as falling within its scope.

Furthermore, the examples below describe a scenario in which the stripe 0 in FIG. 6 (which includes primary data stored on the RAID data storage devices 206a-206c and parity data storage on the RAID data storage device 206d) is updated. As such, those RAID data storage devices 206a-206d are referred to as the RAID "primary data" storage devices 206a, 206b, and 206c, and the RAID "parity data" storage device 206d, in the examples below. However, one of skill in the art in possession of the present disclosure will appreciate that any of the other stripes 1-3 may be updated in a similar manner while remaining within the scope of the present disclosure as well, and thus the designation of RAID data storage devices as "primary data" storage devices or "parity data" storage devices will change depending on how data for a stripe is stored in those RAID data storage devices.

Figure 7:
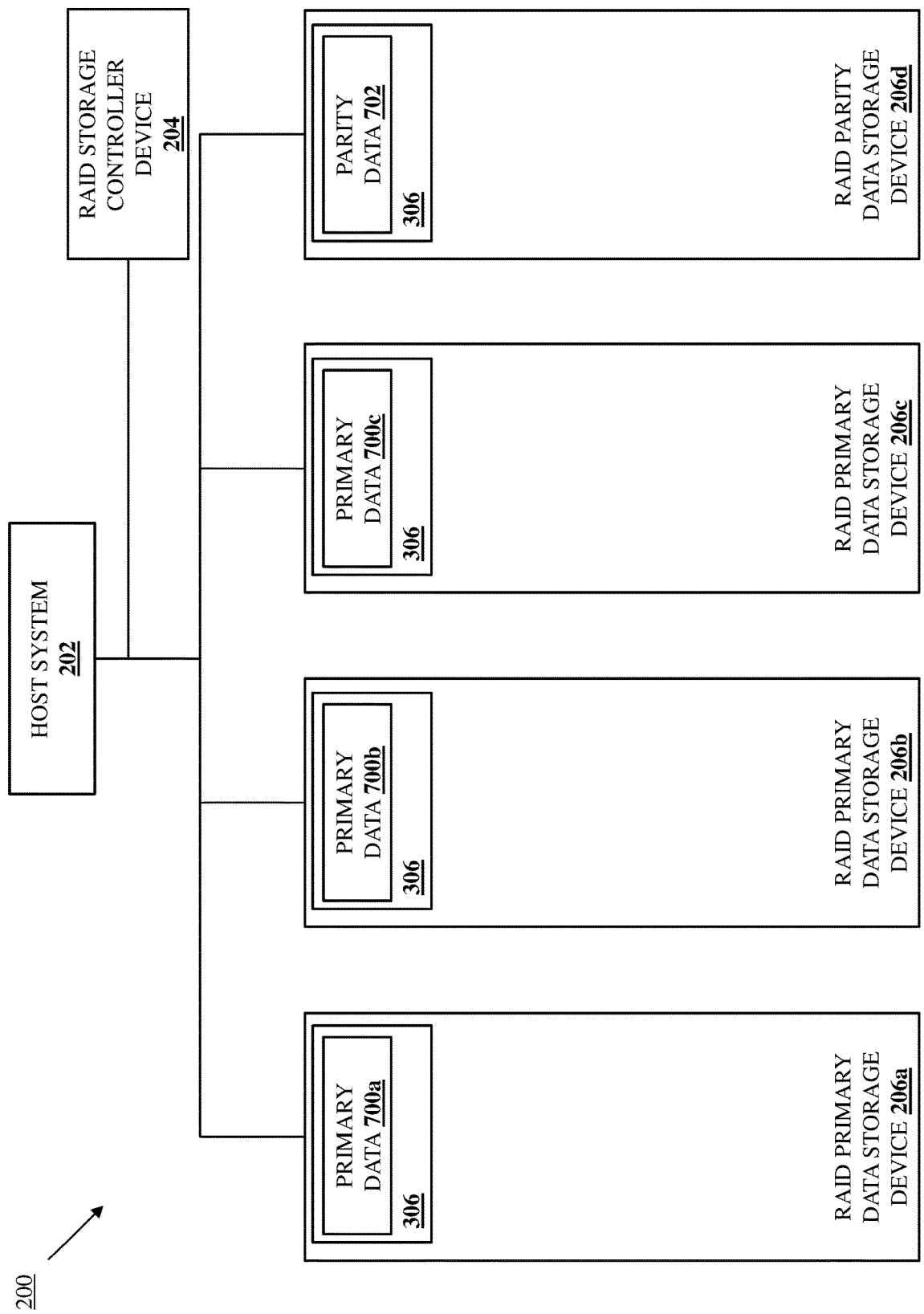
FIG. 7 is a schematic view illustrating an embodiment of the drive-assisted RAID storage system of FIG. 2 operating during the method of FIGS. 5A and 5B.

The method 500 begins at block 502 where a RAID storage controller device receives a primary data storage instruction from a host system. As discussed above, the example of the method 500 provided herein includes the RAID primary data storage devices 206a-206c storing primary data for a stripe, and the RAID parity data storage device 206d storing parity data for that stripe, and FIG. 7 illustrates the RAID primary data storage device 206a storing primary data 700a for a stripe in its storage system 306, the RAID primary data storage device 206b storing primary data 700b for the stripe in its storage system 306, the RAID primary data storage device 206c storing primary data 700c for the stripe in its storage system 306, and the RAID parity data storage device 206d storing parity data 702 for the stripe in its storage system 306.

Figure 8A:
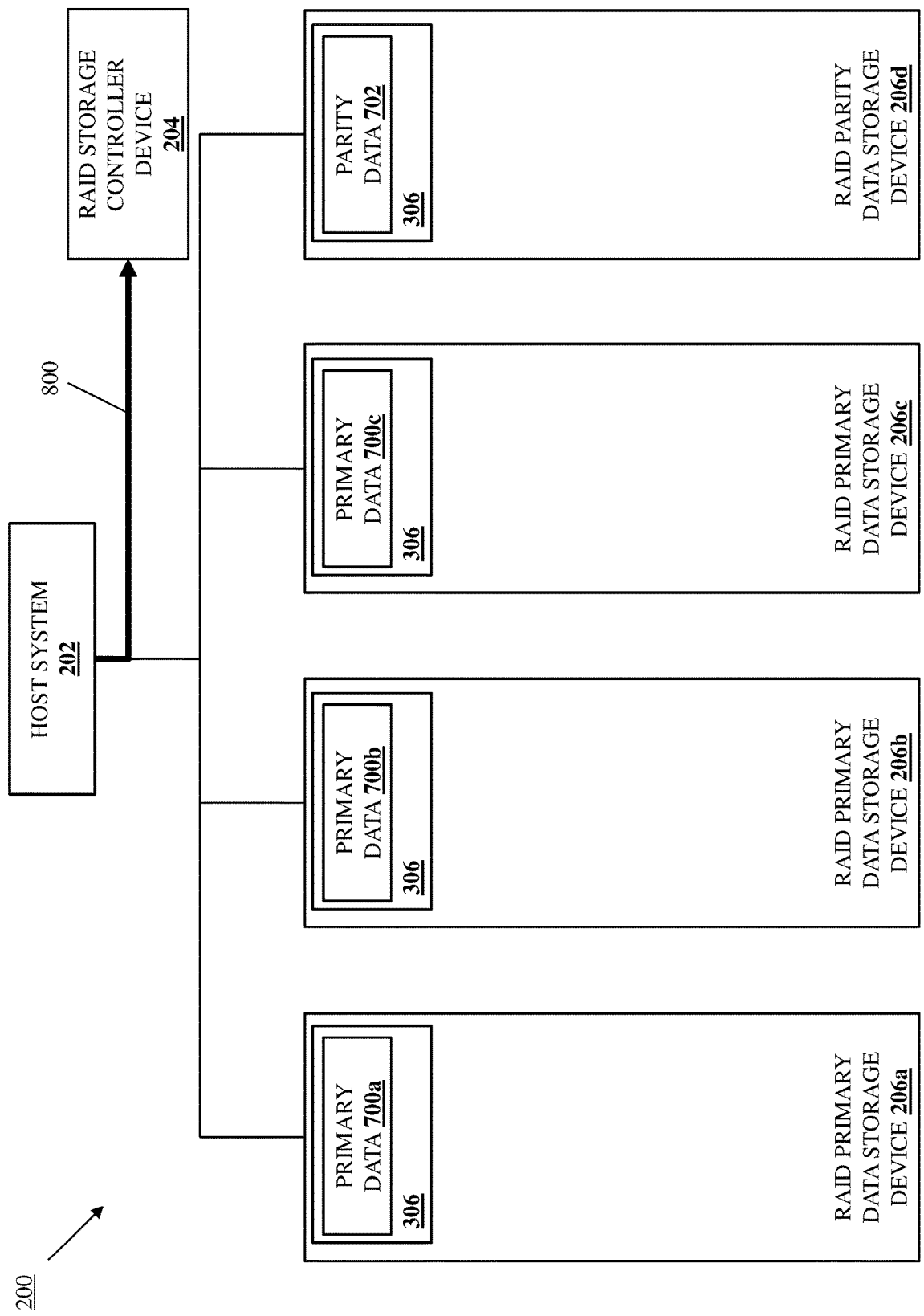
FIG. 8A is a schematic view illustrating an embodiment of the drive-assisted RAID storage system of FIG. 2 operating during the method of FIGS. 5A and 5B.

With reference to FIG. 8A, in an embodiment of block 502, the RAID storage controller device 204 may perform primary data storage instruction receiving operations 800 that include receiving an instruction from the host system 202 to store primary data, which as discussed below may be an update to one or more of the primary data 700a, 700b, and 700c stored in the RAID primary data storage devices 206a, 206b, and 206c, respectively. For example, the host system 202 may issue NVMe write command(s) directed to a logical volume to a submission queue (e.g., a namespace submission queue) in the communication system 408 in the RAID storage controller device 204/400, and may "ring" a "doorbell" in the RAID storage controller device 204. As will be appreciated by one of skill in the art in possession of the present disclosure, the host system 202 may issue write commands at a "block level", and thus may issues a respective write command for each block being updated in a stripe.

Figure 8B:
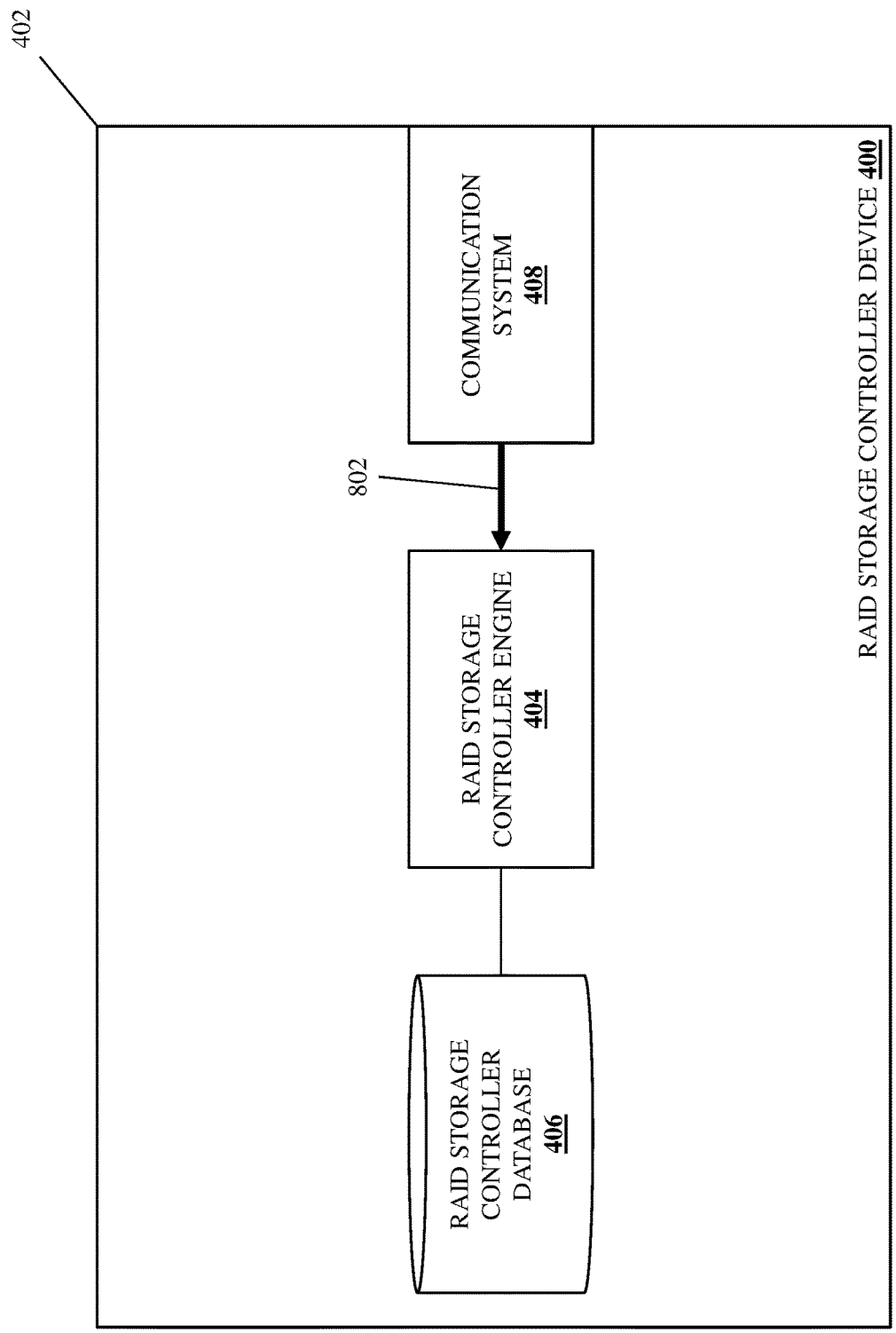
FIG. 8B is a schematic view illustrating an embodiment of the RAID storage controller device of FIG. 4 operating during the method of FIGS. 5A and 5B.

With reference to FIG. 8B, in response to the host system 202 ringing its doorbell, the RAID storage controller engine 404 in the RAID storage controller device 204/400 may perform write command retrieving operations 802 that include retrieving the write command(s) from its submission queue in the communication system 408, and identifying one or more blocks of a stripe to which it/they are directed. In the specific example below, the stripe update operates to update the primary data 700a, 700b, and 700c stored in each the RAID primary data storage devices 206a, 206b, and 206c, respectively, (i.e., a "full stripe write") but one of skill in the art in possession of the present disclosure will appreciate how the updating of fewer blocks (including a single block) of a stripe will fall within the scope of the present disclosure as well.

The method 500 then proceeds to decision block 504 where it is determined whether a stripe associated with the primary data is open. As discussed in further detail below, stripes provided by the RAID data storage devices 206a-206d may be considered "open" when one or more blocks in the stripe (e.g., the primary data 700a-700c and/or the parity data 700d) are being updated, and "closed" when no block in the stripe are being updated. In some embodiments, the RAID storage controller device 204/400 may include a stripe update table (e.g., stored in the RAID storage controller database 406 provided by a persistent memory/storage system) in which it tracks stripes that are open or otherwise being updated. In a specific example, the stripe update table may be a hash table that is configured to identify stripes via corresponding hash values produced by performing a hashing operation on a logical block number associated with the stripe, a physical block number associated with the stripe, and/or any other identifier for the stripe (e.g., any hashing operation configured to generate a pseudo-randomization of the stripe identifier) that would be apparent to one of skill in the art in possession of the present disclosure. However, while a specific stripe update tracking technique is described, one of skill in the art in possession of the present disclosure will appreciate how other stripe update tracking techniques will fall within the scope of the present disclosure as well.

Figure 8C:
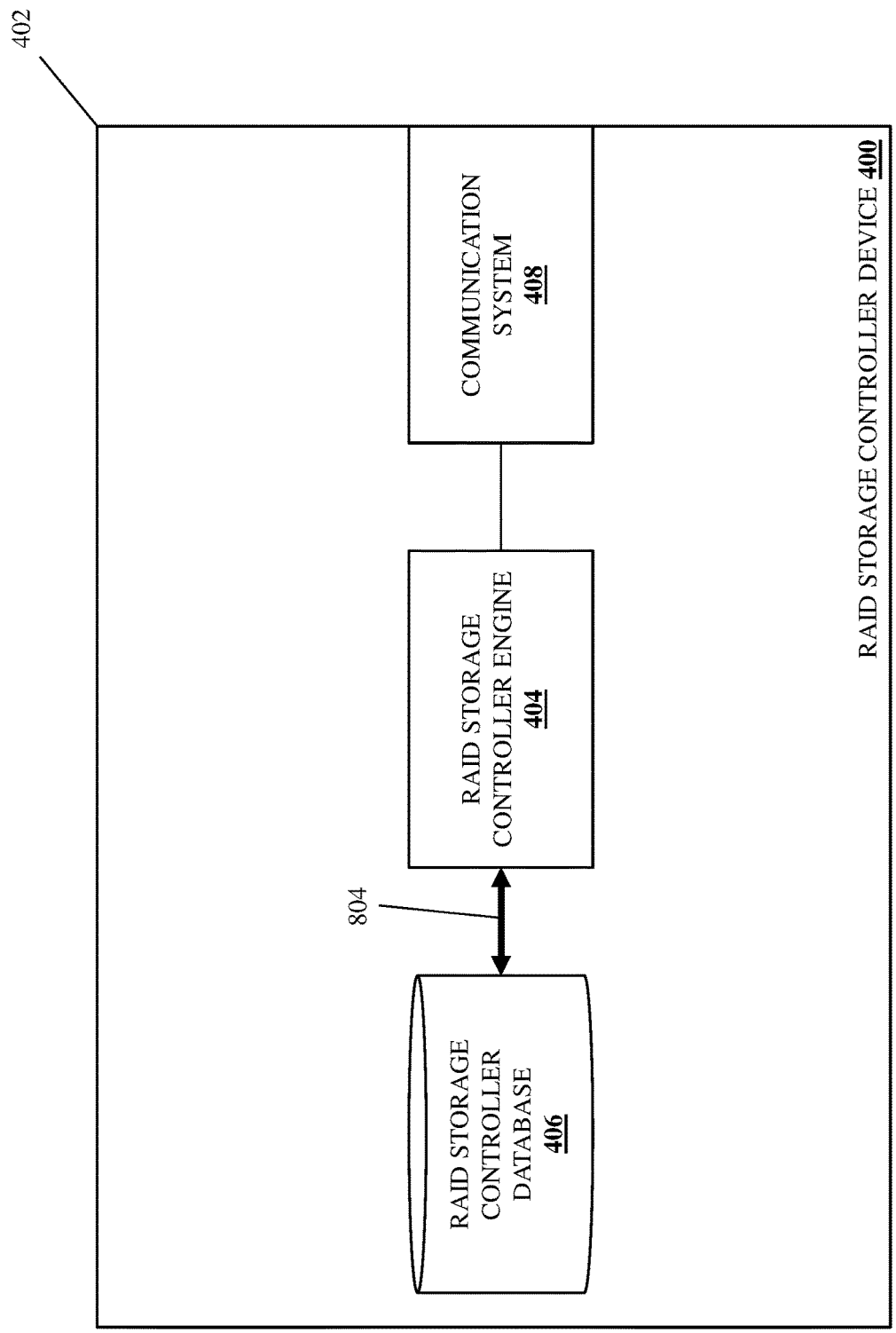
FIG. 8C is a schematic view illustrating an embodiment of the RAID storage controller device of FIG. 4 operating during the method of FIGS. 5A and 5B.

As such, with reference to FIG. 8C, in an embodiment of decision block 504, the RAID storage controller engine 404 in the RAID storage controller device 204/400 may perform stripe update determination operations 804 that include accessing the stripe update table in the RAID storage controller database 406 and determining whether the stripe that includes the block(s) identified in the write command received from the host system 202 is identified in the stripe update table. For example, the stripe update table may only identify stripes that are open or otherwise being updated, and thus the lack of an identifier for a stripe in the stripe update table will indicate that the stripe is closed or otherwise not currently being updated.

If, at decision block 504, it is determined that the stripe associated with the primary data is not open, the method 500 proceeds to block 506 where the RAID storage controller device initiates a stripe update. In an embodiment, at block 506 and in response to determining that the stripe that includes the block(s) identified in the write command received from the host system 202 is not identified in the stripe update table, the RAID storage controller engine 404 in the RAID storage controller device 204/400 may identify that stripe in the stripe update table by, for example, providing a stripe update identifier for that stripe (e.g., the hash value for that stripe as discussed above) in the strip update table, and in some embodiments providing a stripe update counter with a value of "1" for that stripe update identifier. As discussed below, some embodiments of the present disclosure may allow multiple write commands for the same block(s) in a stripe to be executed, in which case those different write commands/block updates may be tracked via the stripe update counter associated with the stripe update identifier for that stripe.

However, some embodiments of the present disclosure may only allow a single write command to any block in a stripe to be executed, in which case the strip update counters discussed above may not be used, and any write command received for a block in a stripe that is currently being updated may be "held" until the update of that stripe has been completed. As such, one of skill in the art in possession of the present disclosure will appreciate how embodiments of the present disclosure may revert to conventional drive-assisted-RAID techniques for single writes to a stripe (while also generating the stripe update table and sequence numbers discussed above), while when multiple writes to a stripe are provided in relatively rapid succession, the techniques of the present disclosure may be performed in order to speed up the resolution of the stripe and the resumption of reads to modified primary data/blocks in the stripe.

If, at decision block 504, it is determined that the stripe associated with the primary data is open, the method 500 proceeds to block 508 where the RAID storage controller device increments a stripe update. In an embodiment, at block 508 and in response to determining that the stripe that includes the block(s) identified in the write command received from the host system 202 is identified in the stripe update table, the RAID storage controller engine 404 in the RAID storage controller device 204/400 may increment the stripe update counter associated with the stripe update identifier for that stripe in the stripe update table (e.g., by incrementing the stripe update counter from a value of "1" to a value of "2"). As will be appreciated by one of skill in the art in possession of the present disclosure, the value in the stripe update counter may be provided in any associated control commands, messages, and/or other communications discussed below (e.g., a communication sent in response to a write command that caused the stripe update counter to be incremented from a value "1" to a value "2" may identify that stripe update counter value "2" in metadata included in that communication), and may be utilized to establish a correct ordering of parity data updates (discussed in further detail below) by the RAID parity data storage device 206d, as well as ensure the correct ordering of data updates to any block in a stripe (although such multiple block updates are expected to be a relatively uncommon occurrence).

Following block 506 or 508, the method 500 proceeds to block 510 where the RAID storage controller device provides primary data update commands with stripe update sequence identifiers to one or more RAID primary data storage devices. In an embodiment, at block 510, the RAID storage controller engine 404 in the RAID storage controller device 204/400 may generate primary data update commands for each of the RAID primary data storage devices 206a-206c that stores primary data being updated, and that may each include a "primary data update with interim parity update generation" command that identifies a location of "new" primary data (e.g., a PCIe memory address of the "new" primary data in the host system 202), identifies a location of "old" primary data (e.g., a Logical Block Address (LBA) of "old" primary data stored in the storage subsystem 306 in that RAID primary data storage device), identifies a buffer location (e.g., an offset of a target buffer in the second buffer subsystem 308b (e.g., a CMB) in that RAID primary data storage device), and includes a respective stripe update sequence identifier generated for that primary data update. Furthermore, one of skill in the art in possession of the present disclosure will appreciate how such primary data update commands may be generated multiple times as new writes are received for different blocks in the stripe.

As will be appreciated by one of skill in the art in possession of the present disclosure, updates of block(s) in a stripe may be provided in a sequence such that, for example, the update of a first block in the stripe may be first in the sequence, the update of a second block in the stripe may be second in the sequence, the update of a third block in the stripe may be third in the sequence, and so on. As such, for any write command received from the host system 202 and associated with a stripe, the RAID storage controller device 204 may generate primary data update commands to update corresponding blocks in that stripe, and may assign a corresponding stripe update sequence identifier to each of those primary data update commands (and provide those corresponding stripe update sequence identifiers in each of those primary data update commands). Furthermore, any stripe update sequence for a stripe may extend across multiple write commands from the host system 202 that update one or more blocks in the stripe multiple times, and that stripe update sequence may be defined by the order that updates are received by the RAID storage controller device 204 (e.g., rather than by the position of the blocks in the stripe). For example, a first set of write commands from the host system may provide first updates to blocks in the stripe (e.g., the primary data 700a, 700b, and 700c), and thus first primary update commands may be generated for those blocks in the stripe having stripe update sequence identifiers 1, 2, and 3, respectively. Subsequently, a second set of write commands from the host system may provide second updates to those blocks in the stripe, and thus second primary update commands may be generated for those blocks in the stripe having stripe update sequence identifiers 4, 5, and 6, respectively. However, while a few specific examples have been provided, one of skill in the art in possession of the present disclosure will appreciate how stripe update sequence identifiers may be provided for the primary data update commands in a variety of manners that will fall within the scope of the present disclosure as well.

Figure 9:
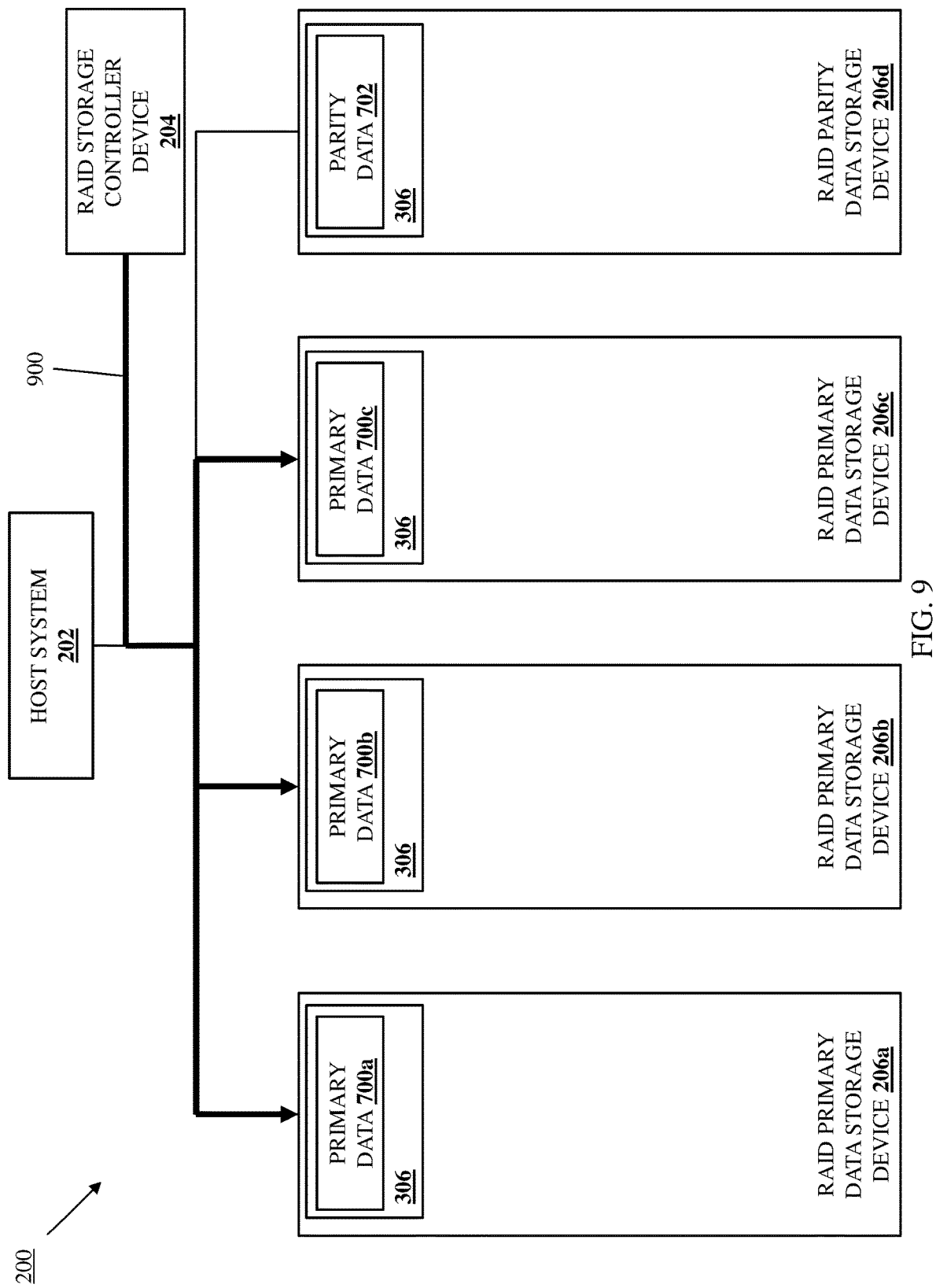
FIG. 9 is a schematic view illustrating an embodiment of the drive-assisted RAID storage system of FIG. 2 operating during the method of FIGS. 5A and 5B.

With reference to FIG. 9, in an embodiment of block 510, the RAID storage controller device 204 may perform primary data update command provisioning operations 900 that, in the illustrated embodiment, include providing the primary data update commands to each of the RAID primary data storage devices 206a, 206b, and 206c. In a specific example, the RAID storage controller engine 404 in the RAID storage controller device 204/400 may submit the respective primary data update commands in a submission queue in the communication system 310 in each of the RAID primary data storage devices 206a-206c/300, and may then ring a corresponding doorbell for each of those RAID primary data storage devices 206a-206c. As discussed above, the example provided herein includes the updating of primary data 700a, 700b, and 700c in each of the RAID primary data storage devices 206a, 206b, and 206c, respectively, but in embodiments in which subsets of blocks of a stripe are being updated, the primary data update commands may only be provided to the RAID data storage device(s) that store the primary data for those blocks.

The method 500 then proceeds to block 512 where the RAID primary data storage device(s) calculate interim parity data, update primary data, and send primary data update completion message(s) to the RAID storage controller device. In an embodiment, at block 512 and in response to the RAID storage controller device 204 ringing their doorbells as discussed above, each of the RAID primary data storage devices 206a-206c may retrieve the primary data update command from the submission queue in its communication system 310, retrieve "new" primary data identified in the primary data update command from the host system 202, calculate interim parity data using the "new" primary data and "old" primary data stored in its storage subsystem 306, and provide a primary update completion message to the RAID storage controller device 204.

Figure 10A:
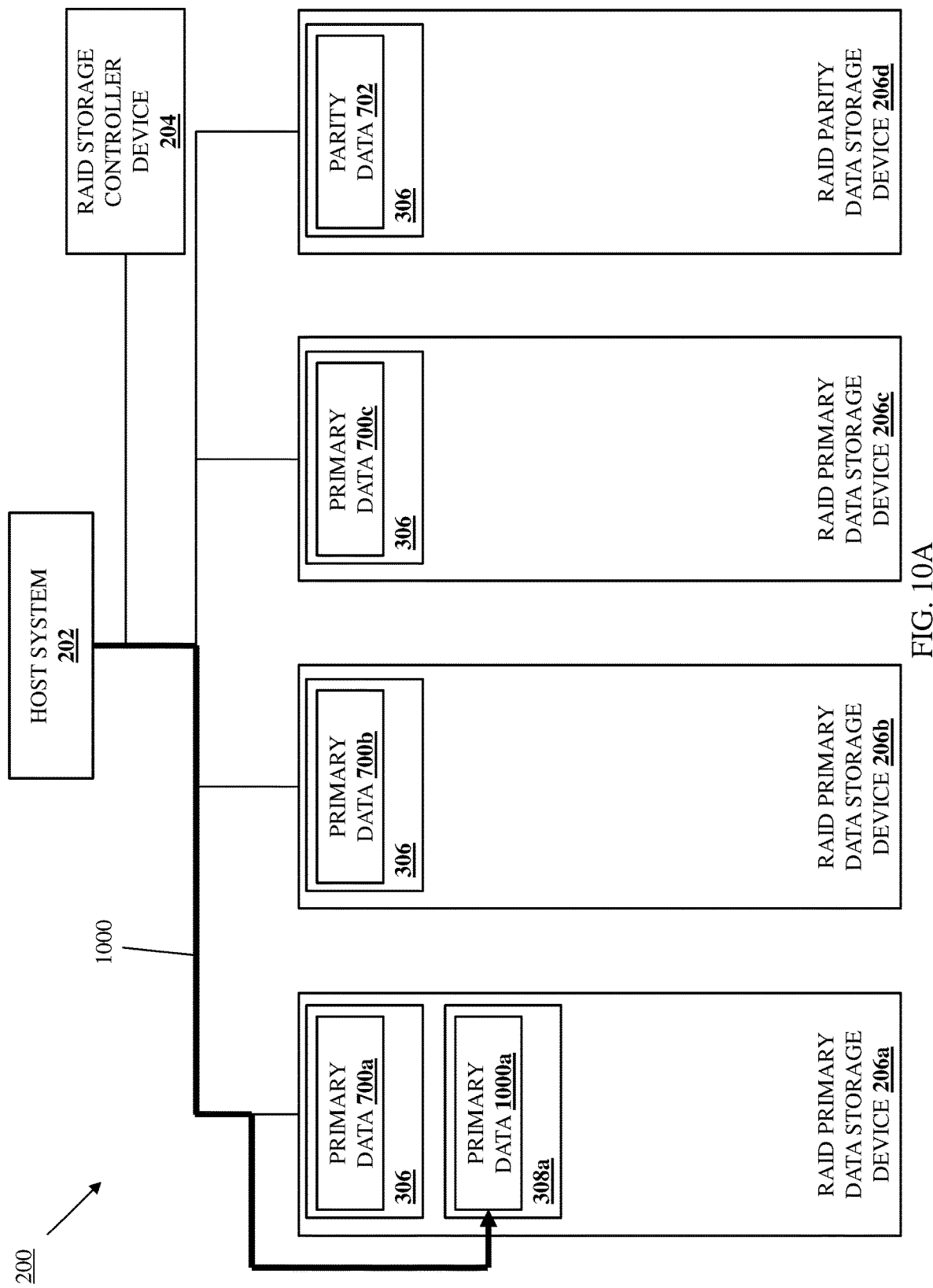
FIG. 10A is a schematic view illustrating an embodiment of the drive-assisted RAID storage system of FIG. 2 operating during the method of FIGS. 5A and 5B.
Figure 10B:
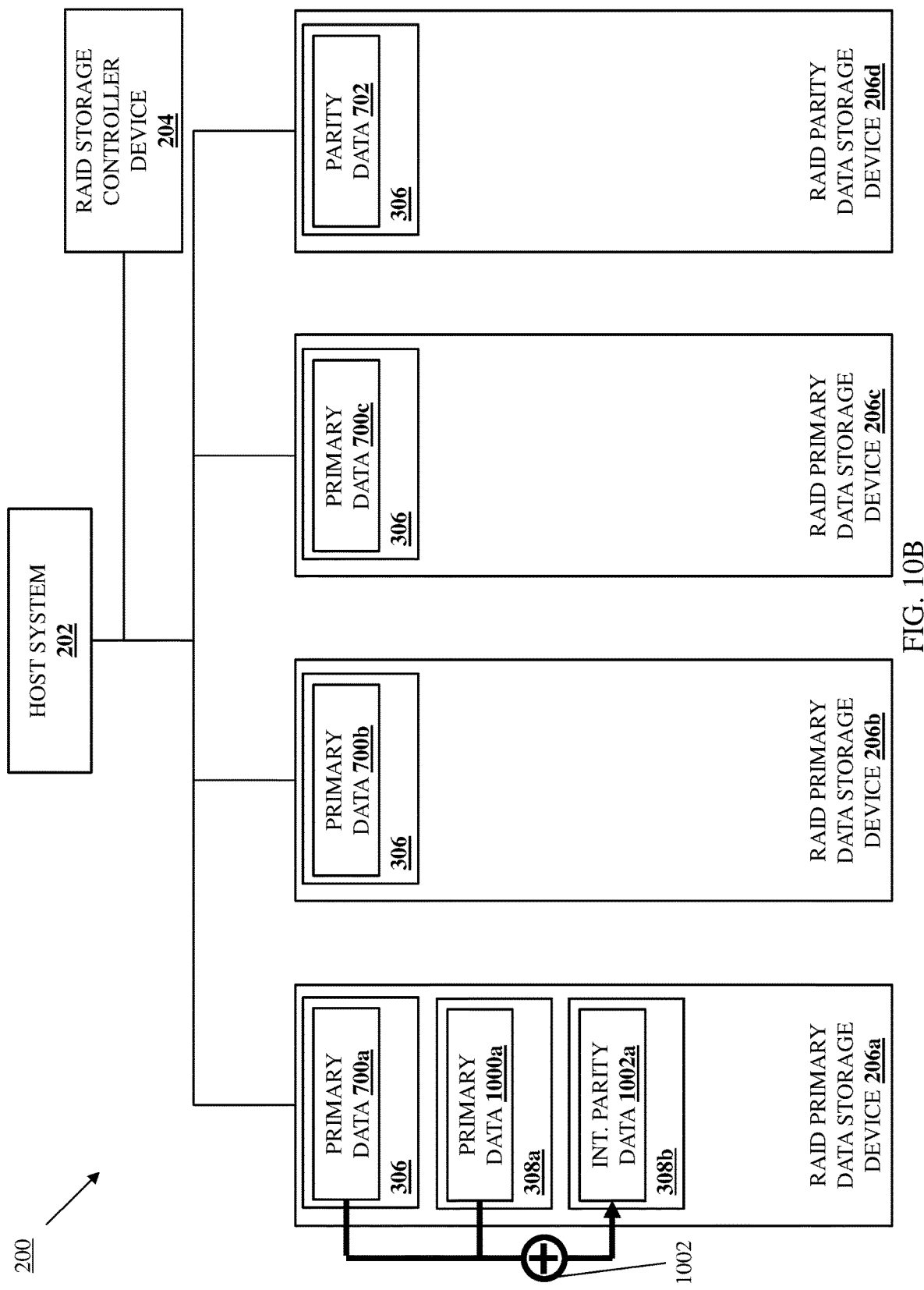
FIG. 10B is a schematic view illustrating an embodiment of the drive-assisted RAID storage system of FIG. 2 operating during the method of FIGS. 5A and 5B.

For example, with reference to FIG. 10A, at block 512 the RAID primary data storage device 206a may perform "new" primary data retrieval operations 1000 that include retrieving (e.g., via a DMA operation from a memory subsystem in the host system 202 identified in the primary data update command received from the RAID storage controller device 204) primary data 1000a and storing that primary data 1000a in its first buffer subsystem 308a (e.g., internal memory). With reference to FIG. 10B, at block 512 the RAID primary data storage device 206a may then perform interim parity data generation operations 1002 that include performing XOR operations (or other arithmetic) on the primary data 700a (i.e., "old" primary data) in its storage subsystem 306 and the primary data 1000a (i.e., "new" primary data) in its first buffer subsystem 308a to generate interim parity data 1002a, and storing that interim parity data 1002a in its second buffer subsystem 308b (e.g., a CMB). As will be appreciated by one of skill in the art in possession of the present disclosure, in some examples the RAID primary data storage device 206a may copy the primary data 700a from its storage subsystem 306 to its first buffer subsystem 308a in order to perform the XOR operations discussed above. In an embodiment, the RAID primary data storage device 206a may provide the stripe update sequence identifier (e.g. "1" in this example), which was received in the primary data update command from the RAID storage controller device 204 at block 510, in the interim parity data 1002a (e.g., in a header or other metadata included with the interim parity data 1002a).

As will be appreciated by one of skill in the art in possession of the present disclosure, in situations in which the primary data 700a (i.e., "old" primary data") is being updated for the first time as part of a stripe update, that primary data 700a will be located in the storage subsystem 306 and may be copied to the first buffer subsystem 308a as discussed above in order to perform the XOR operations. As such, in situations in which the block that includes the primary data 700a is being updated a second or subsequent time as part of a stripe update, that primary data 700a may already be located in the first buffer subsystem 308a. Furthermore, while this example describes the calculation of interim parity data for a RAID 5 level/single parity update (e.g., via XOR operations), one of skill in the art in possession of the present disclosure will appreciate how a RAID 6 level/dual parity update will include a second calculation of "Q data" in addition to the parity data (e.g., via an XOR operation and a multiplication/summation in a Galois field).

Figure 10C:
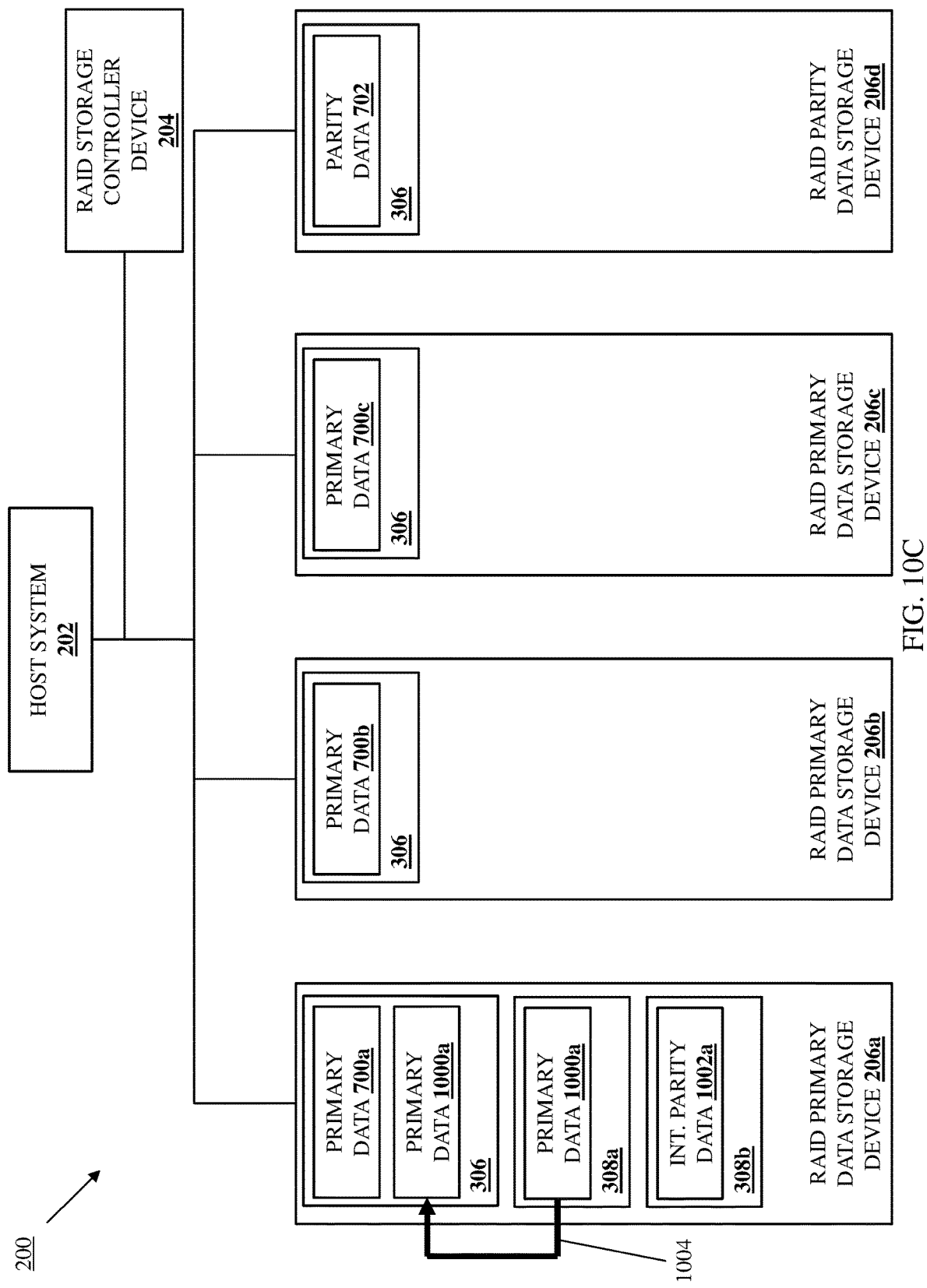
FIG. 10C is a schematic view illustrating an embodiment of the drive-assisted RAID storage system of FIG. 2 operating during the method of FIGS. 5A and 5B.
Figure 10D:
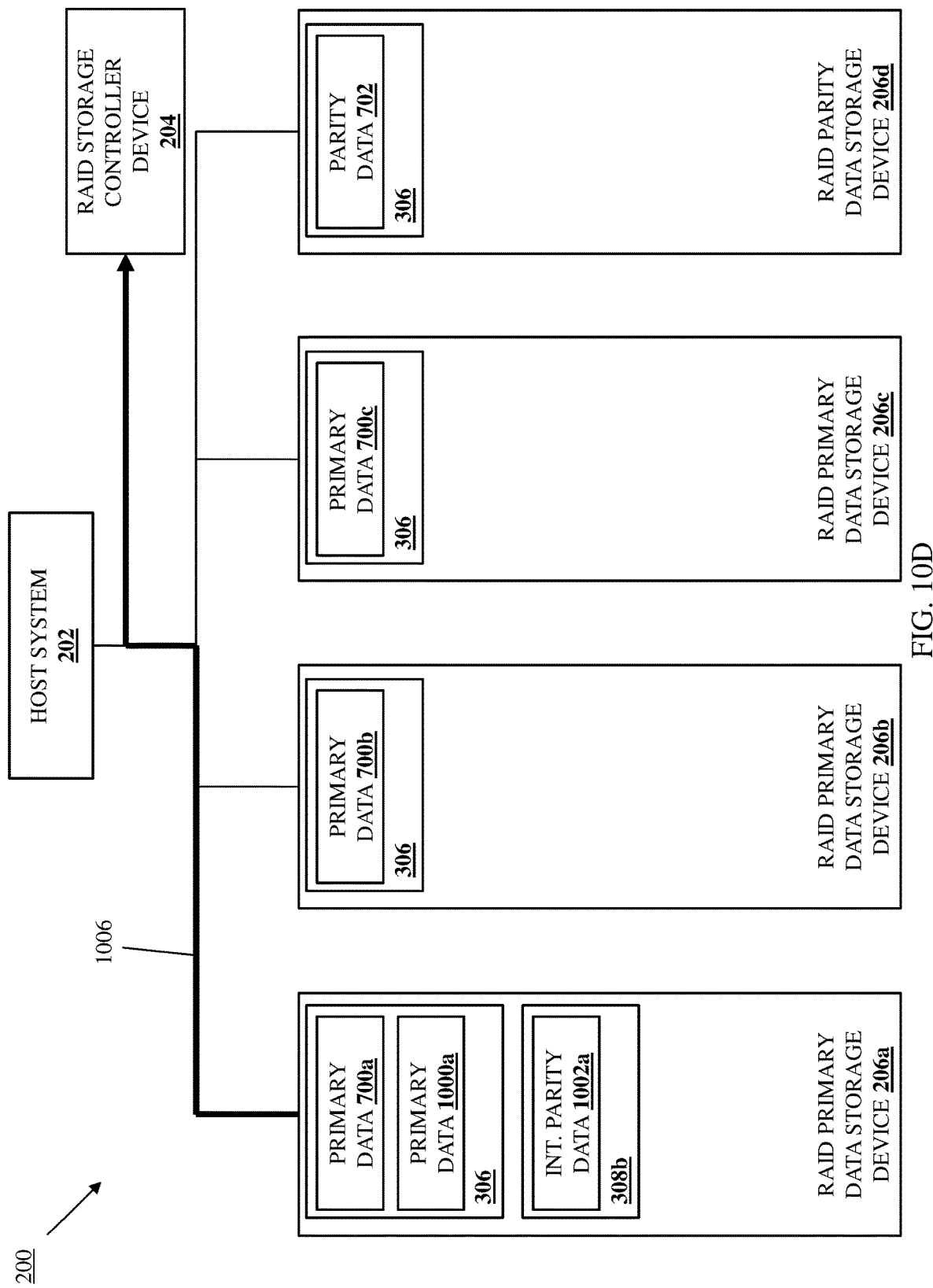
FIG. 10D is a schematic view illustrating an embodiment of the drive-assisted RAID storage system of FIG. 2 operating during the method of FIGS. 5A and 5B.

With reference to FIG. 10C, in some embodiments of block 512, the RAID primary data storage device 206a may then perform primary data storage operations 1004 that include storing the primary data 1000a (i.e., "new" primary data) in the storage subsystem 306, while not overwriting the primary data 700a (i.e., "old" primary data). However, in other embodiments, the primary data 1000a may remain in the first buffer subsystem 308a until the stripe update completion message (discussed in further detail below) is received from the RAID storage controller device 204. With reference to FIG. 10D, at block 512 the RAID primary data storage device 206a may then perform primary data update completion message provisioning operations 1006 that include providing a primary data update completion message to the RAID storage controller device 204. For example, the RAID primary data storage device 206a/300 may write a primary data update completion message to a completion queue in its communication system 310, and then generate an interrupt to the RAID storage controller device 204 that includes the stripe update sequence identifier (e.g., "1" in this example) that was included in the primary data update command received from the RAID storage controller device 204 at block 510.

Figure 11A:
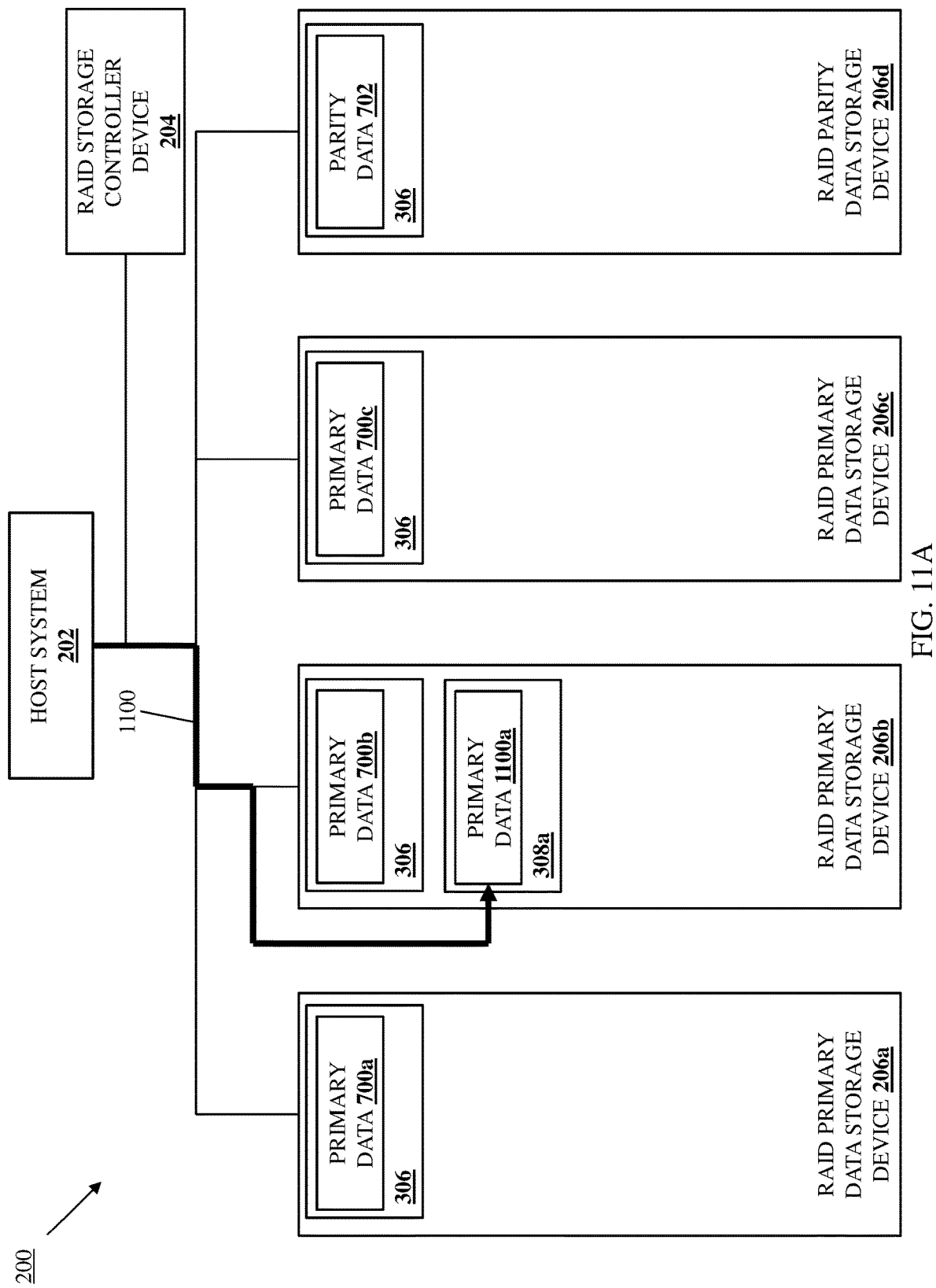
FIG. 11A is a schematic view illustrating an embodiment of the drive-assisted RAID storage system of FIG. 2 operating during the method of FIGS. 5A and 5B.
Figure 11B:
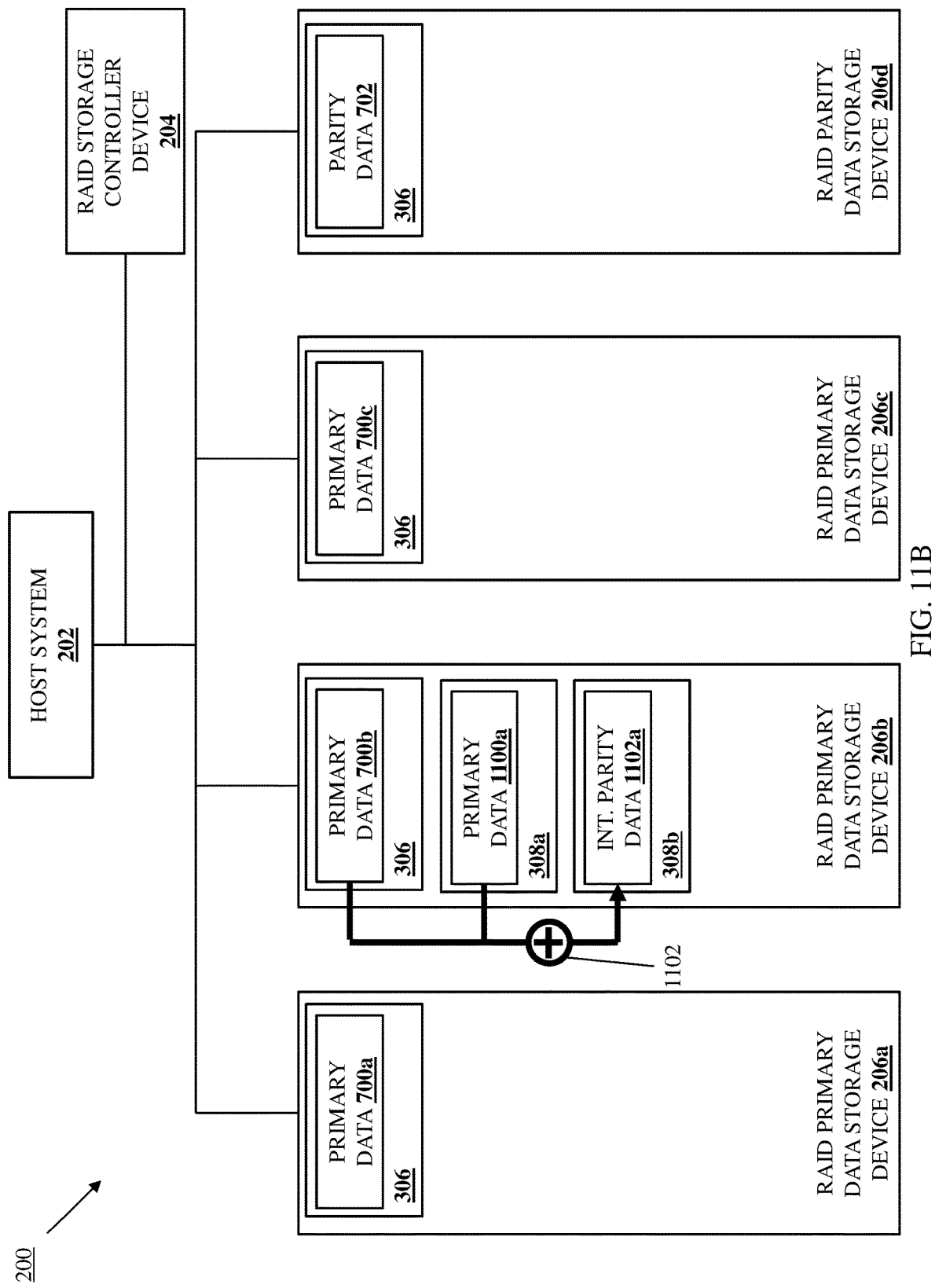
FIG. 11B is a schematic view illustrating an embodiment of the drive-assisted RAID storage system of FIG. 2 operating during the method of FIGS. 5A and 5B.

In another example, with reference to FIG. 11A, at block 512 the RAID primary data storage device 206b may perform "new" primary data retrieval operations 1100 that include retrieving (e.g., via a DMA operation from a memory subsystem in the host system 202 identified in the primary data update command received from the RAID storage controller device 204) primary data 1100a and storing that primary data 1100a in its first buffer subsystem 308a (e.g., internal memory). With reference to FIG. 11B, at block 512 the RAID primary data storage device 206b may then perform interim parity data generation operations 1102 that include performing XOR operations (or other arithmetic) on the primary data 700b (i.e., "old" primary data) in its storage subsystem 306 and the primary data 1100a (i.e., "new" primary data) in its first buffer subsystem 308a to generate interim parity data 1102a, and storing that interim parity data 1102a in its second buffer subsystem 308b (e.g., a CMB). As will be appreciated by one of skill in the art in possession of the present disclosure, in some examples the RAID primary data storage device 206b may copy the primary data 700b from its storage subsystem 306 to its first buffer subsystem 308a in order to perform the XOR operations discussed above. In an embodiment, the RAID primary data storage device 206b may provide the stripe update sequence identifier (e.g. "2" in this example), which was received in the primary data update command from the RAID storage controller device 204 at block 510, in the interim parity data 1102a (e.g., in a header or other metadata included with the interim parity data 1102a).

As will be appreciated by one of skill in the art in possession of the present disclosure, in situations in which the primary data 700b (i.e., "old" primary data") is being updated for the first time as part of a stripe update, that primary data 700b will be located in the storage subsystem 306 and may be copied to the first buffer subsystem 308a as discussed above in order to perform the XOR operations. As such, in situations in which the block that includes the primary data 700b is being updated a second or subsequent time as part of a stripe update, that primary data 700b may already be located in the first buffer subsystem 308a. Furthermore, while this example illustrates the calculation of interim parity data for a RAID 5 level/single parity update, one of skill in the art in possession of the present disclosure will appreciate how a RAID 6 level/dual parity update will include a second calculation of "Q data" in addition to the parity data (e.g., via an XOR operation and a multiplication/summation in a Galois field).

Figure 11C:
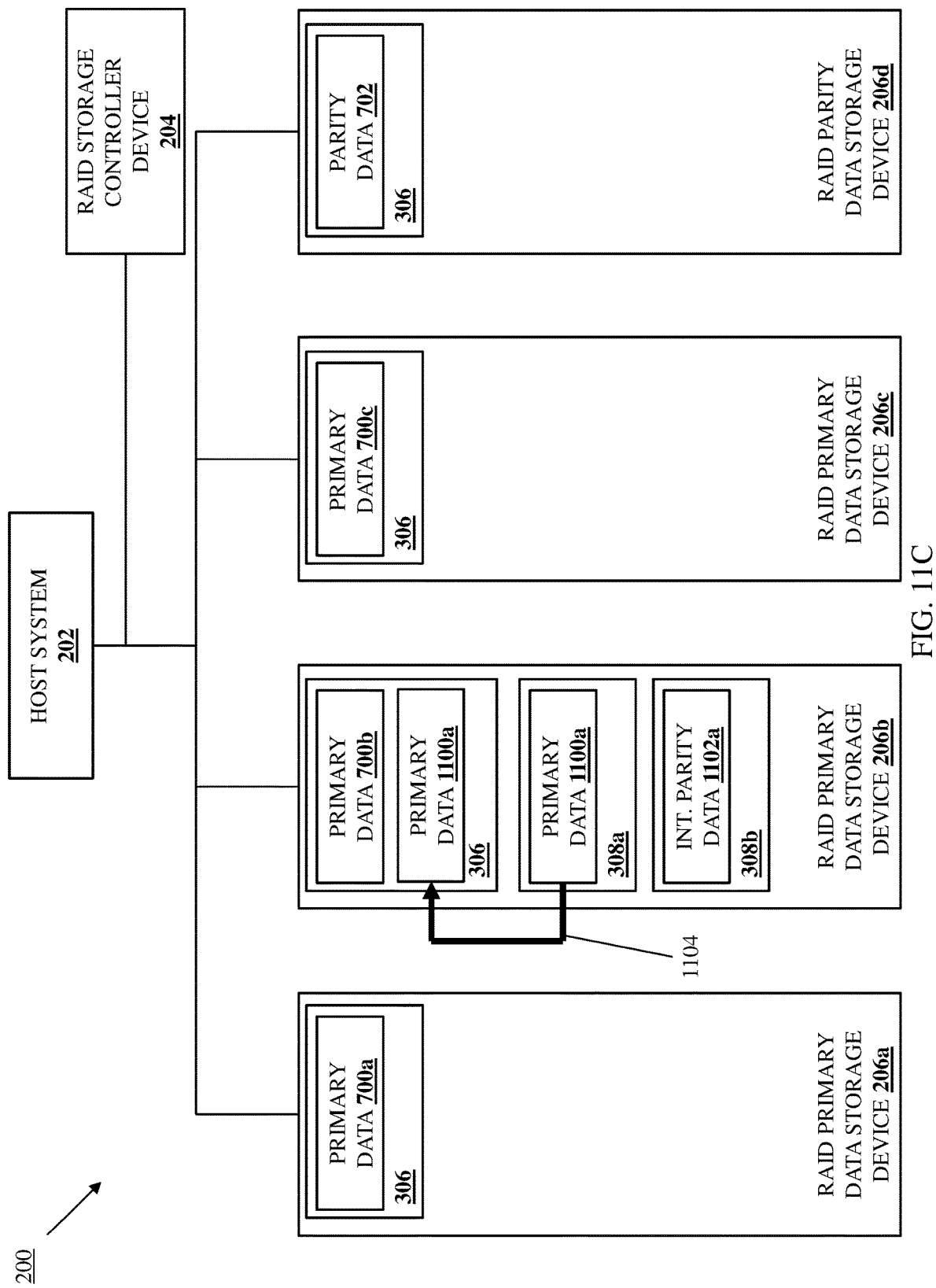
FIG. 11C is a schematic view illustrating an embodiment of the drive-assisted RAID storage system of FIG. 2 operating during the method of FIGS. 5A and 5B.
Figure 11D:
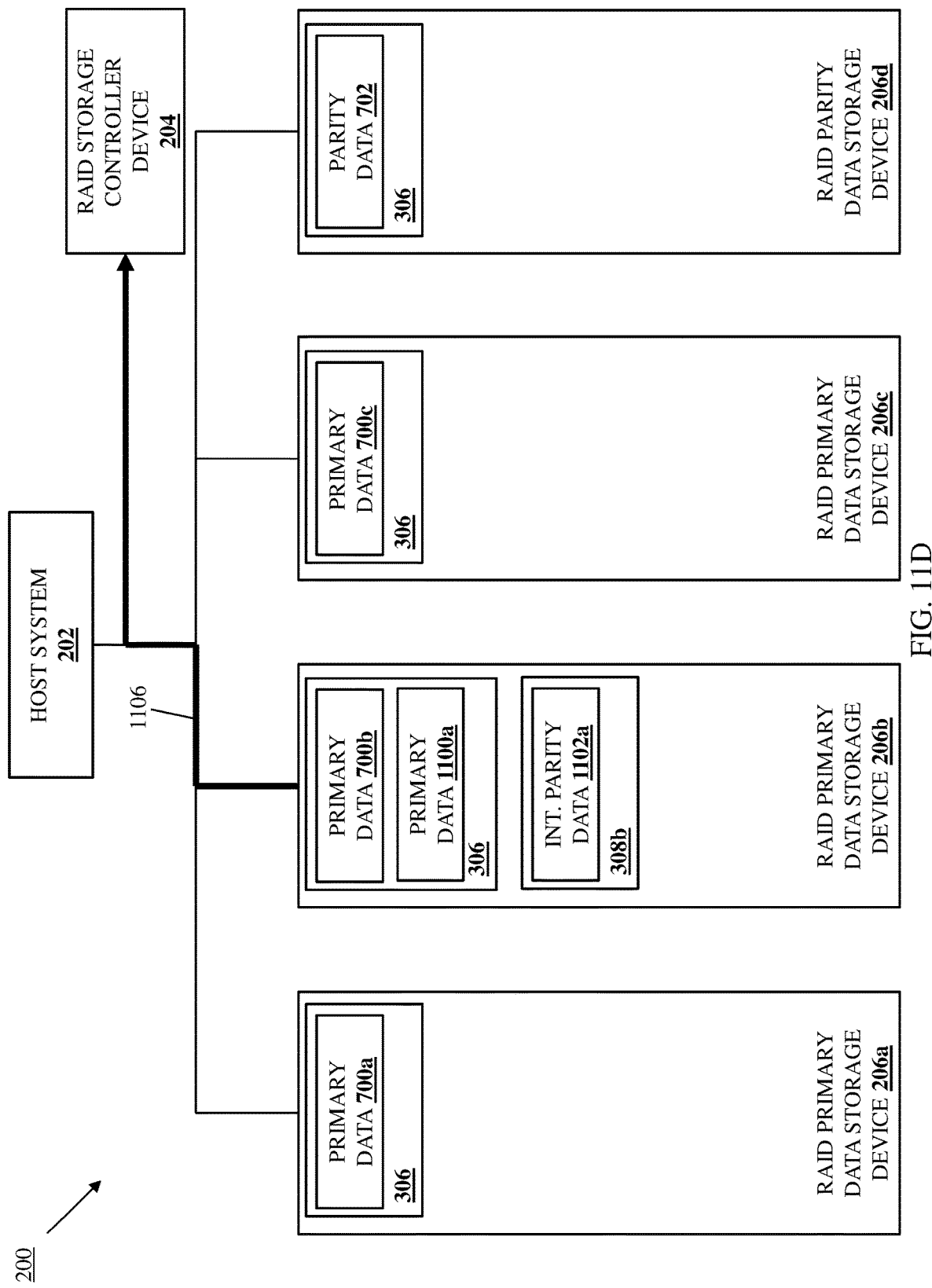
FIG. 11D is a schematic view illustrating an embodiment of the drive-assisted RAID storage system of FIG. 2 operating during the method of FIGS. 5A and 5B.

With reference to FIG. 11C, in some embodiments of block 512, the RAID primary data storage device 206b may then perform primary data storage operations 1104 that include storing the primary data 1100a (i.e., "new" primary data) in the storage subsystem 306, while not overwriting the primary data 700b (i.e., "old" primary data). However, in other embodiments, the primary data 1100a may remain in the first buffer subsystem 308a until the stripe update completion message (discussed in further detail below) is received from the RAID storage controller device 204. With reference to FIG. 11D, at block 512 the RAID primary data storage device 206b may then perform primary data update completion message provisioning operations 1106 that include providing a primary data update completion message to the RAID storage controller device 204. For example, the RAID primary data storage device 206b/300 may write a primary data update completion message to a completion queue in its communication system 310, and then generate an interrupt to the RAID storage controller device 204 that includes the stripe update sequence identifier (e.g., "2" in this example) that was included in the primary data update command received from the RAID storage controller device 204 at block 510.

Figure 12A:
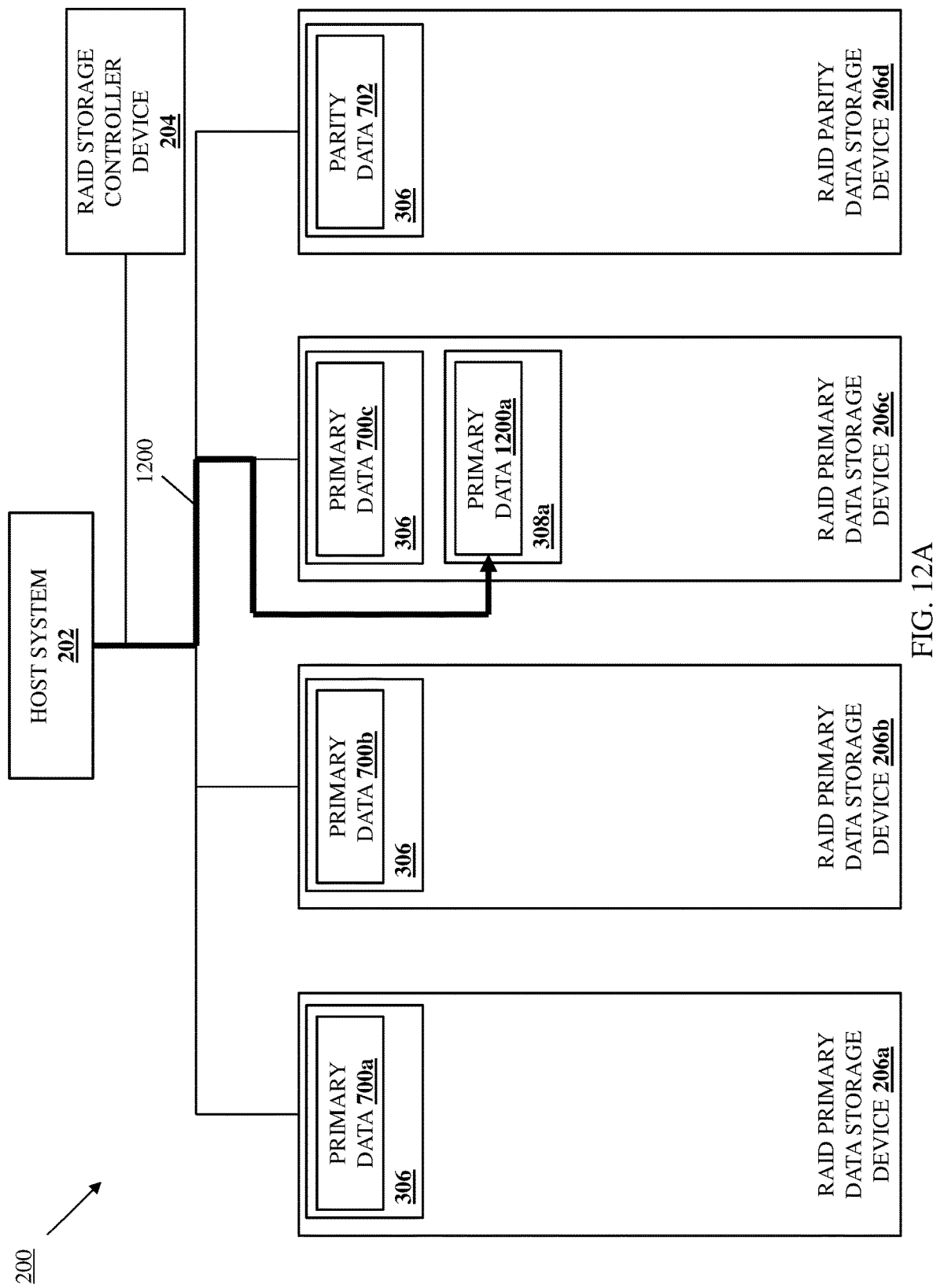
FIG. 12A is a schematic view illustrating an embodiment of the drive-assisted RAID storage system of FIG. 2 operating during the method of FIGS. 5A and 5B.
Figure 12B:
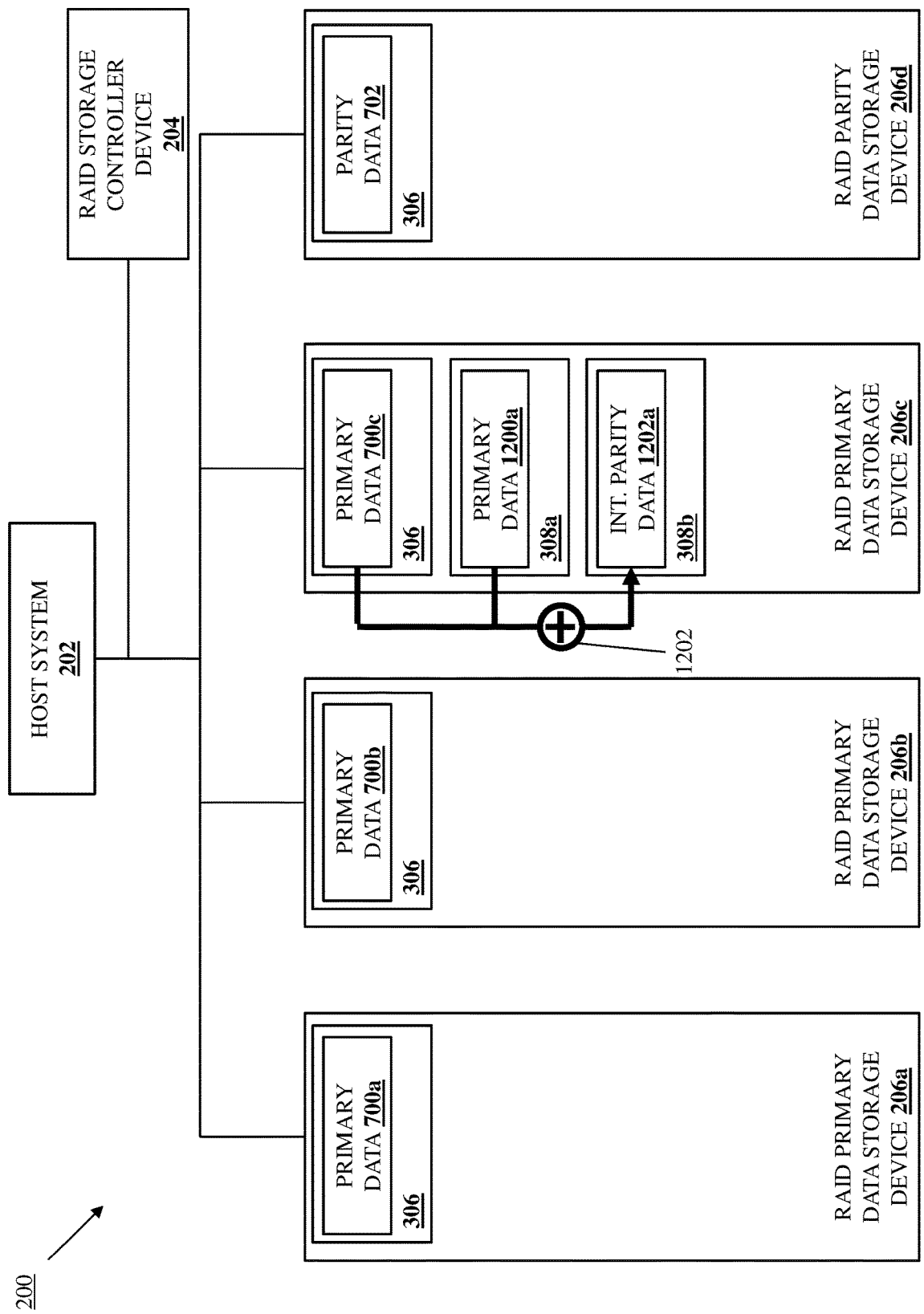
FIG. 12B is a schematic view illustrating an embodiment of the drive-assisted RAID storage system of FIG. 2 operating during the method of FIGS. 5A and 5B.

In another example, with reference to FIG. 12A, at block 512 the RAID primary data storage device 206c may perform "new" primary data retrieval operations 1200 that include retrieving (e.g., via a DMA operation from a memory subsystem in the host system 202 identified in the primary data update command received from the RAID storage controller device 204) primary data 1200a and storing that primary data 1200a in its first buffer subsystem 308a (e.g., internal memory). With reference to FIG. 12B, at block 512 the RAID primary data storage device 206c may then perform interim parity data generation operations 1202 that include performing XOR operations (or other arithmetic) on the primary data 700c (i.e., "old" primary data) in its storage subsystem 306 and the primary data 1200a (i.e., "new" primary data) in its first buffer subsystem 308a to generate interim parity data 1202a, and storing that interim parity data 1202a in its second buffer subsystem 308b (e.g., a CMB). As will be appreciated by one of skill in the art in possession of the present disclosure, in some examples the RAID primary data storage device 206c may copy the primary data 700c from its storage subsystem 306 to its first buffer subsystem 308a in order to perform the XOR operations discussed above. In an embodiment, the RAID primary data storage device 206c may provide the stripe update sequence identifier (e.g. "3" in this example), which was received in the primary data update command from the RAID storage controller device 204 at block 510, in the interim parity data 1202a (e.g., in a header or other metadata included with the interim parity data 1202a).

As will be appreciated by one of skill in the art in possession of the present disclosure, in situations in which the primary data 700c (i.e., "old" primary data") is being updated for the first time as part of a stripe update, that primary data 700c will be located in the storage subsystem 306 and may be copied to the first buffer subsystem 308a as discussed above in order to perform the XOR operations. As such, in situations in which the block that includes the primary data 700c is being updated a second or subsequent time as part of a stripe update, that primary data 700c may already be located in the first buffer subsystem 308a. Furthermore, while this example illustrates the calculation of interim parity data for a RAID 5 level/single parity update, one of skill in the art in possession of the present disclosure will appreciate how a RAID 6 level/dual parity update will include a second calculation of "Q data" in addition to the parity data (e.g., via an XOR operation and a multiplication/summation in a Galois field).

Figure 12C:
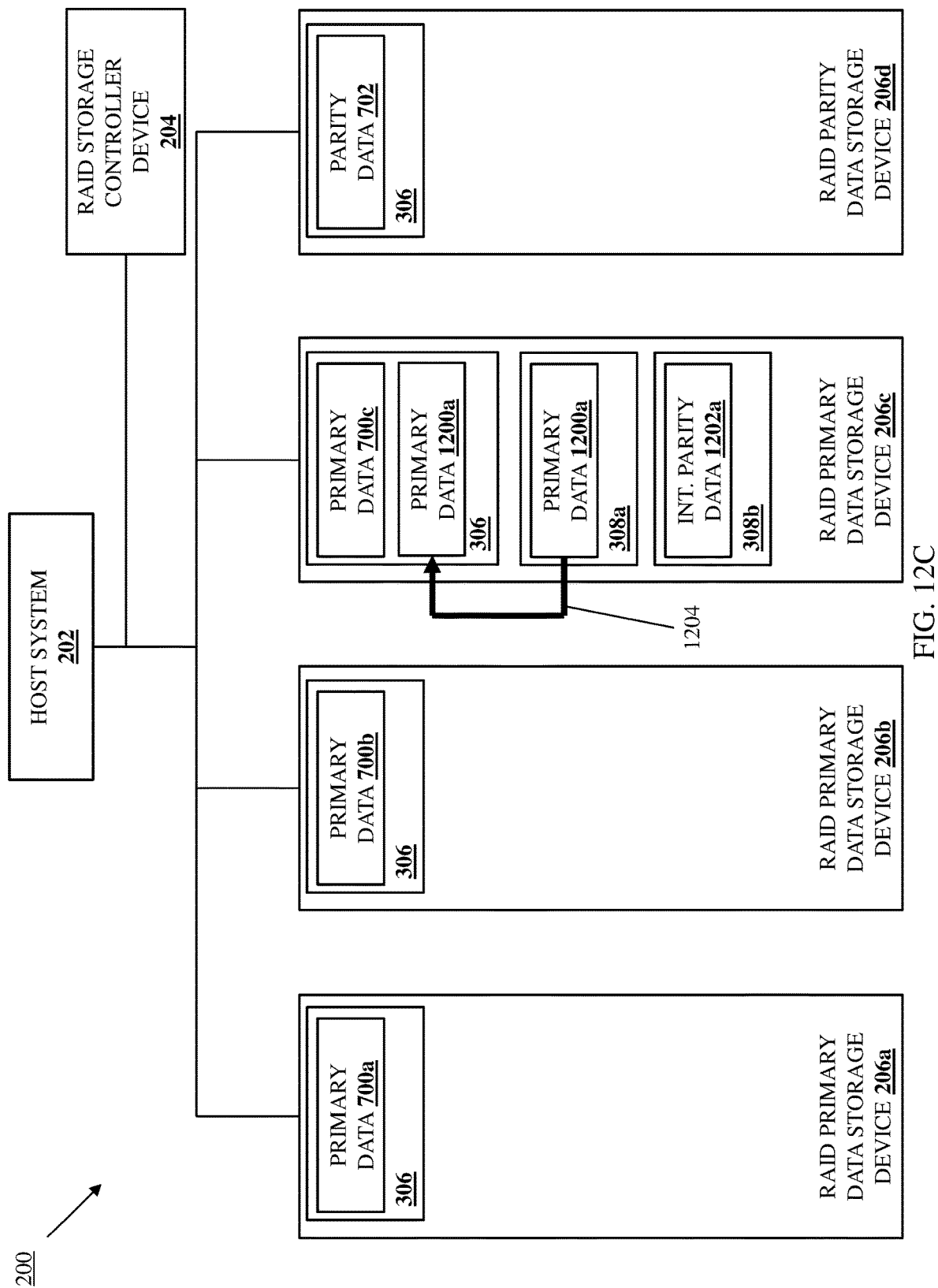
FIG. 12C is a schematic view illustrating an embodiment of the drive-assisted RAID storage system of FIG. 2 operating during the method of FIGS. 5A and 5B.
Figure 12D:
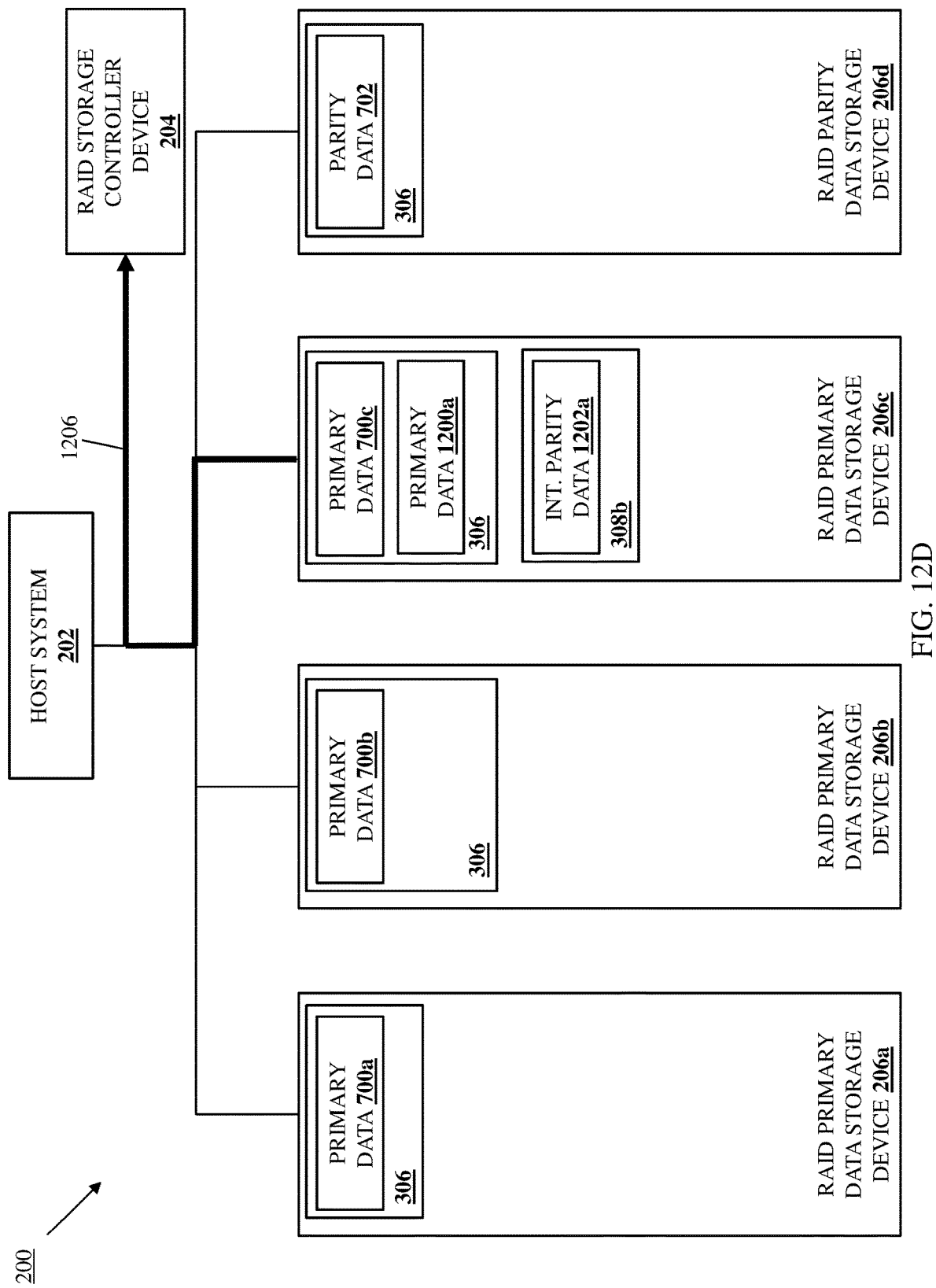
FIG. 12D is a schematic view illustrating an embodiment of the drive-assisted RAID storage system of FIG. 2 operating during the method of FIGS. 5A and 5B.

With reference to FIG. 12C, in some embodiments of block 512, the RAID primary data storage device 206c may then perform primary data storage operations 1204 that include storing the primary data 1200a (i.e., "new" primary data) in the storage subsystem 306, while not overwriting the primary data 700c (i.e., "old" primary data). However, in other embodiments, the primary data 1200a may remain in the first buffer subsystem 308a until the stripe update completion message (discussed in further detail below) is received from the RAID storage controller device 204. With reference to FIG. 12D, at block 512 the RAID primary data storage device 206c may then perform primary data update completion message provisioning operations 1206 that include providing a primary data update completion message to the RAID storage controller device 204. For example, the RAID primary data storage device 206c/300 may write a primary data update completion message to a completion queue in its communication system 310, and then generate an interrupt to the RAID storage controller device 204 that includes the stripe update sequence identifier (e.g., "3" in this example) that was included in the primary data update command received from the RAID storage controller device 204 at block 510.

As discussed in further detail below, the sending of completion messages from the RAID primary data storage devices 206a-206c to the RAID storage controller device 204 may allow the RAID storage controller device 204 to schedule transfer of interim parity data to the RAID parity data storage device 206d. However, one of skill in the art in possession of the present disclosure will recognize how the interim parity data discussed below may be sent directly by the RAID primary data storage devices 206a-206c to the RAID parity data storage device 206d, or how the RAID parity data storage device 206d may retrieve the interim parity data discussed below directly from the RAID primary data storage devices 206a-206c (e.g., via DMA operations similar to those described herein), and thus the interim parity data transfer described below may not require intervention from the RAID storage controller device 204. As discussed below, in such scenarios the RAID parity data storage device 206d may inform the RAID storage controller device 204 when it has completed a contiguous number of interim parity data updates to update parity data for a stripe (or if it times out waiting for an interim parity data update to fill a gap in the incontiguous range it has received).

As discussed above, while the RAID primary data storage devices 206a-206c are illustrated and described as receiving and responding to the primary data update commands from the RAID storage controller device 204 in order (i.e., with the RAID primary data storage device 206a receiving the primary data update command with the stripe update sequence identifier "1" and performing the operations discussed above before providing a primary data update completion message for the RAID storage controller device 204, followed by the RAID primary data storage device 206b receiving the primary data update command with the stripe update sequence identifier "2" and performing the operations discussed above before providing a primary data update completion message for the RAID storage controller device 204, followed by the RAID primary data storage device 206c receiving the primary data update command with the stripe update sequence identifier "3" and performing the operations discussed above before providing a primary data update completion message for the RAID storage controller device 204), one of skill in the art in possession of the present disclosure will appreciate how the RAID primary data storage devices 206a-206c may respond to the primary data update commands "out of order" or otherwise not following the numerical order of the stripe update sequence identifiers (e.g., with the RAID primary data storage device 206c receiving the primary data update command with the stripe update sequence identifier "3" and performing the operations discussed above before providing a primary data update completion message for the RAID storage controller device 204, followed by RAID primary data storage device 206a receiving the primary data update command with the stripe update sequence identifier "1" and performing the operations discussed above before providing a primary data update completion message for the RAID storage controller device 204, followed by the RAID primary data storage device 206b receiving the primary data update command with the stripe update sequence identifier "2" and performing the operations discussed above before providing a primary data update completion message for the RAID storage controller device 204).

Figure 13:
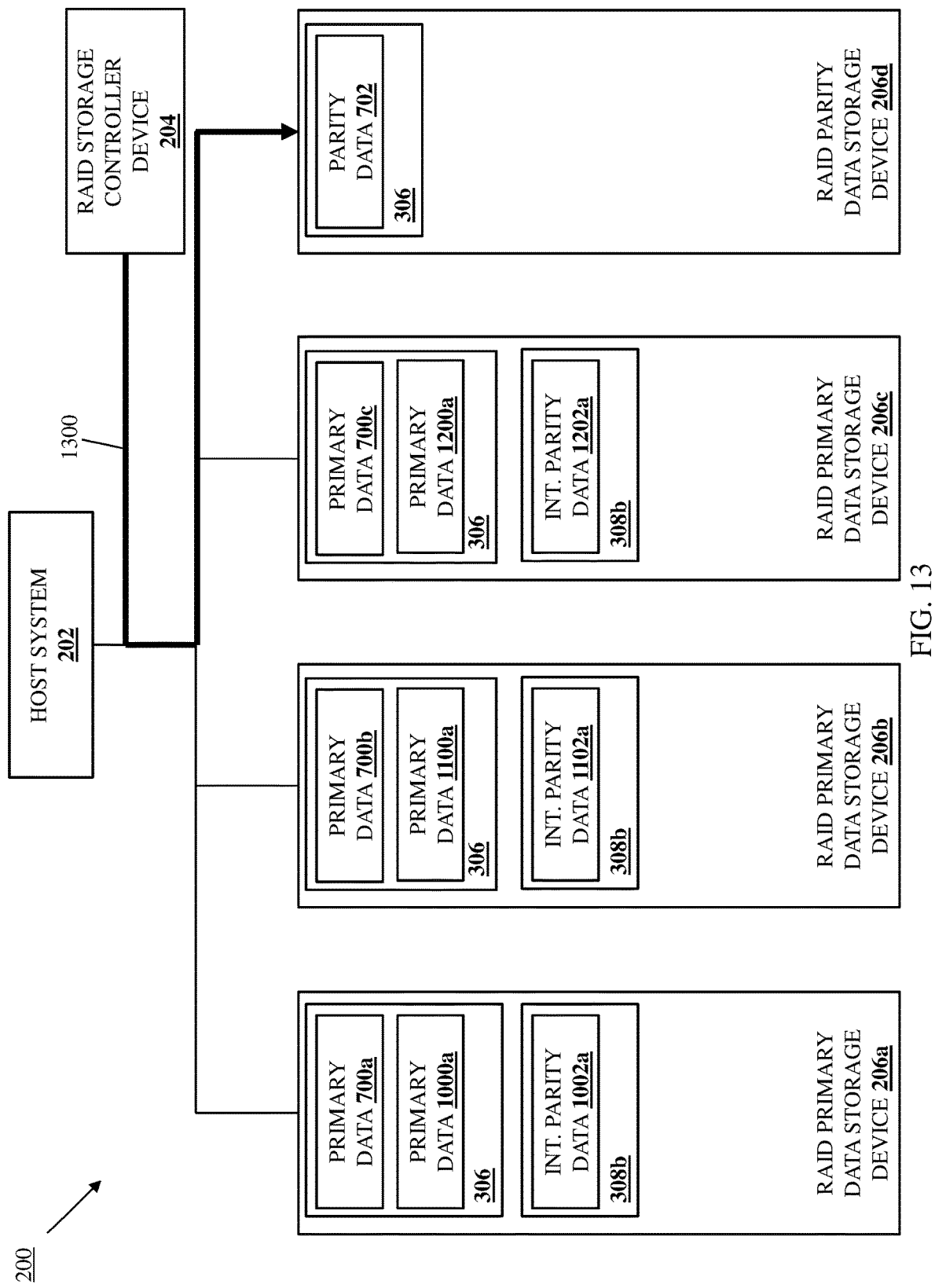
FIG. 13 is a schematic view illustrating an embodiment of the drive-assisted RAID storage system of FIG. 2 operating during the method of FIGS. 5A and 5B.

The method 500 then proceeds to block 514 where the RAID storage controller device provides parity data update commands to one or more RAID parity data storage devices. With reference to FIG. 13, in an embodiment of block 514 and in response to receiving the primary data update completion message from any of the RAID primary data storage devices 206a-206c as discussed above, the RAID storage controller device may perform parity update command provisioning operations 1300 that may include providing a parity data update command to the RAID parity data storage device 206d. For example, in response to any of the RAID primary data storage devices 206a-206c generating the interrupt to the RAID storage controller device 204 as discussed above, the RAID storage controller device 204 may read the completion message from the completion queue in the communication system 310 of that RAID primary data storage device and, in response, generate a parity data update command.

For example, at block 514, the RAID storage controller engine 404 in the RAID storage controller device 204/400 may generate the parity data update command for the RAID parity data storage device 206d that identifies a location of interim parity data (e.g., a PCIe memory address of the interim parity data in the RAID primary data storage device that calculated that interim parity data), identifies a location of "old" parity data (e.g., an LBA of the parity data 702 (i.e., "old" parity data) stored in the storage subsystem 306 in the RAID parity data storage device 206d) and, in some embodiments, includes the stripe update sequence identifier that was also provided to the RAID primary data storage device that calculated that interim parity data. The RAID storage controller device 2204 may then provide the parity data update command in the submission queue in the communication system 310 in the parity data storage device 206d/300, and ring the doorbell of the parity data storage device 206d/300. Similarly as discussed above, while this example illustrates providing a parity data update command to a single RAID parity data storage device for a RAID 5 level/single parity update, one of skill in the art in possession of the present disclosure will appreciate how a RAID 6 level/dual parity update will include providing parity data update commands to a pair of RAID parity data storage devices As such, one of skill in the art in possession of the present disclosure will appreciate how the provisioning of parity data update commands to any RAID parity data storage devices may include the provisioning a respective parity data update command to that RAID parity data storage device as each primary data update completion message is received from the RAID primary data storage devices 206a-206c. For example, the RAID storage controller device 204 may provide a first parity data update command to the RAID parity data storage device 206d following the receipt of the primary data completion message from the RAID primary data storage device 206a, and then may subsequently provide a second parity data update command to the RAID parity data storage device 206d following the receipt of the primary data completion message from the RAID primary data storage device 206b, and then may subsequently provide a third parity data update command to the RAID parity data storage device 206d following the receipt of the primary data completion message from the RAID primary data storage device 206c. Furthermore, as discussed above, primary data update completion messages may be received from RAID primary data storage devices 206a-206c "out of order" or otherwise not in the numerical order of the stripe update sequence identifiers discussed above, and thus the parity data update commands may be provided to the RAID parity data storage device 206d in an order that is different than the numerical order of the stripe update sequence identifiers as well.

The method 500 then proceeds to block 516 where the RAID parity data storage device(s) retrieve interim parity data from the RAID primary data storage device(s) and update parity data. In an embodiment, at block 516, the RAID parity data storage device 206d/300 may receive any of the parity data update commands discussed above by retrieving those parity data update commands from the submission queue in its communication system 310, retrieving interim parity data identified in the parity data update command from the RAID parity data storage device that calculated that interim parity data, and calculating "new" parity data using the interim parity data and the "old" parity data stored in its storage subsystem 306. Furthermore, one of skill in the art in possession of the present disclosure will appreciate how each parity data update command may be retrieved in response to the doorbell of the RAID parity data storage device 206d/300 being rung, which may include the RAID parity data storage device 206d/300 retrieving at least one parity date update command before at least one other parity data update command has been provided by the RAID storage controller device 204. However, as discussed above, parity updates may be performed asynchronously between the RAID primary data storage devices 206a-206c and the RAID parity data storage device 206d and without the need for intervention by the RAID storage controller device 204.

Figure 14A:
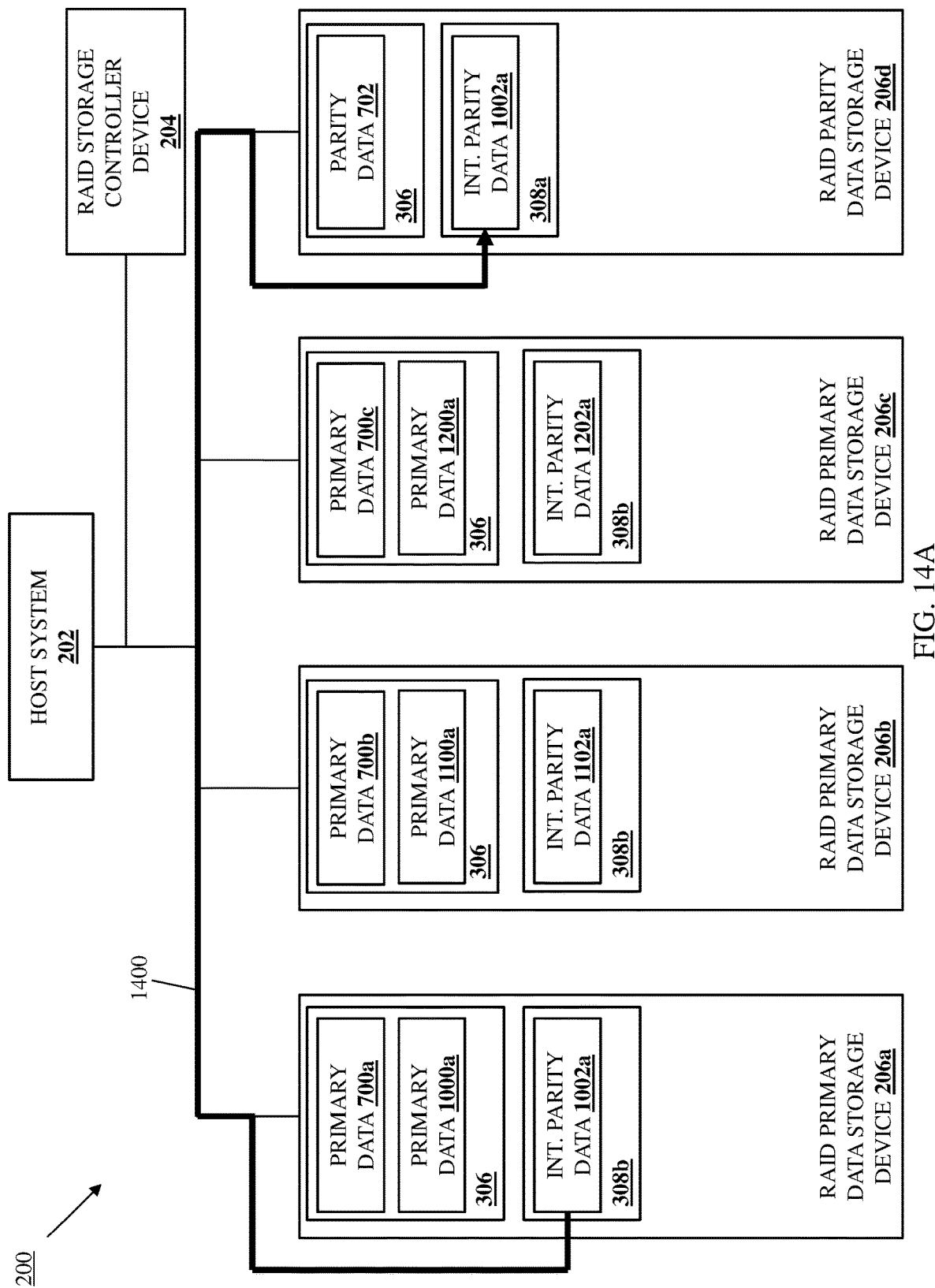
FIG. 14A is a schematic view illustrating an embodiment of the drive-assisted RAID storage system of FIG. 2 operating during the method of FIGS. 5A and 5B.
Figure 14B:
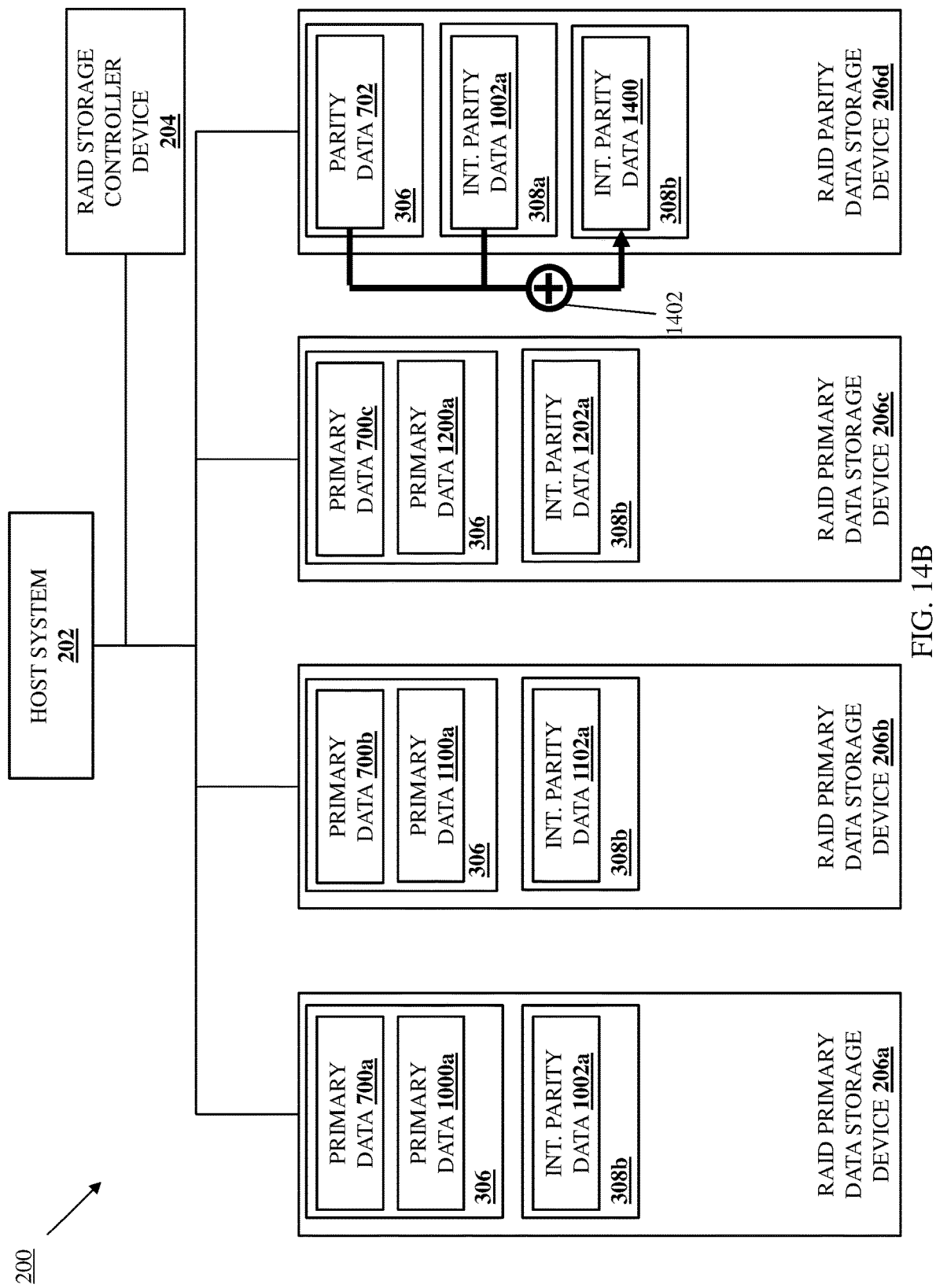
FIG. 14B is a schematic view illustrating an embodiment of the drive-assisted RAID storage system of FIG. 2 operating during the method of FIGS. 5A and 5B.

For example, with reference to FIG. 14A, at block 516 the RAID parity data storage device 206d may perform interim primary data retrieval operations 1400 that include retrieving (e.g., via a DMA operation from the second buffer subsystem 308b in the RAID primary data storage device 206a identified in the parity data update command received from the RAID storage controller device 204) the interim parity data 1002a and storing that interim parity data 1002a in its first buffer subsystem 308a (e.g., internal memory). However, one of skill in the art in possession of the present disclosure will recognize that the RAID primary data storage device 206a may "push" the interim parity data 1002a to the RAID parity data storage device 206d (rather than the "pull" operation described above) while remaining within the scope of the present disclosure as well. With reference to FIG. 14B, at block 516 the RAID parity data storage device 206d may then perform parity data generation operations 1402 that include performing XOR operations on the parity data 702 (i.e., "old" parity data) in its storage subsystem 306 and the interim parity data 1002a in its first buffer subsystem 308a to generate interim parity data 1400, and storing that interim parity data 1400 in its second buffer subsystem 308b (e.g., a CMB).

As will be appreciated by one of skill in the art in possession of the present disclosure, in scenarios where multiple RAID primary data storage devices have calculated interim parity data that will be utilized to update the parity data 702 (i.e., multiple blocks of a stripe are being updated), the parity data generation operations 1402 may generate "secondary" interim parity data (i.e., the interim parity data 1400 in this example) using "old" parity data (i.e., the parity data 702 in this example) and "primary" interim parity data (i.e., the interim parity data 1002a calculated by the RAID primary data storage device 206a), with the "secondary" interim parity used to update the "old" parity data, discussed in further detail below. However, in scenarios where only a single RAID primary data storage device has calculated interim parity data that will be utilized to update the parity data 702 (e.g., only a single block of a stripe is being updated), the parity data generation operations 1402 will generate "new" parity data (i.e., the interim parity data 1400 in this example) using "old" parity data (i.e., the parity data 702 in this example) and interim parity data (i.e., the interim parity data 1002a calculated by the RAID primary data storage device 206a), and that "new" parity data will provide the update of the "old" parity data.

Figure 15A:
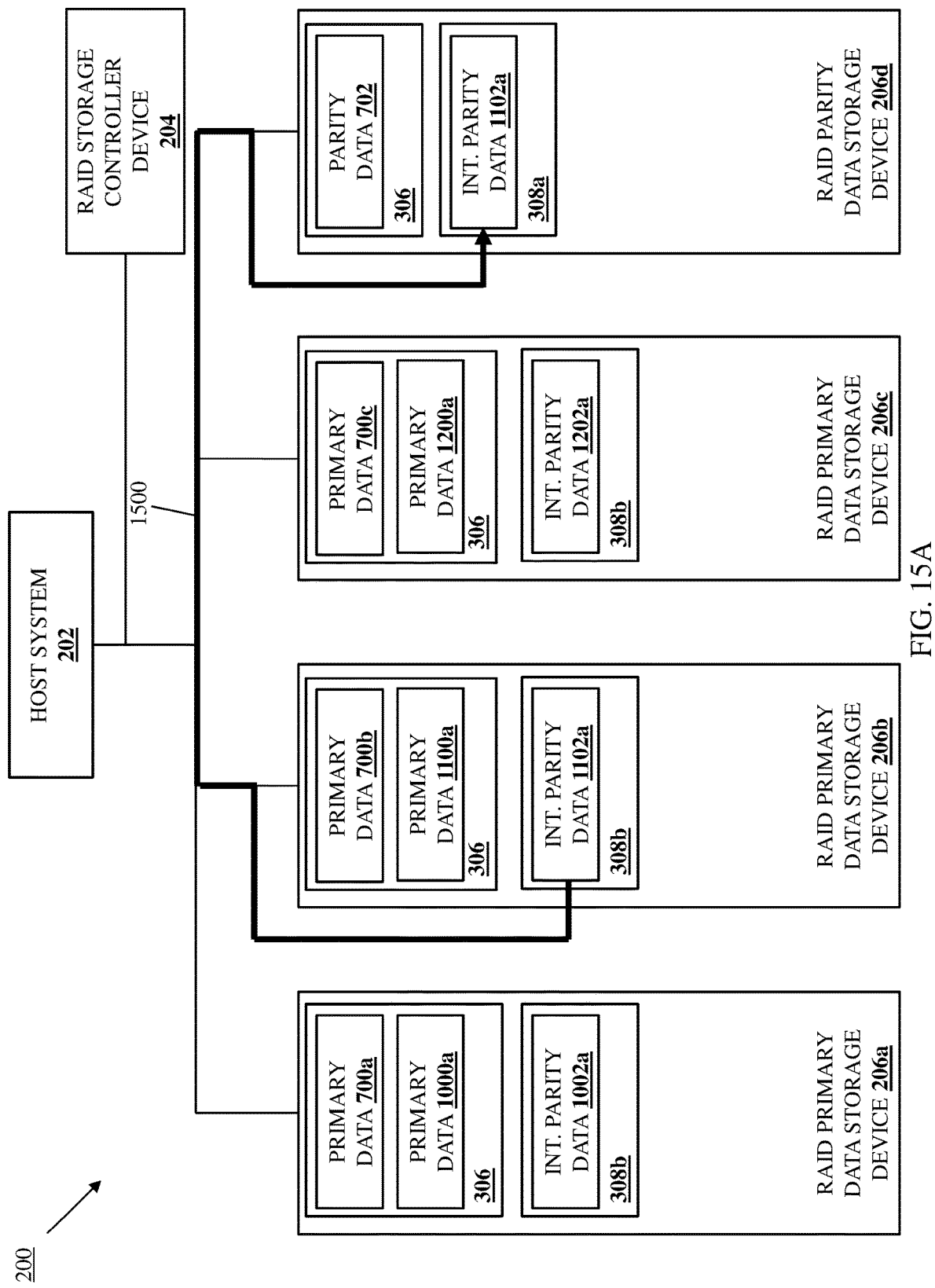
FIG. 15A is a schematic view illustrating an embodiment of the drive-assisted RAID storage system of FIG. 2 operating during the method of FIGS. 5A and 5B.
Figure 15B:
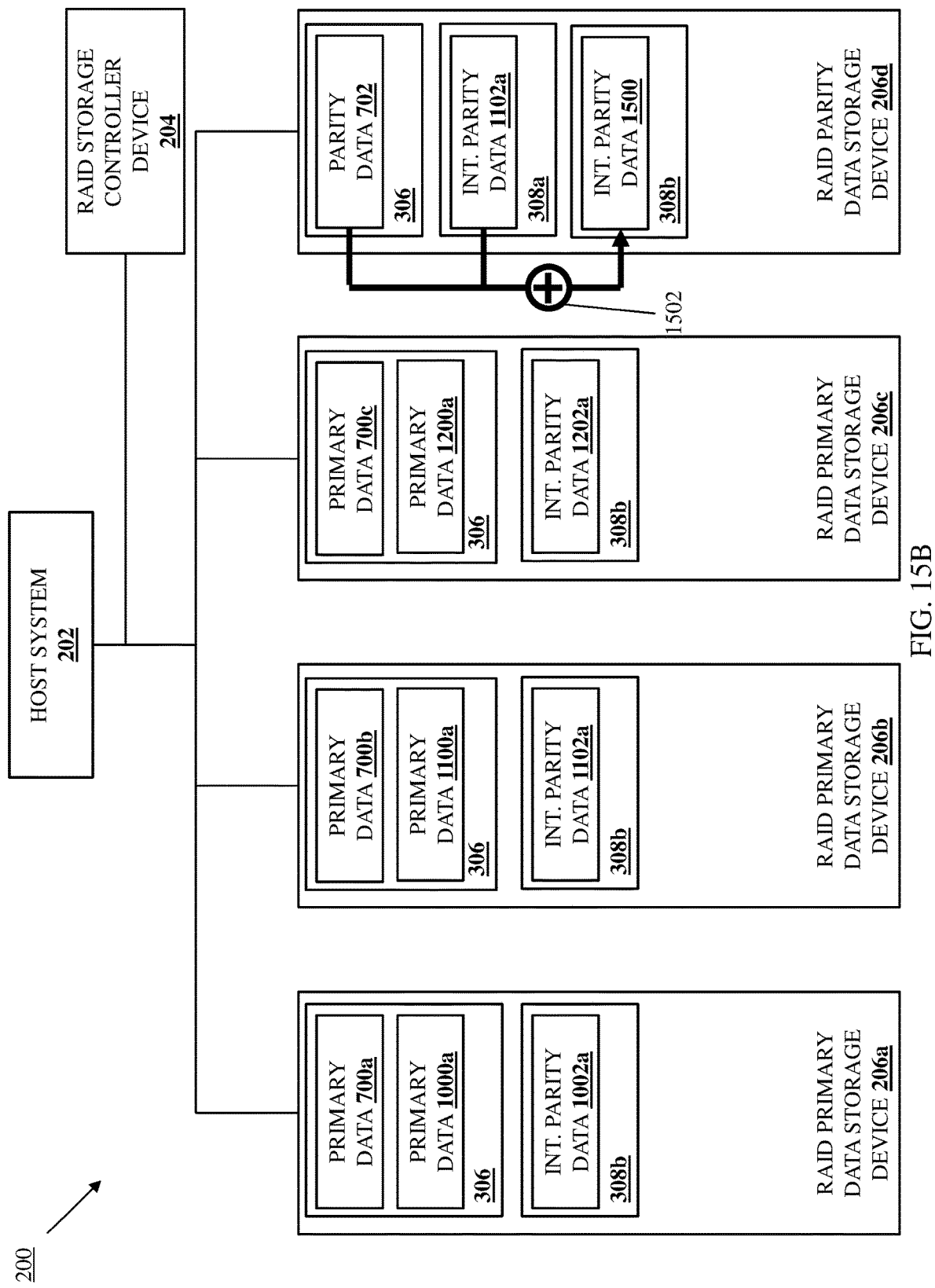
FIG. 15B is a schematic view illustrating an embodiment of the drive-assisted RAID storage system of FIG. 2 operating during the method of FIGS. 5A and 5B.

In another example, with reference to FIG. 15A, at block 516 the RAID parity data storage device 206d may perform interim primary data retrieval operations 1500 that include retrieving (e.g., via a DMA operation from the second buffer subsystem 308b in the RAID primary data storage device 206b identified in the parity data update command received from the RAID storage controller device 204) the interim parity data 1102a and storing that interim parity data 1102a in its first buffer subsystem 308a (e.g., internal memory). However, one of skill in the art in possession of the present disclosure will recognize that the RAID primary data storage device 206b may "push" the interim parity data 1102a to the RAID parity data storage device 206d (rather than the "pull" operation described above) while remaining within the scope of the present disclosure as well. With reference to FIG. 15B, at block 516 the RAID parity data storage device 206d may then perform parity data generation operations 1502 that include performing XOR operations on the parity data 702 (i.e., "old" parity data) in its storage subsystem 306 and the interim parity data 1102a in its first buffer subsystem 308a to generate interim parity data 1500, and storing that interim parity data 1500 in its second buffer subsystem 308b (e.g., a CMB).

As will be appreciated by one of skill in the art in possession of the present disclosure, in scenarios where multiple RAID primary data storage devices have calculated interim parity data that will be utilized to update the parity data 702 (i.e., multiple blocks of a stripe are being updated), the parity data generation operations 1502 may generate "secondary" interim parity data (i.e., the interim parity data 1500 in this example) using "old" parity data (i.e., the parity data 702 in this example) and "primary" interim parity data (i.e., the interim parity data 1102a calculated by the RAID primary data storage device 206b), with the "secondary" interim parity used to update the "old" parity data, discussed in further detail below. However, Furthermore, in scenarios where only a single RAID primary data storage device has calculated interim parity data that will be utilized to update the parity data 702 (e.g., only a single block of a stripe is being updated), the parity data generation operations 1502 will generate "new" parity data (i.e., the interim parity data 1500 in this example) using "old" parity data (i.e., the parity data 702 in this example) and interim parity data (i.e., the interim parity data 1102a calculated by the RAID primary data storage device 206b), and that "new" parity data will provide the update of the "old" parity data.

Figure 16A:
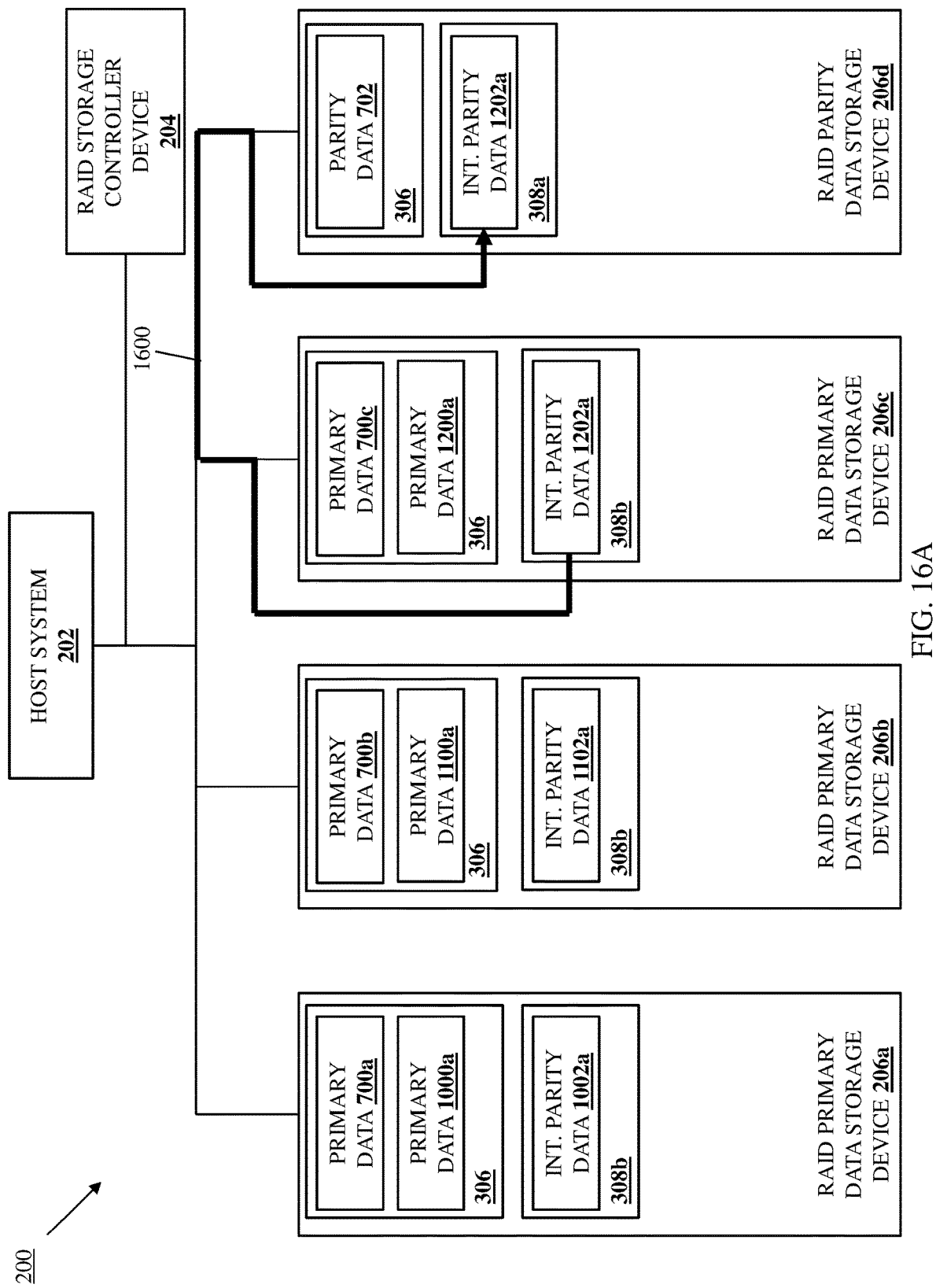
FIG. 16A is a schematic view illustrating an embodiment of the drive-assisted RAID storage system of FIG. 2 operating during the method of FIGS. 5A and 5B.

In another example, with reference to FIG. 16A, at block 516 the RAID parity data storage device 206d may perform interim primary data retrieval operations 1600 that include retrieving (e.g., via a DMA operation from the second buffer subsystem 308b in the RAID primary data storage device 206c identified in the parity data update command received from the RAID storage controller device 204) the interim parity data 1202a and storing that interim parity data 1202a in its first buffer subsystem 308a (e.g., internal memory).

Figure 16B:
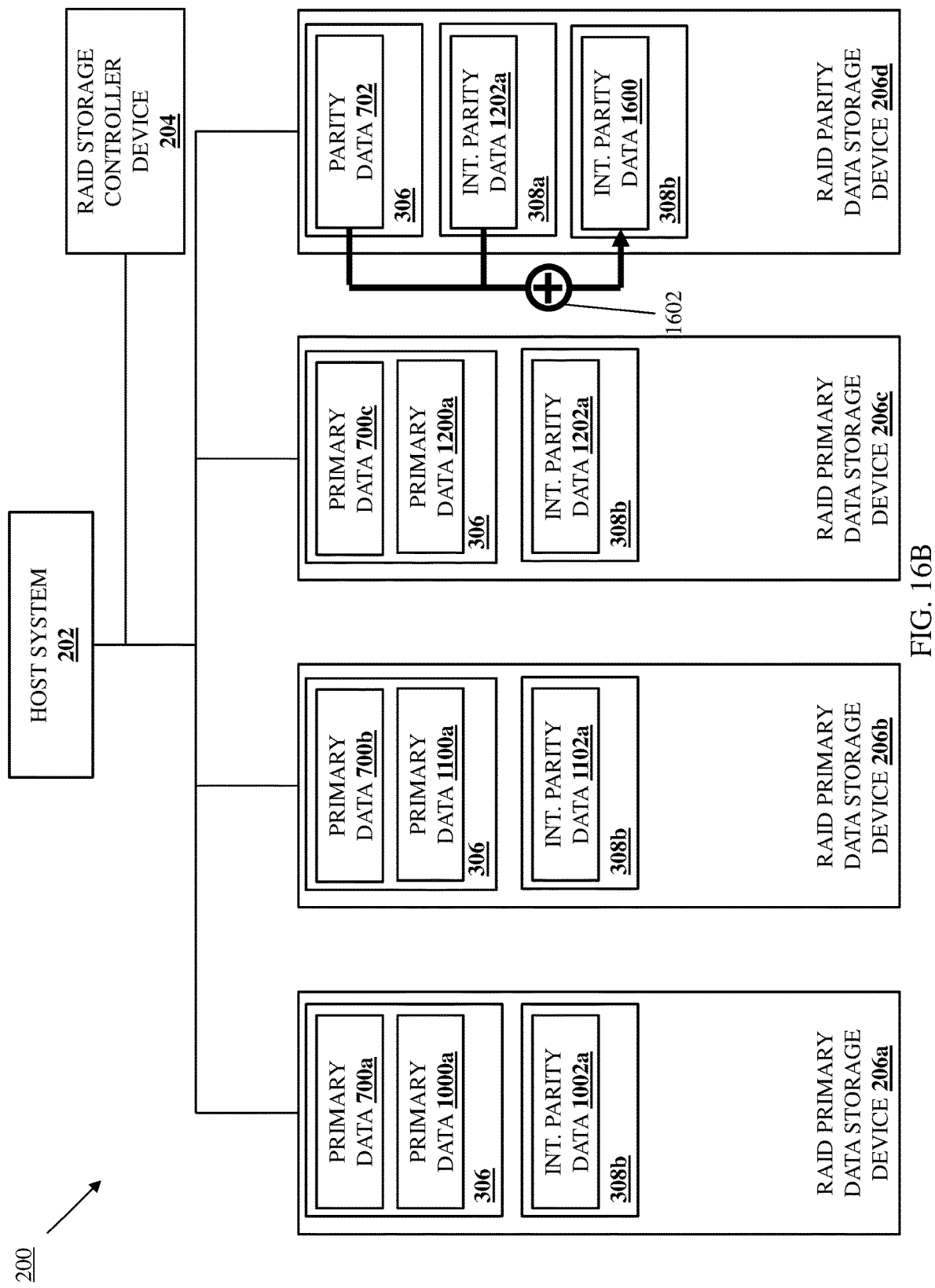
FIG. 16B is a schematic view illustrating an embodiment of the drive-assisted RAID storage system of FIG. 2 operating during the method of FIGS. 5A and 5B.

However, one of skill in the art in possession of the present disclosure will recognize that the RAID primary data storage device 206c may "push" the interim parity data 1202a to the RAID parity data storage device 206d (rather than the "pull" operation described above) while remaining within the scope of the present disclosure as well. With reference to FIG. 16B, at block 516 the RAID parity data storage device 206d may then perform parity data generation operations 1602 that include performing XOR operations on the parity data 702 (i.e., "old" parity data) in its storage subsystem 306 and the interim parity data 1202a in its first buffer subsystem 308a to generate interim parity data 1600, and storing that interim parity data 1600 in its second buffer subsystem 308b (e.g., a CMB).

As will be appreciated by one of skill in the art in possession of the present disclosure, in scenarios where multiple RAID primary data storage devices have calculated interim parity data that will be utilized to update the parity data 702 (i.e., multiple blocks of a stripe are being updated), the parity data generation operations 1602 may generate "secondary" interim parity data (i.e., the interim parity data 1600 in this example) using "old" parity data (i.e., the parity data 702 in this example) and "primary" interim parity data (i.e., the interim parity data 1202a calculated by the RAID primary data storage device 206c), with the "secondary" interim parity used to update the "old" parity data, discussed in further detail below. However, in scenarios where only a single RAID primary data storage device has calculated interim parity data that will be utilized to update the parity data 702 (e.g., only a single block of a stripe is being updated), the parity data generation operations 1602 will generate "new" parity data (i.e., the interim parity data 1600 in this example) using "old" parity data (i.e., the parity data 702 in this example) and interim parity data (i.e., the interim parity data 1202a calculated by the RAID primary data storage device 206c), and that "new" parity data will provide the update of the "old" parity data.

As will be appreciated by one of skill in the art in possession of the present disclosure, the "old" parity data (e.g., the parity data 702 in this example) stored in the RAID parity data storage device 206d may be updated in a variety of manners. For example, as discussed above, in scenarios where only a single RAID primary data storage device has calculated interim parity data that will be utilized to update the parity data 702 (e.g., only a single block of a stripe is being updated), the "new" parity data calculated as discussed above (e.g., the interim parity data 1400, 1500, or 1600 in the examples above) may be copied to the storage subsystem 306 such that the storage subsystem stores both the "old" parity data (e.g.,, the parity data 702 in this example) and the "new" parity data (e.g., the interim parity data 1400, 1500, or 1600 in the examples above).

Figure 17:
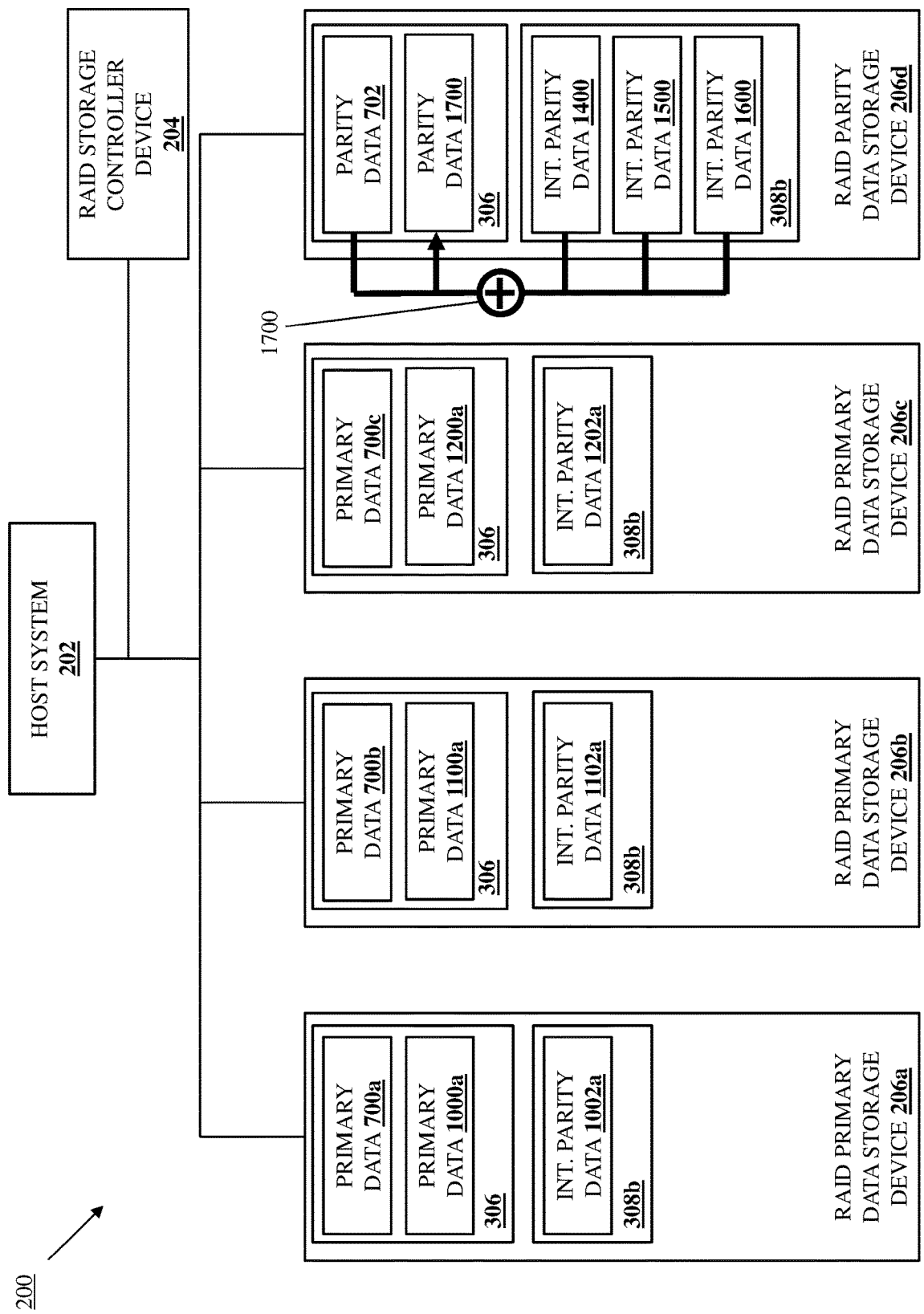
FIG. 17 is a schematic view illustrating an embodiment of the drive-assisted RAID storage system of FIG. 2 operating during the method of FIGS. 5A and 5B.

However, in scenarios where multiple RAID primary data storage devices have calculated interim parity data that will be utilized to update the parity data 702 (i.e., multiple blocks of a stripe are being updated), some embodiments may include the collection of each "secondary" interim parity data calculated as discussed above (e.g., the interim parity data 1400, 1500, and/or 1600 in the examples above), and then the calculation of "new" parity data using the "old" parity data (i.e., the parity data 702 is this example) using that "secondary" interim parity data. For example, FIG. 17 illustrates an embodiment of such parity data update operations following a 'full-stripe" write, with an XOR operation 1700 performed using the interim parity data 1400, 1500, and 1600 and the parity data 702 (i.e., "old" parity data) to calculate parity data 1700 (i.e., "new" parity data) that is then stored in the storage subsystem 306 along with the parity data 702.

However, in other embodiments of scenarios in which multiple RAID primary data storage devices have calculated interim parity data that will be utilized to update the parity data 702 (i.e., multiple blocks of a stripe are being updated), the "old" parity data (i.e., the parity data 702) may be updated as the "secondary" interim parity data is calculated as discussed above. For example, a first parity data update in such a scenario may include the calculation of first "new" parity data via an XOR operation on the interim parity data 1400 and the parity data 702 (i.e., "old" parity data in this example), followed by a second parity data update that includes the calculation of second "new" parity data via an XOR operation on the interim parity data 1500 and the first "new" parity data (i.e., "old" parity data in this portion of this example), followed by a third parity data update that includes the calculation of third/final "new" parity data via an XOR operation on the interim parity data 1500 and the second "new" parity data (i.e., "old" parity data in this portion of this example). However, while specific techniques for computing parity data are described above, one of skill in the art in possession of the present disclosure will appreciate how parity data may be calculated in a variety of manners that will fall within the scope of the present disclosure. Furthermore, In different embodiments, the RAID parity data storage device 206d may be configured to execute parity data update commands in the order defined by the stripe update sequence identifiers (e.g., in a numerical order of the stripe update sequence identifiers), which may be available to the RAID parity data storage device 206d via any of the manner discussed above (i.e., provided by the RAID storage controller device 204, included in the interim parity data, etc.). As such, if the interim parity data 1500 and/or 1600 with the stripe update sequence identifiers "2" or "3" are retrieved before the interim parity data 1400 with the stripe update sequence identifier "1", the RAID parity data storage device 206d may wait to retrieve the interim parity data 1400 before performing the operations discussed above to update the parity data 702 using the interim parity data 1400, 1500, and 1600. Similarly, if the interim parity data 1600 with the stripe update sequence identifier "3" is retrieved subsequent to updating the parity data 702 using the interim parity data with the stripe update identifier "1" and before the interim parity data 1500 with the stripe update sequence identifier "2" is retrieved, the RAID parity data storage device 206d may wait to retrieve the interim parity data 1500 before performing the operations discussed above to update the parity data 702 using the interim parity data 1500 and 1600.

As will be appreciated by one of skill in the art in possession of the present disclosure, the execution of the parity data update commands in the order defined by the stripe update sequence identifiers may allow for relatively simple recovery of the parity data update operations in the event power is lost during those parity data update operations. For example, because the state of the stripe is determined by the RAID storage controller device 204, the RAID storage controller device 204 may either advance the state of the stripe atomically, or leave the stripe in its "old" state As such, either all modified primary data and parity data in the stripe will be updated, or none of it will be updated. If the state of the stripe is not advanced, the RAID primary data storage devices 206a-206c and the RAID parity data storage device 206d will continue to retain the "old" primary data and the "old" parity data for the stripe. As such, upon a system failure such as a power loss when the state of the stripe has not yet advanced, two situations may occur upon system recovery such as a power restor: 1) if the state of the stripe is stored in persistent memory in the RAID storage controller device 204, the data update operation for the stripe may be resumed, or 2) if the state of the stripe was not stored in persistent memory in the RAID storage controller device 204, all "in-flight" operations may be lost and all write requests from initiators will "time-out" and need to be re-sent (e.g., if needed as part of their own recovery), with the RAID primary data storage devices 206a-206c and the RAID parity data storage device 206d timing-out on waiting to reclaim their buffers and operating to reclaim them. In such situations in which the state of the stripe was not stored and write requests are re-sent, the RAID primary data storage devices 206a-206c will receive those write requests (which are actually re-sends of the "dropped" write requests by the initiators as described above), and may reclaim their buffers as part of processing those write requests.

If the RAID storage controller device 204b has already advanced the state of the stripe, the only thing that may be lost are response messages to the initiators (which the initiators request again) and "data cleanup" instructions to the RAID primary data storage devices 206a-206c and the RAID parity data storage device 206d. However, data cleanup operations may be self-initiated by the RAID primary data storage devices 206a-206c and the RAID parity data storage device 206d after some timeout period (e.g., typically minutes) such as, for example, any time period after which it may be assumed that the write operation was either completed or was abandoned. However, one of skill in the art in possession of the present disclosure will appreciate how the execution of the parity data update commands "out of order" (i.e., not in the order defined by the stripe update sequence identifiers) may be enabled via the tracking of parity data update operations (e.g., tracking which stripe update sequence identifiers/interim parity data has been used to update the parity data at any point during the parity data update operations), and/or via other techniques, while remaining within the scope of the present disclosure as well.

In yet other embodiments of scenarios where multiple RAID primary data storage devices have calculated interim parity data ("primary" interim parity data in this example) that will be utilized to update the parity data 702 (i.e., multiple blocks of a stripe are being updated), some embodiments may the use of the "primary" interim parity data from multiple RAID primary data storage devices to calculate "secondary" interim parity data, and then use that "secondary" interim parity data to calculate "new" parity data. For example, a first XOR operation may be performed on the interim parity data 1002b and 1002c (i.e., "primary" interim parity data) to calculate "secondary" interim parity data, and then a second XOR operation may be performed on the parity data 702 (i.e., "old" parity data in this example) and the "secondary" interim parity data in order to calculate "new" parity data. In such situations, the use of the "primary" interim parity data from multiple RAID primary data storage devices to calculate the "secondary" interim parity data as discussed above may benefit from performing the first XOR operation discussed above on interim parity data that have continuous/sequential stripe update sequence identifiers (i.e., the interim parity data 1002b and 1002c with the stripe update sequence identifiers "2" and "3" in the example above) and that immediately follow the interim parity data with the highest previous stripe update sequence identifier that the RAID storage controller device 204 has retrieved (i.e., the interim parity data with the stripe update sequence identifier "1").

In some embodiments, at block 516 the RAID primary data storage devices 206a-206c may be configured to inform the RAID storage controller device 204 of the stripe update sequence identifier of any interim parity data that it has utilized to update the parity data 702, and in the event interim parity data from multiple RAID primary data storage devices is used to update the parity data 702 as discussed above, the RAID primary data storage devices 206a-206c may be configured to inform the RAID storage controller device 204 of the highest stripe update sequence identifier of that interim parity data that was used to update the parity data 702.

The method 500 then proceeds to decision block 518 where it is determined whether the stripe update sequence identifier(s) indicate parity data update operations for the stripe are complete. In an embodiment, at decision block 518, the RAID storage controller engine 404 in the RAID storage controller device 204/400 may determine whether the stripe update sequence identifiers indicate that parity data update operations for the stripe are complete. In some embodiments, the RAID storage controller device 204 may have previously provided the RAID parity data storage device 206d the last stripe update sequence identifier for the stripe update sequence, and thus at decision block 518 the RAID parity data storage device 206d may determine whether the interim parity data with each of the stripe update sequence identifiers up to the last stripe update sequence identifier for the stripe update sequence have been utilized to update the parity data 702.

As will be appreciated by one of skill in the art in possession of the present disclosure, the sequence numbering discussed above allows the RAID parity data storage device 206d to determine if all interim parity data has been received/retrieved or not, and the RAID parity data storage device 206d may "greedily" assume that it has received/retrieved the "last" interim parity data whenever it receives/retrieves interim parity data with a highest sequence number after it has received interim parity data with a contiguous set of lower sequence numbers starting from 1 (i.e., it receives/retrieves interim parity data with sequence number 3 after having received/retrieved interim parity data with sequence numbers 1 and 2). One of skill in the art in possession of the present disclosure will appreciate how such a conclusion is a "no-harm" conclusion, as if the RAID parity data storage device 206d subsequently receives/retrieves interim parity data with a yet higher sequence number, it may use that interim parity data to perform an parity update as described herein, and eventually it will be told by the RAID storage controller device 204 that the stripe is closed, i.e. that it has processed all outstanding interim parity data for the stripe, and may clean up its buffer and store the "new" parity data for the stripe.

However, in other embodiments, the RAID storage controller device 204 may not provide the RAID parity data storage device 206d any information about the length of the stripe update sequence, and the RAID parity data storage device 206 may be configured to identity situations where the stripe update sequence identifiers indicate parity data update operations for the stripe are complete. For example, the RAID parity data storage device 206 may be configured to determine that the stripe update sequence identifiers indicate parity data update operations for the stripe are not complete if there are any "missing' stripe update sequence identifiers associated with interim parity data that has been retrieved (e.g., the retrieval of interim parity data with stripe update sequence identifiers "1" and "3" would indicate that the parity update operations for the stripe are not complete due to the "missing" stripe sequence identifier "2"). In another example, the RAID parity data storage device 206 may be configured to determine that the stripe update sequence identifiers indicate parity data update operations for the stripe are complete when there are no "missing' stripe update sequence identifiers associated with interim parity data that has been retrieved, and no stripe update sequence identifiers have been retrieved for some threshold time period (e.g., interim parity data with stripe update sequence identifiers "1", "2" and "3" have been retrieved and no further interim parity data is retrieved for the threshold time period).

Furthermore, one of skill in the art in possession of the present disclosure will appreciate how the threshold time period discussed above may be defined as arbitrarily small value, as updating parity data too quickly is not a correctness issue, and updating parity data too slowly may result in delays in responding to write requests. As such, having a non-zero threshold time period may be provided as an optimization to reduce unnecessary message processing. Another similar optimization may include tagging the largest sequence number parity update message with a flag (e.g., "LAST_ONE") if the RAID storage controller device 204 actually knows that to be the case (e.g., the RAID storage controller device 204 would know this in the case of a full-stripe write), and upon processing that sequence number parity update message (with no missing gaps), the RAID parity data storage device 206d may immediately send the response to the RAID storage controller device 204. However, while a few techniques have been described that allow the RAID parity data storage device to identity situations where the stripe update sequence identifiers indicate parity data update operations for the stripe are complete when relatively little information about the stripe update sequence is available, one of skill in the art in possession of the present disclosure will appreciate how other techniques for performing such identifications will fall within the scope of the present disclosure as well.

As discussed above, the interim parity data receiving/retrieval discussed above may be performed by the RAID parity data storage device 206d directly from the RAID primary data storage devices 206a-206c without intervention from the RAID storage controller device 204, and one of skill in the art in possession of the present disclosure will appreciate how the RAID parity data storage device 206d may calculate the "new" parity data using that interim parity data using any of the techniques discussed above without the need to be instructed to by the RAID storage controller device 204 (e.g., in response to determining that it has received all the interim parity data that is needed in order to calculate that new parity data, as discussed above). As such, the interim parity data receiving/retrieval operations and parity data calculations discussed above may be operations performed by the RAID parity data storage device 206d and the RAID primary data storage devices 206a-206c without intervention from the RAID storage controller device 204

If, at decision block 518, it is determined that the stripe update sequence identifier(s) indicate parity data update operations for the stripe are not complete, the method 500 returns to block 516. As such, the method 500 may loop such that the RAID parity data storage device(s) retrieve interim parity data from the RAID primary data storage device(s) and update parity data until the stripe update sequence identifier(s) indicate parity data update operations for the stripe are complete. If, at decision block 518, it is determined that the stripe update sequence identifier(s) indicate parity data update operations for the stripe are complete, the method 500 proceeds to block 520 where the RAID parity data storage device(s) send parity data update completion message(s) to the RAID storage controller device.

Figure 18:
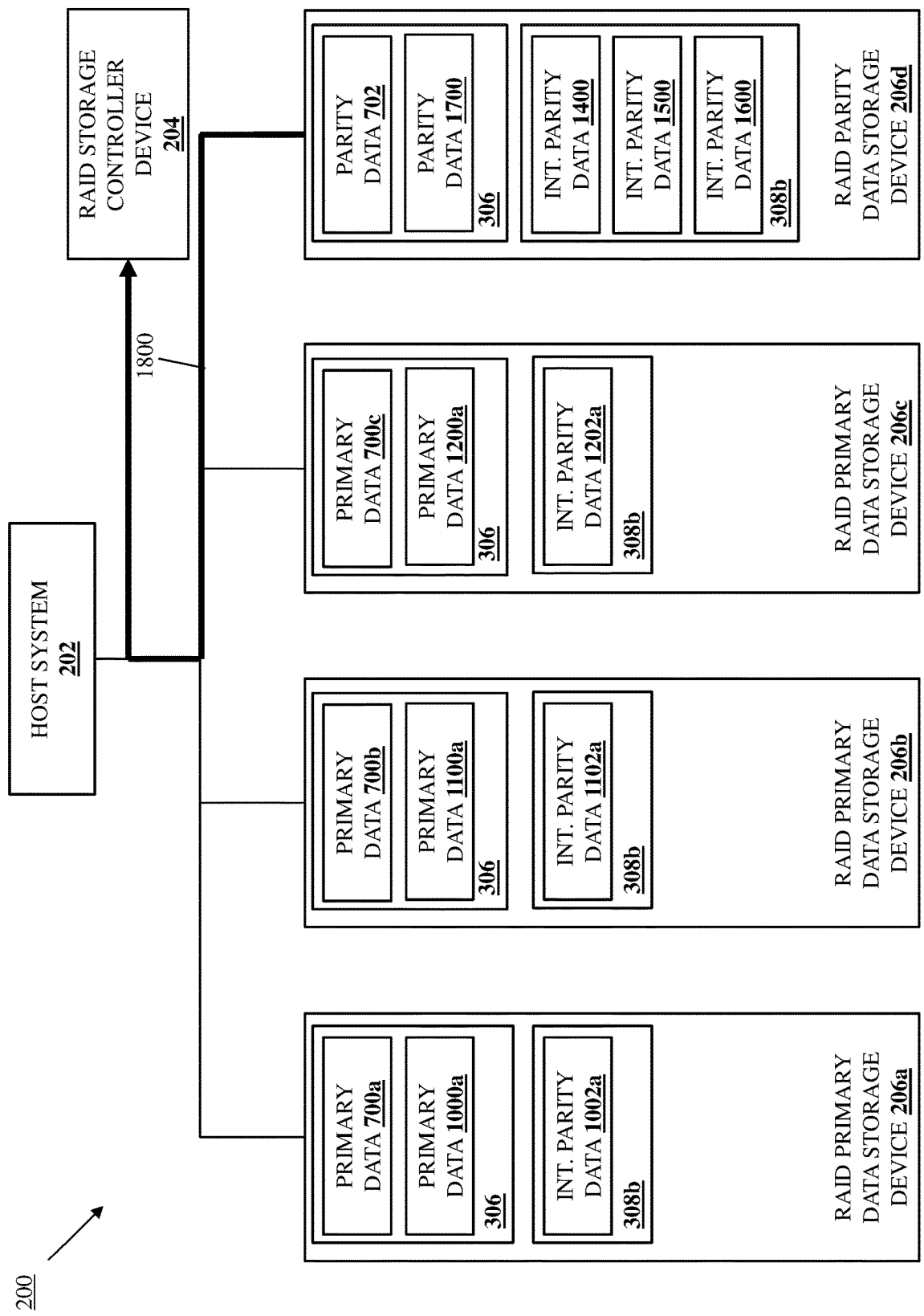
FIG. 18 is a schematic view illustrating an embodiment of the drive-assisted RAID storage system of FIG. 2 operating during the method of FIGS. 5A and 5B.

With reference to FIG. 18, in an embodiment of block 520 and in response to determining that the stripe update sequence identifiers indicate parity data update operations for the stripe are complete at decision block 518, the RAID parity data storage device 206d may perform parity data update completion message provision operations 1800 that include transmitting a parity data update completion message for each parity data update completion command that was executed. For example, the RAID parity data storage device 206d/300 may provide a parity data update completion message in the completion queue in its communication system 310, and then generate an interrupt to the RAID storage controller device 204. As discussed above, the parity data update completion message may be sent whenever the RAID parity data storage device 206d "believes" the parity data update has been completed (i.e. when the RAID parity data storage device has processed the highest sequence number it has received and all lower sequence numbers with no gaps), and at least one such message will be sent, with no more of such messages sent than the number of writes to the stripe.

The method 500 then proceeds to block 522 where the RAID storage controller device provides stripe update completion messages to the RAID primary storage device(s) and the RAID parity data storage device(s). In an embodiment, at block 522 and in response to retrieving a parity data update completion message from the RAID parity data storage device 206d, the RAID storage controller device 204 may perform stripe update completion message provisioning operations 1900 that include providing stripe update completion messages to the RAID primary data storage devices 206a-206c that updated their primary data, and to the RAID parity data storage device 206d that updated its parity data. For example, in response to the RAID parity data storage device 206d generating the interrupt to the RAID storage controller device 204 as discussed above at block 520, the RAID storage controller device 204 may read the parity data completion message from the completion queue in the communication system 310 of the RAID parity data storage device 206d and, in response, generate stripe update completion message and transmit them to the RAID primary storge device(s) 206a, 206b, and/or 206c, and the RAID parity data storage device 206d.

Furthermore, while discussed as occurring later in the method 500 below, one of skill in the art in possession of the present disclosure will appreciate how the RAID storage controller device 204 may acknowledge any primary data update to the host system 202 (e.g., via the primary data update completion message(s) discussed below), as well as respond to subsequent read requests from that host that are directed to the stripe with any of the primary data 1000a, 1100a, and 1200a, once its corresponding parity data update completion message is received from the RAID parity data storage device 206d, as those parity data update completion messages indicate that the corresponding primary data has been persistently stored in the RAID primary data storage device(s) 206a-206c. As such, the RAID storage controller device may direct reads to "old" data until it advances the state of the stripe, with any reads issued while writes are still outstanding validly receiving either "old" data or "new" data, so there is no concern here about request ordering.

The method 500 then proceeds to block 524 where the RAID primary data storage device(s) and the RAID parity data storage device(s) perform data clean-up operations and transmit data clean-up completion messages to the RAID storage controller device. In an embodiment, at block 524 and in response to receiving the stripe update completion message, any of the RAID primary data storage devices 206a-206c and the RAID parity data storage device 206d may operate to perform data clean-up operations. For example, with reference to FIG. 19B, the data clean-up operations are illustrated as including the RAID primary data storage device 206a erasing the primary data 700a from its storage subsystem 306 and the interim parity data 1002a from its second buffer subsystem 308b, the RAID primary data storage device 206b erasing the primary data 700b from its storage subsystem 306 and the interim parity data 1102a from its second buffer subsystem 308b, the RAID primary data storage device 206c erasing the primary data 700c from its storage subsystem 306 and the interim parity data 1202a from its second buffer subsystem 308b, and the RAID parity data storage device 206d erasing the parity data 702 from its storage subsystem 306 and the interim parity data 1400, 1500, and 1600 from its second buffer subsystem 308b.

Figure 19A:
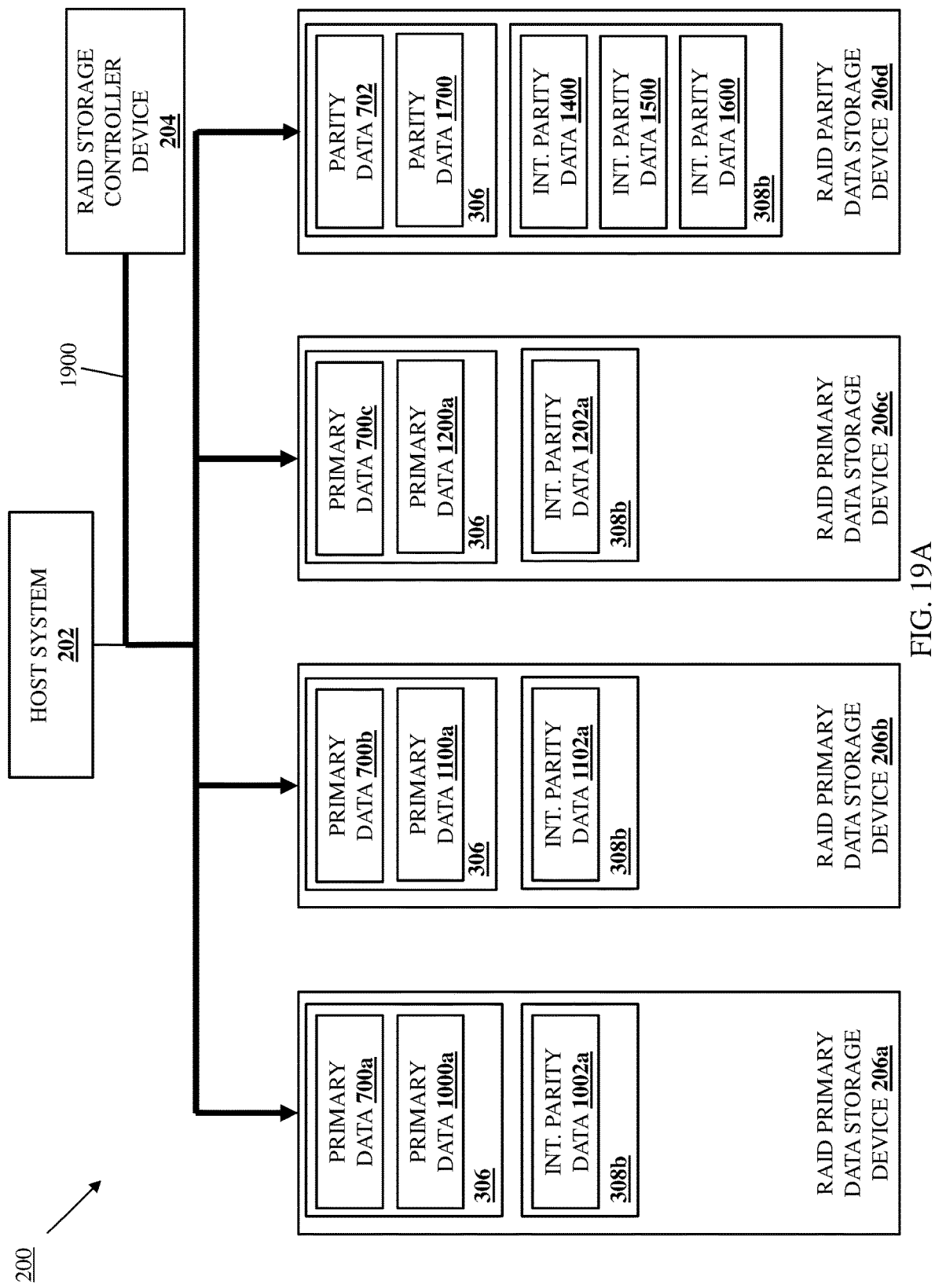
FIG. 19A is a schematic view illustrating an embodiment of the drive-assisted RAID storage system of FIG. 2 operating during the method of FIGS. 5A and 5B.
Figure 19B:
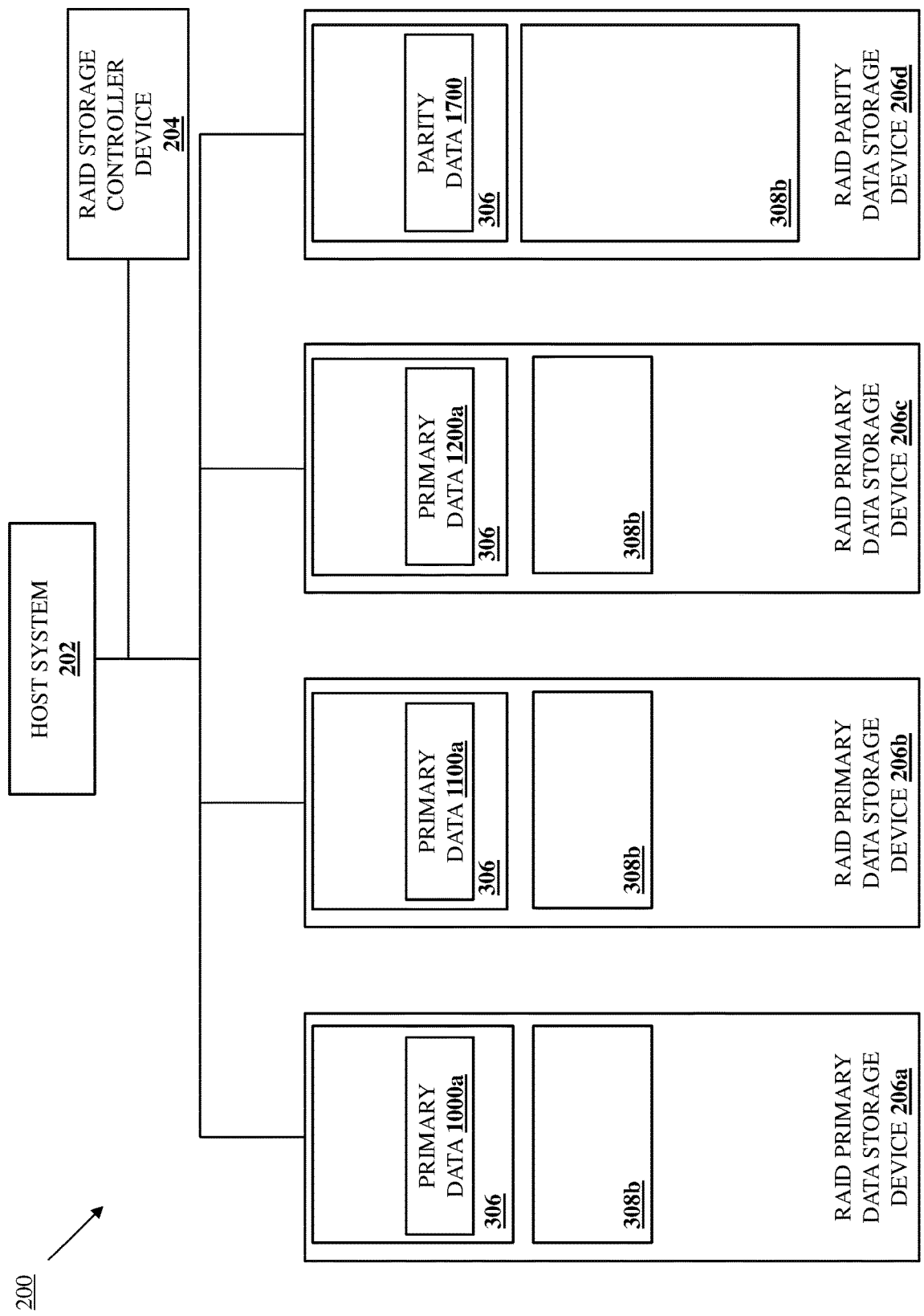
FIG. 19B is a schematic view illustrating an embodiment of the drive-assisted RAID storage system of FIG. 2 operating during the method of FIGS. 5A and 5B.
Figure 19C:
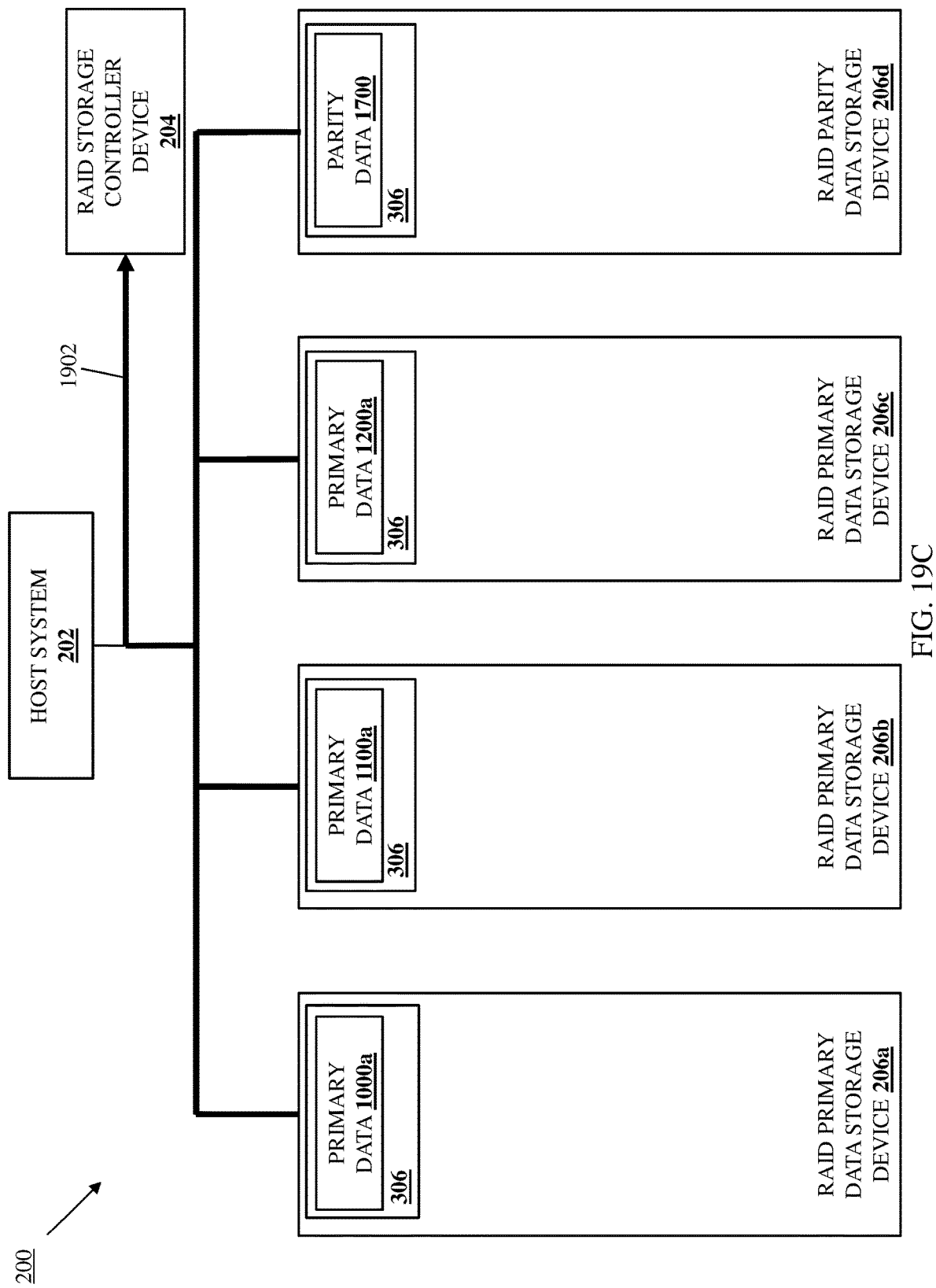
FIG. 19C is a schematic view illustrating an embodiment of the drive-assisted RAID storage system of FIG. 2 operating during the method of FIGS. 5A and 5B.

However, while the erasing of specific data is illustrated and described, one of skill in the art in possession of the present disclosure will appreciate how the data clean-up operations may include the discarding of any data stored during the operations discussed above that is no longer needed to ensure the ability to recover/reconstruct the primary data 1000a, 1100a, and 1200a, and the parity data 1700 illustrated in FIG. 19B. Furthermore, while data clean-up operations following a full stripe write are illustrated and described, one of skill in the art in possession of the present disclosure will appreciate how partial stripe writes will result in the storage less data that must then be erased. As illustrated in FIG. 19C, following the completion of the data-clean up operations, each of the RAID primary data storage devices 206a-206c and the RAID parity data storage device 206d may perform data clean-up completion message provisioning operations 1902 that that include providing data clean-up completion message(s) to the RAID storage controller device 204.

Figure 20:
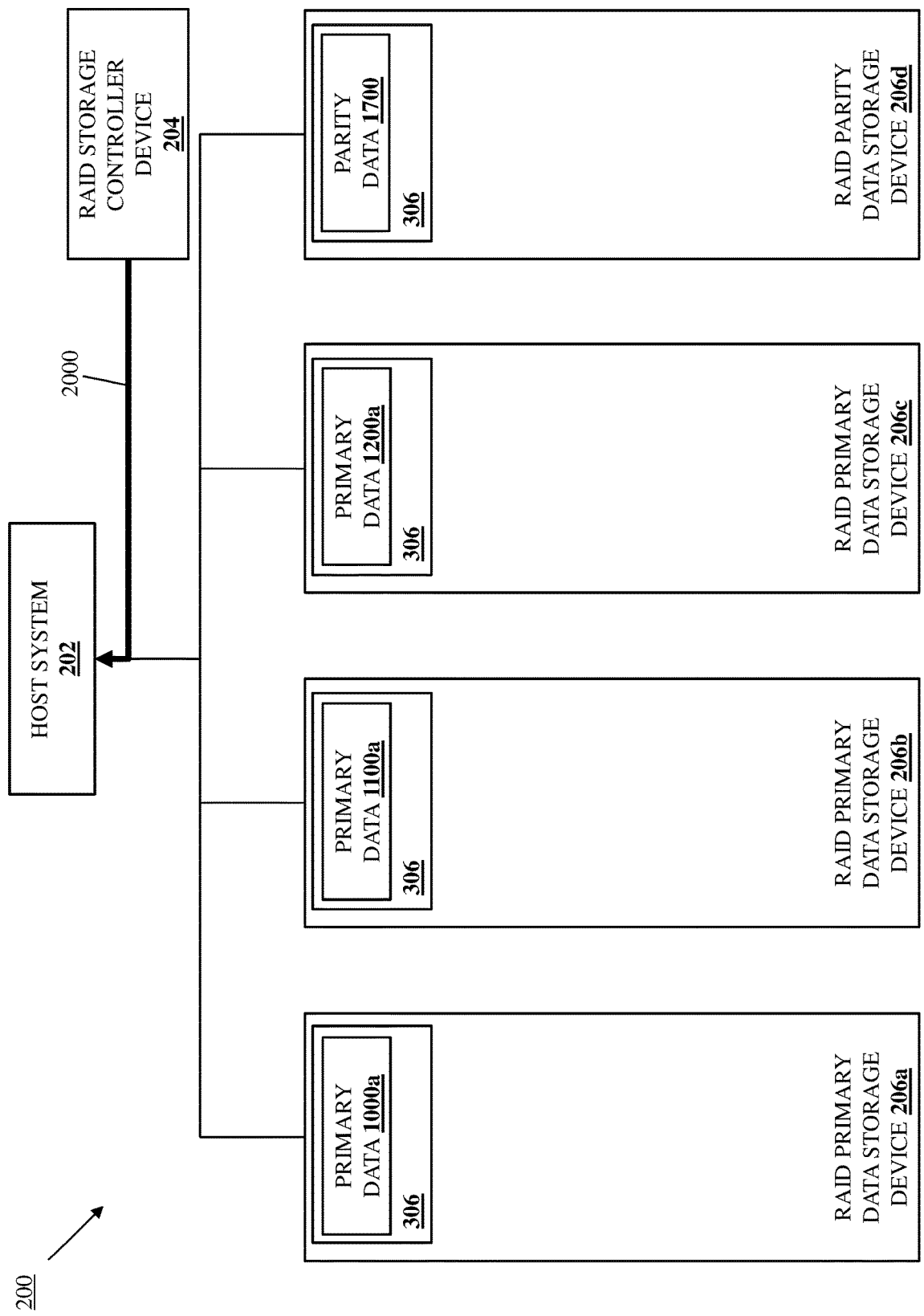
FIG. 20 is a schematic view illustrating an embodiment of the drive-assisted RAID storage system of FIG. 2 operating during the method of FIGS. 5A and 5B.

The method 500 then proceeds to block 526 where the RAID storage controller device provides primary data update completion message(s) to the host system. With reference to FIG. 20, in an embodiment of block 526 and in response to receiving data clean-up completion messages at block 524, the RAID storage controller device 204 may perform primary data update completion message provisioning operations 2000 that may include providing primary data update completion message(s) to the host system 202 for the instruction(s) received from the host system 202 to update primary data. As will be appreciated by one of skill in the art in possession of the present disclosure, the host system 202 may receive a different completion message for every write it sent as per conventional block i/o behavior. For example, the RAID storage controller device 204/400 may provide the primary update completion message(s) in the completion queue in its communication system 408 and generate an interrupt for the host system 202, which one of skill in the art in possession of the present disclosure will recognize will cause the host system 202 to retrieve the primary update completion message(s). In some embodiments, block 526 may precede or be performed in parallel with block 524, and one of skill in the art in possession of the present disclosure will recognize how block 526 lies in the performance path and should be completed as soon as possible (with block 524 being performed "lazily", i.e. asynchronously with respect to notification of the hosts that their write(s) are complete).

Figure 21:
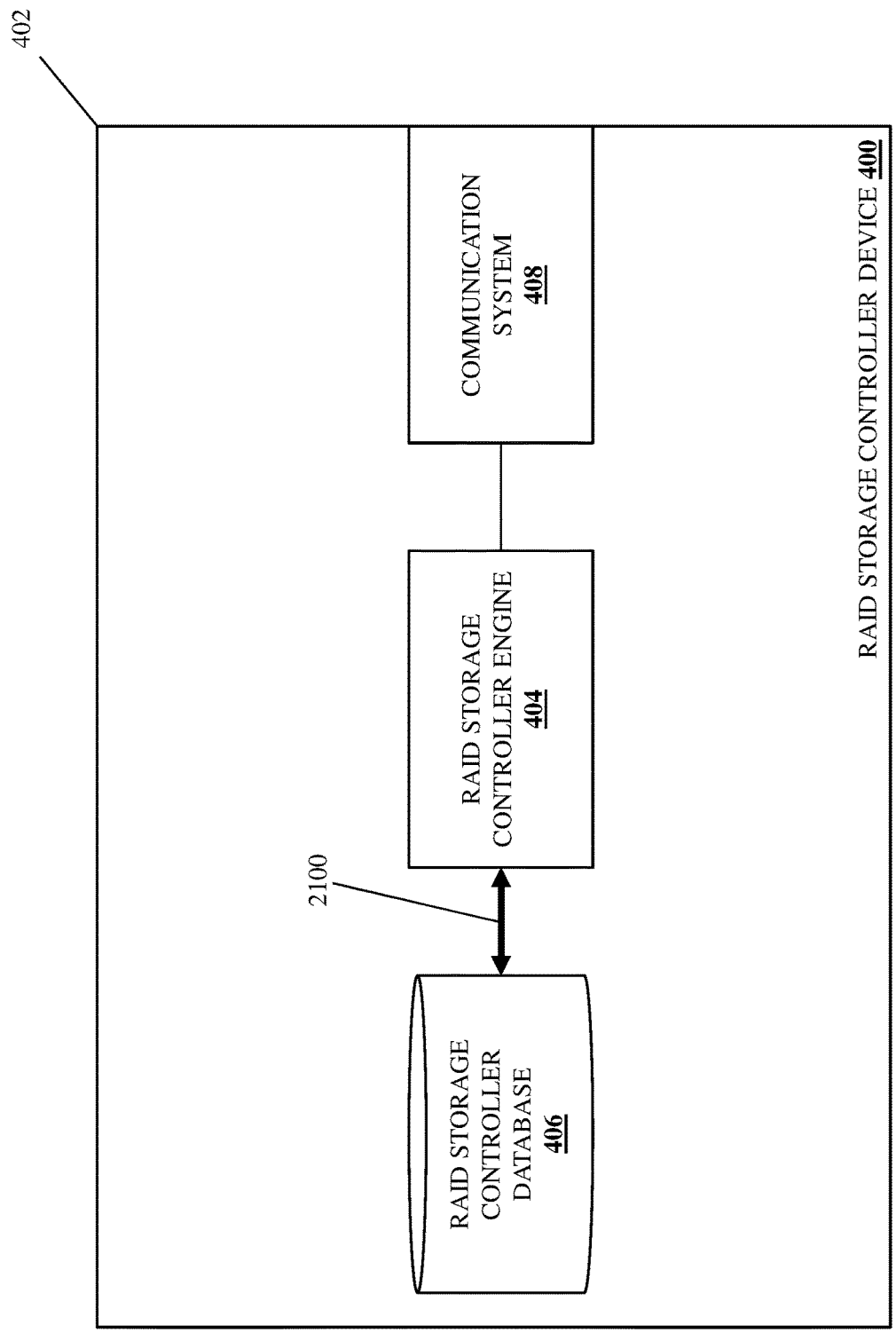
FIG. 21 is a schematic view illustrating an embodiment of the RAID storage controller device of FIG. 4 operating during the method of FIGS. 5A and 5B.

The method 500 then proceeds to block 528 where the RAID storage controller device ends the stripe update. With reference to FIG. 21, in an embodiment of block 528 and subsequent to providing the primary data update completion message(s) to the host system 202 at block 526, the RAID storage controller engine 404 in the RAID storage controller device 204/400 may perform stripe update closing operations 2100 that include "closing" the "open" stripe in the stripe update table stored in the RAID storage controller database 406 by, for example, removing the entry for the update of the stripe and/or performing any other stripe update tracking operations that would be apparent to one of skill in the art in possession of the present disclosure. As will be appreciated by one of skill in the art in possession of the present disclosure, subsequent writes to the stripe will resume with the counter effectively at zero so the next write will get counter value 1. Thus, in effect, the counter is reset (and if a full table of all stripes is being kept, the counter would, in fact, be reset).

As will be appreciated by one of skill in the art in possession of the present disclosure, the systems and methods of the present disclosure provide the RAID storage controller device 204 with control over the state of a stripe at all times, and that state may be advanced one or more blocks in that stripe at a time with corresponding atomic parity data updates (i.e., when parity data for a stripe is updated after all of the primary data for that stripe has been updated as well, before which the stripe include "old" primary and parity data, and after which the stripe include "new" primary and parity data). For example, at each step of the stripe update, the RAID storage controller device 204 may atomically update the state of the stripe forward with respect to any recovery that may subsequently be required in response to any failure situation. If such a failure situation occurs between a time when the RAID storage controller device 204 receives a parity data update completion message from the RAID parity data storage device 206d and a time when the RAID storage controller device 204 provides a primary data update command to the RAID primary data storage devices 206a-206c, the data on any of the RAID data storage devices 206a-206d may be safely reconstructed using the "new" primary data and "new" parity data for the stripe. If the event data cannot be read from any of the RAID data storage devices 206a-206d, the RAID data storage controller device 204 may use the "old" data or the "new" data for the stripe depending on whether the "new" data for the stripe has been updated in the RAID data storage devices 206a-206d. In either case, the RAID storage system 200 maintains a consistent version of all primary data and parity data for the stripe from which to perform the reconstruction , and one of skill in the art in possession of the present disclosure will recognize how such reconstruction may utilize "old" data until the state of the stripe has advanced).

Furthermore, the RAID primary data storage devices 206a-206c may be accessed directly to read their corresponding primary data, but the sequencing of reads with respect to writes may be established by the RAID storage controller device 204 in order to prevent a "read/write race". For example, the RAID primary data storage devices 206a-206c may operate to return their "old" primary data up to the point they receive the stripe update completion message from the RAID storage controller device 204, and from that point on, RAID primary data storage devices 206a-206c may return their "new" primary data. As will be appreciated by one of skill in the art in possession of the present disclosure, such operations will ensure that "time never goes backwards" (from a host system perspective). For example, from the perspective of the host system 202, any acknowledged writes will be seen by subsequent reads from the same host of the same logical block(s), and once the new write is acknowledged, reads will not return the old data. Furthermore, in the event a read is outstanding to the same block as has been written and the acknowledgement for the write has not yet been received, the read response is indeterminate—it could return either old or new data.

As such, the primary data returned in response to a read will reflect the "old" state of the stripe any time prior to the RAID storage controller device 204 committing the stripe update, and once the RAID storage controller device 204 commits the stripe update by sending the stripe update completion messages to the RAID data storage devices 206a-206d, reads may immediately return the "new" primary data, which one of skill in the art in possession of the present disclosure will appreciate prevents the possibility of reversing causality at the host system 202 (which could occur if the host system were to receive its write acknowledgement from the RAID storage controller device 204 and then issue a read request directly to the RAID primary data storage devices 206a-206c without intermediation by the RAID storage controller device 204, and then receive "old" primary data from the RAID primary data storage devices 206a-206c that have not yet asynchronously processed the primary data update). As such, embodiments of the present disclosure may allow control messages to be delivered "out of order" between the RAID storage controller device 204 and the RAID data storage devices 206a-206d by adding a stripe update sequence identifier to those control messages in order ensure in-order processing of those control messages at the RAID parity data storage device 206d.

Thus, systems and methods have been described that provide for the tracking of an update of a stripe in a drive-assisted RAID storage system. For example, the drive-assisted RAID storage system of the present disclosure may include a RAID storage controller device coupled to RAID primary data storage devices each storing primary data for a stripe, and a RAID parity data storage device storing parity data for the stripe. The RAID parity data storage device receives stripe parity data update commands from the RAID storage controller device that cause it to retrieve respective interim parity data generated by each of the RAID primary data storage devices and including respective stripe update sequence identifiers. The RAID parity data storage device uses the respective interim parity data to generate updated parity data. When the respective stripe update sequence identifiers in the respective interim parity data that was used to generate the updated parity data indicate that parity update operations for the stripe are complete, the RAID parity data storage device transmits a stripe parity update completion message to the RAID storage controller device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A drive-assisted Redundant Array of Independent Disk (RAID) storage system, comprising:

a plurality of Redundant Array of Independent Disk (RAID) primary data storage devices that each store primary data for a stripe;
a RAID storage controller device that is coupled to the plurality of RAID data storage devices; and
a RAID parity data storage device that stores parity data for the stripe, wherein the RAID parity data storage device is configured to:
receive or retrieve respective interim parity data that was generated by at least one of the plurality of RAID primary data storage devices, and that includes a respective stripe update sequence identifier;
generate, using the respective interim parity data, updated parity data;
determine that parity update operations for the stripe are complete based on the respective stripe update sequence identifiers that are included in the respective interim parity data that has been used to generate the updated parity data including a contiguous set of stripe update sequence identifiers between an initial stripe update sequence identifier and a last stripe update sequence identifier; and
transmit, to the RAID storage controller device in response to determining that the parity update operations for the stripe are complete, a stripe parity update completion message.

2. The system of claim 1, wherein the RAID parity data storage device is configured to:
generate the updated parity data in a sequence identified by the respective stripe update sequence identifiers.

3. The system of claim 2, wherein the generating the updated parity data in the sequence identified by the respective stripe update sequence identifiers includes:
receiving or retrieving second interim parity data that was generated by a second RAID primary data storage device and that includes a second stripe update sequence identifier;
determining that the sequence identified by the respective stripe update sequence identifiers includes a first stripe update sequence identifier that comes before the second stripe update sequence identifier; and
delaying generating second updated parity data using the second interim parity data until first interim parity data that includes the first stripe update sequence identifier is retrieved.

4. The system of claim 1, wherein the RAID parity data storage device is configured to:
receive, from the RAID storage controller device subsequent to transmitting the stripe parity update completion message, a stripe update confirmation; and
erase, in response to receiving the stripe update confirmation, the respective interim parity data that was used to generate the updated parity data.

5. The system of claim 1, wherein the RAID parity data storage device is configured to:
store, in response to determining that the respective stripe primary data update sequence identifiers indicate that parity update operations for the stripe are complete, the updated parity data in a persistent storage system in the RAID parity data storage device.

6. The system of claim 1, wherein the generating the updated parity data is performed using the respective interim parity data retrieved in response to more than one of a plurality of stripe parity data update commands received from the RAID storage controller device.

7. An Information Handling System (IHS), comprising:

a processing system; and a memory system that is coupled to the processing system and that includes instructions that, when executed by the processing system, cause the processing system to provide a Redundant Array of Independent Disk (RAID) data storage engine that is configured to:

receive or retrieve respective interim parity data that was generated by at least one RAID primary data storage device, and that includes a respective stripe update sequence identifier;

generate, using the respective interim parity data, updated parity data;

determine that parity update operations for the stripe are complete based on the respective stripe update sequence identifiers that are included in the respective interim parity data that has been used to generate the updated parity data including a contiguous set of stripe update sequence identifiers between an initial stripe update sequence identifier and a last stripe update sequence identifier; and transmit, to a RAID storage controller device in response to determining that the parity update operations for the stripe are complete, a stripe parity update completion message.

8. The IHS of claim 7, wherein the RAID data storage engine is configured to:

generate the updated parity data in a sequence identified by the respective stripe update sequence identifiers.

9. The IHS of claim 8, wherein the generating the updated parity data in the sequence identified by the respective stripe update sequence identifiers includes:

receiving or retrieving second interim parity data that was generated by a second RAID primary data storage device and that includes a second stripe update sequence identifier;

determining that the sequence identified by the respective stripe update sequence identifiers includes a first stripe update sequence identifier that comes before the second stripe update sequence identifier; and delaying generating second updated parity data using the second interim parity data until first interim parity data that includes the first stripe update sequence identifier is retrieved.

10. The IHS of claim 7, wherein the RAID data storage engine is configured to:

receive, from the RAID storage controller device subsequent to transmitting the stripe parity update completion message, a stripe update confirmation; and erase, in response to receiving the stripe update confirmation, the respective interim parity data that was used to generate the updated parity data.

11. The IHS of claim 7, wherein the RAID data storage engine is configured to:

store, in response to determining that the respective stripe primary data update sequence identifiers indicate that parity update operations for the stripe are complete, the updated parity data in a persistent storage system in the RAID parity data storage device.

12. The IHS of claim 7, wherein the generating the updated parity data is performed using the respective interim parity data retrieved in response to more than one of a plurality of stripe parity data update commands received from the RAID storage controller device.

13. The IHS of claim 7, wherein the processing system and memory system are included in a Non-Volatile Memory express (NVMe) storage device.

14. A method for performing drive-assisted Redundant Array of Independent Disk (RAID) operations, comprising:

receiving or retrieving, by a RAID parity data storage device, respective interim parity data that was generated by at least one RAID primary data storage device, and that includes a respective stripe update sequence identifier;

generating, by the RAID parity data storage device using the respective interim parity data, updated parity data;

determining, by the RAID parity data storage device, that parity update operations for the stripe are complete based on the respective stripe update sequence identifiers that are included in the respective interim parity data that has been used to generate the updated parity data including a contiguous set of stripe update sequence identifiers between an initial stripe update sequence identifier and a last stripe update sequence identifier; and transmitting, by the RAID parity data storage device to the RAID storage controller device in response to determining that the parity update operations for the stripe are complete, a stripe parity update completion message.

15. The method of claim 14, further comprising:

generating, by the RAID parity data storage device, the updated parity data in a sequence identified by the respective stripe update sequence identifiers.

16. The method of claim 15, wherein the generating the updated parity data in the sequence identified by the respective stripe update sequence identifiers includes:

receiving or retrieving, by the RAID parity data storage device, second interim parity data that was generated by a second RAID primary data storage device and that includes a second stripe update sequence identifier;

determining, by the RAID parity data storage device, that the sequence identified by the respective stripe update sequence identifiers includes a first stripe update sequence identifier that comes before the second stripe update sequence identifier; and delaying, by the RAID parity data storage device, generating second updated parity data using the second interim parity data until first interim parity data that includes the first stripe update sequence identifier is retrieved.

17. The method of claim 14, further comprising:

receiving, by the RAID parity data storage device from the RAID storage controller device subsequent to transmitting the stripe parity update completion message, a stripe update confirmation; and erasing, by the RAID parity data storage device in response to receiving the stripe update confirmation, the respective interim parity data that was used to generate the updated parity data.

18. The method of claim 14, further comprising:

storing, by the RAID parity data storage device in response to determining that the respective stripe primary data update sequence identifiers indicate that parity update operations for the stripe are complete, the updated parity data in a persistent storage system in the RAID parity data storage device.

19. The method of claim 14, wherein the generating the updated parity data is performed using the respective interim parity data retrieved in response to more than one of a plurality of stripe parity data update commands received from the RAID storage controller device.

20. The method of claim 14, wherein the processing system and memory system are included in a Non-Volatile Memory express (NVMe) storage device.

* * * * *